United States Patent
Martin et al.

(10) Patent No.: US 11,241,996 B2
(45) Date of Patent: Feb. 8, 2022

(54) COLLABORATIVE VEHICLE HEADLIGHT DIRECTING

(71) Applicant: QUALCOMM Incorporated, San Diego, CA (US)

(72) Inventors: Paul Daniel Martin, Devon, PA (US); Aleksandr Kushleyev, Philadelphia, PA (US); Jonathan Paul Davis, Philadelphia, PA (US); Moussa Ben Coulibaly, Brookhaven, PA (US); Kristen Wagner Cerase, Newark, DE (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/742,197

(22) Filed: Jan. 14, 2020

(65) Prior Publication Data

US 2021/0213869 A1    Jul. 15, 2021

(51) Int. Cl.
| | |
|---|---|
| *B60Q 1/08* | (2006.01) |
| *F21S 41/62* | (2018.01) |
| *B60Q 11/00* | (2006.01) |
| *B60Q 1/16* | (2006.01) |

(52) U.S. Cl.
CPC ............. *B60Q 1/085* (2013.01); *B60Q 1/16* (2013.01); *B60Q 11/005* (2013.01); *F21S 41/62* (2018.01); *B60Q 2300/42* (2013.01)

(58) Field of Classification Search
CPC ........ B60Q 1/085; B60Q 1/16; B60Q 11/005; B60Q 2300/42; F21S 41/62
See application file for complete search history.

(56) References Cited

U.S. PATENT DOCUMENTS

| | | | |
|---|---|---|---|
| 6,356,189 B1 * | 3/2002 | Fujimaki | G08G 1/162 340/465 |
| 7,005,977 B1 | 2/2006 | Tengler et al. | |
| 8,738,236 B2 | 5/2014 | Moizard et al. | |
| 9,415,718 B2 | 8/2016 | Futamura et al. | |

(Continued)

FOREIGN PATENT DOCUMENTS

| | | |
|---|---|---|
| CN | 106354076 A | 1/2017 |
| CN | 108528325 A | 9/2018 |

(Continued)

OTHER PUBLICATIONS

International Search Report and Written Opinion—PCT/US2020/063961—ISA/EPO—dated Feb. 26, 2021.

*Primary Examiner* — Raymond R Chai
(74) *Attorney, Agent, or Firm* — Michael F. Taveira

(57) ABSTRACT

Various embodiments include methods and vehicles, such as an autonomous vehicle, a semi-autonomous vehicle, etc., for collaboratively directing one or more headlights by two or more vehicles. Various aspects may include receiving, by a first vehicle processor, a first collaborative lighting message from a second vehicle, in which the first collaborative lighting message may request the first vehicle direct one or more headlights of the first vehicle, in collaboration with the second vehicle directing one or more headlights of the second vehicle according to a collaborative lighting plan, and directing, by the first vehicle processor, one or more of the headlights of the first vehicle in accordance with the collaborative lighting plan.

26 Claims, 28 Drawing Sheets

(56) References Cited

U.S. PATENT DOCUMENTS

| | | | |
|---|---|---|---|
| 9,731,645 B1 | 8/2017 | Taleb-Bendiab | |
| 9,789,808 B1 | 10/2017 | Hong et al. | |
| 10,047,925 B2 | 8/2018 | Kim | |
| 10,101,163 B2 | 10/2018 | Abhishek | |
| 10,659,937 B2* | 5/2020 | Kume | B60W 40/09 |
| 10,807,517 B2 | 10/2020 | Yokoyama | |
| 2002/0036907 A1 | 3/2002 | Kobayashi et al. | |
| 2004/0021853 A1* | 2/2004 | Stam | G01J 1/32 |
| | | | 356/218 |
| 2007/0262882 A1 | 11/2007 | Yamamoto | |
| 2009/0279317 A1* | 11/2009 | Tatara | B60Q 1/12 |
| | | | 362/465 |
| 2014/0361686 A1* | 12/2014 | Wolfe | B60Q 1/0088 |
| | | | 315/77 |
| 2015/0187019 A1 | 7/2015 | Fernandes et al. | |
| 2016/0016504 A1 | 1/2016 | Licsar et al. | |
| 2016/0096475 A1* | 4/2016 | Wolfe | H05B 47/175 |
| | | | 381/59 |
| 2017/0217360 A1* | 8/2017 | Pierfelice | B60Q 1/08 |
| 2017/0248963 A1 | 8/2017 | Levinson et al. | |
| 2018/0009374 A1* | 1/2018 | Kim | G03B 21/2013 |
| 2018/0099606 A1* | 4/2018 | Dudar | B60Q 1/085 |
| 2018/0132285 A1* | 5/2018 | Jackson | G08G 1/0955 |
| 2018/0136643 A1* | 5/2018 | Tao | B60Q 1/50 |
| 2018/0178711 A1* | 6/2018 | Wang | B60Q 1/143 |
| 2018/0252396 A1* | 9/2018 | Ashoori | H05B 47/125 |
| 2018/0359320 A1* | 12/2018 | Latheef | H04B 10/516 |
| 2019/0011930 A1 | 1/2019 | Tatara et al. | |
| 2019/0016217 A1* | 1/2019 | Buttolo | B60Q 1/50 |
| 2019/0051178 A1* | 2/2019 | Priev | G08G 1/162 |
| 2019/0073909 A1* | 3/2019 | Neubecker | B60Q 1/143 |
| 2019/0100133 A1* | 4/2019 | Bensalem | B60Q 1/346 |
| 2019/0101933 A1 | 4/2019 | Dudar | |
| 2019/0113351 A1 | 4/2019 | Antony | |
| 2019/0176684 A1 | 6/2019 | Zych | |
| 2019/0188494 A1* | 6/2019 | Sawa | G08G 1/16 |
| 2019/0202345 A1* | 7/2019 | Hennes | B60Q 1/24 |
| 2019/0206262 A1 | 7/2019 | Sin | |
| 2020/0198522 A1 | 6/2020 | Kikuchi et al. | |
| 2020/0324692 A1 | 10/2020 | Hong | |
| 2021/0213870 A1 | 7/2021 | Martin et al. | |
| 2021/0213871 A1 | 7/2021 | Martin et al. | |
| 2021/0213873 A1 | 7/2021 | Martin et al. | |

FOREIGN PATENT DOCUMENTS

| | | |
|---|---|---|
| DE | 102010038961 A1 | 2/2012 |
| DE | 102012024148 A1 | 6/2014 |
| DE | 102013006687 A1 | 10/2014 |
| DE | 102014213131 A1 | 1/2016 |
| DE | 102016206347 A1 | 10/2017 |
| EP | 3228499 A2 | 10/2017 |
| EP | 3424779 A2 | 1/2019 |
| FR | 2791932 A1 | 10/2000 |
| WO | 2019050939 A1 | 3/2019 |
| WO | 2019108108 A1 | 6/2019 |

* cited by examiner

COLLABORATIVE VEHICLE HEADLIGHT DIRECTING

BACKGROUND

Automobiles and trucks are becoming more intelligent as the industry moves towards deploying autonomous and semi-autonomous vehicles. Autonomous and semi-autonomous vehicles can detect information about their location and surroundings (for example, using radar, lidar, GPS, file odometers, accelerometers, cameras, and other sensors), and include control systems that interpret sensory information to identify hazards and determine navigation paths to follow. Autonomous and semi-autonomous vehicles include control systems to operate with limited or no control from an occupant or other operator of the automobile. Some autonomous and semi-autonomous vehicles include headlight beam directing features that direct one or more headlights according to an angle of the steering wheel, so that, on high curvature roads, the occupants can better see in the direction of future travel rather than just directly ahead of the vehicle.

SUMMARY

Various aspects include methods enabling a vehicle, such as an autonomous vehicle, a semi-autonomous vehicle, etc., to collaboratively direct one or more headlights by two or more vehicles. Various aspects may include receiving, by a first vehicle processor, a first collaborative lighting message from a second vehicle, in which the first collaborative lighting message may request that the first vehicle direct one or more headlights of the first vehicle, in collaboration with the second vehicle directing one or more headlights of the second vehicle according to a collaborative lighting plan, and directing, by the first vehicle processor, one or more of the headlights of the first vehicle in accordance with the collaborative lighting plan.

Some aspects may include determining, by the first vehicle processor, whether the first vehicle can collaborate with the second vehicle according to the collaborative lighting plan and transmitting to the second vehicle a second collaborative lighting message and directing one or more headlights of the first vehicle according to the collaborative lighting plan in response to determining that the first vehicle can collaborate with the second vehicle according to the collaborative lighting plan. The collaborative lighting plan may include pointing angles for headlights of the first and second vehicles to enable collaboratively directing one or more headlights to illuminate a common portion of a roadway for the first and second vehicles. The collaborative lighting plan may include pointing angles for one or more headlights of the first and second vehicles to illuminate a larger continuous area of a roadway on which the first and second vehicles are traveling than the first and second vehicles would illuminate with headlights aimed in the respective direction of travel of the first and second vehicles. The collaborative lighting plan may include timing information and pointing angles for one or more headlights of the first and second vehicles to direct one or more of the headlights of the first vehicle and the second vehicle to illuminate a roadway at the same time. The collaborative lighting plan may identify an area in a roadway that the second vehicle requests that the first vehicle to point headlights towards to provide better illumination for the second vehicle. The collaborative lighting plan may identify an area of uncertainty in a roadway that the second vehicle needs to continue illuminating. The first and second vehicles may be traveling in a different, or even opposite, direction.

Some aspects may include receiving, by the first vehicle processor, a third collaborative lighting message from a third vehicle, in which the third collaborative lighting message requests that the first and second vehicles to direct one or more headlights of the first and second vehicles, respectively, in collaboration with the third vehicle directing one or more headlights of the third vehicle according to another collaborative lighting plan.

Various aspects may include a second vehicle processor transmitting a first collaborative lighting message to a first vehicle, in which the first collaborative lighting message requests the first vehicle direct one or more headlights of the first vehicle, in collaboration with the second vehicle directing one or more headlights of the second vehicle according to a collaborative lighting plan. The second vehicle processor may direct one or more of the headlights of the second vehicle in accordance with the collaborative lighting plan.

Some aspects may include the second vehicle processor receiving a second collaborative lighting message from the first vehicle, in which receipt of the second collaborative lighting message indicates that the first vehicle agrees to follow the first collaborative lighting message. Directing one or more of the headlights of the second vehicle in accordance with the collaborative lighting plan may be performed in response to receiving the second collaborative lighting message. The collaborative lighting plan may include the first and second vehicles collaboratively directing one or more headlights to illuminate a common portion of a roadway for the first and second vehicles. The collaborative lighting plan may illuminate a larger continuous area of a roadway on which the first and second vehicles are traveling than the first and second vehicles would illuminate with headlights aimed in the respective direction of travel of the first and second vehicles. One or more of the headlights of the second vehicle may be directed in accordance with the collaborative lighting plan illuminates a roadway at the same time as one or more of the headlights of the second vehicle. The collaborative lighting plan may identify an area in a roadway that the second vehicle requests the first vehicle better illuminate. The collaborative lighting plan may identify an area of uncertainty on a roadway that the second vehicle needs to continue illuminating. The first and second vehicles may be traveling in a different, or even opposite, direction.

Some aspects may include a second vehicle processor receiving an amended collaborative lighting plan, in which the amended collaborative lighting plan requests that the first and second vehicles direct one or more headlights of the first and second vehicles, respectively, in collaboration with a third vehicle directing one or more headlights of the third vehicle.

Further aspects include a vehicle having one or more directable headlights and including a processor configured with processor-executable instructions to perform operations of any of the methods summarized above. Further aspects include a collaborative headlight directing system for use in a vehicle including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device configured for use in a vehicle and to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
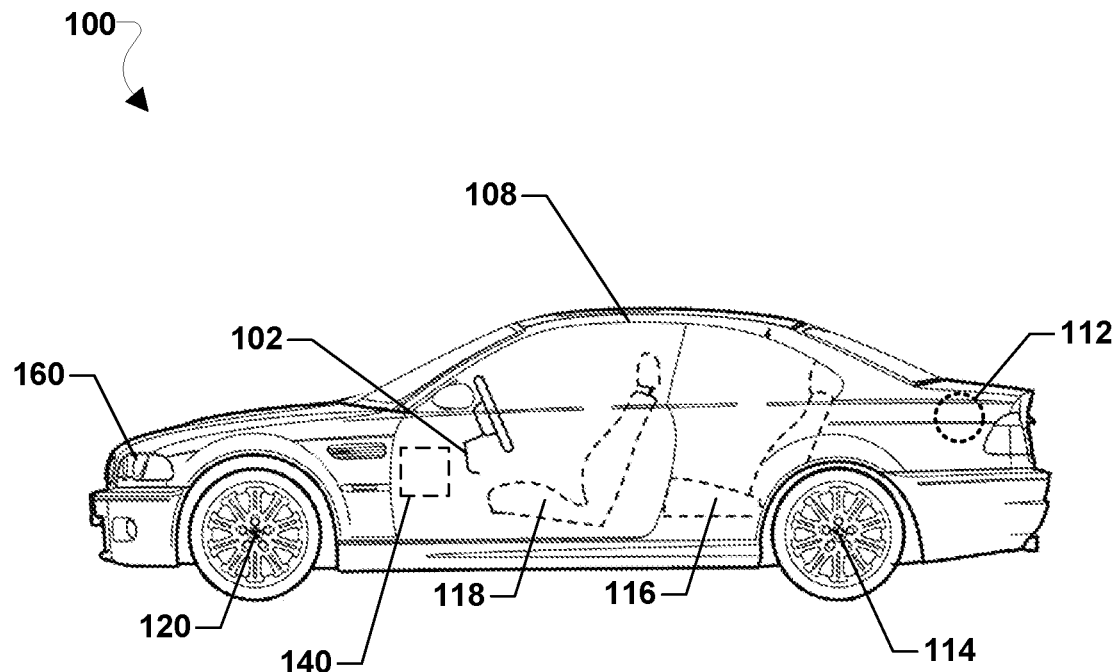
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

In various embodiments, two or more vehicles may collaborate to direct one or more of their headlights so that the entire roadway is better illuminated for all vehicles. In various embodiments, a first vehicle processor may receive a collaborative lighting message from a second vehicle. The collaborative lighting message may request that the first vehicle direct one or more of its headlights in collaboration with the second vehicle directing its headlights according to a collaborative lighting plan that improves the illumination of the roadway for both vehicles. Then both vehicles may direct one or more of their respective headlights in accordance with the collaborative lighting plan.

For example, one or more of the headlights of each of two vehicles may be directed away from the other so one or more of the headlights of the two vehicles overlap less. For example, by having the first vehicle illuminate less roadway ahead of the second vehicle and having the second vehicle illuminate less roadway ahead of the first vehicle, rather than both vehicles illuminating the road straight ahead, a broader swath of roadway will be illuminated. Alternatively, if more overlapping illumination is preferred, such as to see a shadowy object ahead far in the distance, both vehicles may direct one or more headlights collaboratively to overlap, thus better illuminating a roadway ahead of both vehicles.

In various embodiments, two or more vehicles may collaborate to direct at least one headlight toward an off-road area of uncertainty. For example, a vehicle may encounter areas of uncertainty from problems viewing, identifying, and/or classifying an object that while off-road may still pose a potential threat to the vehicle (e.g., an animal, person, or other vehicle approaching or preparing to cross the road). The off-road object may be hard to visualize due to distance, shadows, obstructions, etc. The vehicle encountering the area of uncertainly may communicate to another vehicle and request that other vehicle direct one or more of its headlights toward the area of uncertainty to better illuminate that area or illuminate the area from a different angle and/or distance, which may enable a collision avoidance and/or vehicle navigation system in the requesting vehicle to further classify and avoid any obstacles in the area. In this way, collaborative illumination may reduce uncertainties in the areas adjacent a roadway to avoid unexpected threats to vehicles from those areas.

In some embodiments, the first vehicle processor may determine whether the first vehicle can collaborate with the second vehicle according to the proposed collaborative lighting plan. A second collaborative lighting message may be transmitted in response to determining that the first vehicle can collaborate with the second vehicle according to the collaborative lighting plan.

In various embodiments, the collaborative lighting plan may include the first and second vehicles collaboratively directing one or more headlights to illuminate a common portion of a roadway for the first and second vehicles. The collaborative lighting plan may illuminate a larger continuous area of a pathway on which the first and second vehicles are traveling than the first and second vehicles would illuminate with headlights aimed in the respective direction of travel of the first and second vehicles. Directing one or more of the headlights of the first vehicle in accordance with the collaborative lighting plan illuminates a roadway at the same time as one or more of the headlights of the second vehicle. The collaborative lighting plan may identify an area in a roadway that the second vehicle may request the first vehicle to better illuminate. The collaborative lighting plan may identify an area of uncertainty in a roadway that the second vehicle needs to continue illuminating to enable a collision avoidance and/or vehicle navigation system in the requesting vehicle to further classify and avoid any obstacles in the area. The first and second vehicles may be traveling in a different direction. The first and second vehicles may be traveling in opposite directions.

In some embodiments, a third collaborative lighting message may be received by the first vehicle processor from a third vehicle. The third collaborative lighting message may request that the first and/or second vehicle(s) direct one or more headlights of the first and/or second vehicle(s), respectively, in collaboration with the third vehicle directing one or more headlights of the third vehicle according to an amended collaborative lighting plan.

Various embodiments include methods by which the second vehicle transmits the first collaborative lighting message and directs its headlights in accordance with the collaborative lighting plan. The second vehicle processor may determine whether the second vehicle can collaborate with the first vehicle according to a collaborative lighting plan. The second vehicle processor may receive a second collaborative lighting message from the first vehicle, which may indicate that the first vehicle agrees to follow the collaborative lighting plan. In this way, directing one or more of the headlights of the second vehicle in accordance with the collaborative lighting plan may be in response to receiving the second collaborative lighting message.

In various embodiments, two or more vehicles traveling in a platoon may collaborate to direct one or more of their respective headlights so that the collective illumination is better than may be achieved by any individual vehicle or the group of vehicles acting independently. For example, vehicles in the second or middle rows of a platoon may direct one or more of their headlights toward the side of a road while vehicles at the front may collaborate to illuminate the roadway ahead of the platoon.

As used herein the terms "headlight" or "headlights" are used to interchangeably refer to both the electromechanical parts of a vehicle that generate powerful beams of light, generally from the front of the vehicle, as well as the light beams themselves, which are cast by the electromechanical parts. Vehicles may have two or more headlights. In various embodiments, headlights may be configured or coupled to a mechanism that enables the beam of each headlight to be directed in a particular direction or angle. For example, one or more headlights on a vehicle may be coupled to a steering mechanism that is configured to steer the headlight in a particular direction or through a defined angle in response to control signals from a vehicle computing device. Other mechanisms for directing headlights may also be used in various embodiments, such as adjustable lenses, mirrors, and/or prisms that can be actuated to redirect light emanating a headlight. In some embodiments, the different headlights of a vehicle may be directed independently (i.e., pointed in different directions), such as one headlight illuminating the roadway ahead of the vehicle and one headlight directed in a particular direction according to a collaborative lighting plan.

As used herein the terms "roadway" or "roadways" refer to a way, path, or pathway leading from one place to another, especially one with a specially prepared surface which vehicles can use for travel. A roadway may be an intended and/or planned path of travel, whether or not on a prepared surface. As used herein the term "off-road" refers to areas along and beyond the boundaries of the roadway.

As used herein the terms "platoon" or "platooning" refer to two or more vehicle driving together in a relatively close formation. Platooning vehicles may operate with smaller than usual distances between vehicles and even optionally couple to one another (e.g., mechanically and/or electromagnetically).

Methods for collaborative headlight directing may be extended to vehicles organized and traveling within a platoon. Platooning employs methods to enable a group of vehicles to travel together in a collaborative manner. A platoon control plan may be used to organize, maintain, and/or control the group of vehicles in a formation. The platoon control plan may be determined by a single vehicle, which may be referred to as the "leader." Within the platoon, in accordance with the platoon control plan, each participating vehicle assumes a single position in the formation. The leader vehicle may coordinate the overall platoon movement. The other vehicles in the platoon (referred to herein as "followers") may follow directions provided by the leader, to the extent those directions do not conflict with other directions a vehicle is programmed to follow (e.g., destination directions may require a follower vehicle to leave the platoon). However, the leader vehicle need not be the lead vehicle in the platoon. Platooning allows the vehicles to achieve a number of beneficial results, including increased fuel efficiency, congestion efficiency, collision risk mitigation, freeing the driver(s) to focus attention away from the road, and other benefits.

The surface transportation industry has increasingly looked to leverage the growing capabilities of cellular and wireless communication technologies through the adoption of Intelligent Transportation Systems (ITS) technologies to increase intercommunication and safety for both driver-operated vehicles and autonomous vehicles. Vehicle-to-everything (V2X) protocols (including vehicle-to-vehicle (V2V), vehicle-to-infrastructure (V2I), vehicle-to-network communications (V2N), and vehicle-to-pedestrian (V2P) protocols), and particularly the cellular V2X (C-V2X) protocol defined by the 3rd Generation Partnership Project (3GPP), support(s) ITS technologies and serves as the foundation for vehicles to communicate directly with the communication devices around them.

C-V2X defines two transmission modes that, together, provide a 360° non-line-of-sight awareness and a higher level of predictability for enhanced road safety and autonomous driving. A first transmission mode includes direct C-V2X, which includes V2V, V2I, and V2P, and that provides enhanced communication range and reliability in the dedicated ITS 5.9 gigahertz (GHz) spectrum that is independent of a cellular network. A second transmission mode includes V2N communications in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc.

The term "system-on-chip" (SOC) is used herein to refer to a set of interconnected electronic circuits typically, but not exclusively, including one or more processors, a memory, and a communication interface. The SOC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SOC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SOCs may be integrated circuits (ICs) configured such that the components of the ICs reside on the same substrate, such as a single piece of semiconductor material (e.g., silicon, etc.).

Autonomous and semi-autonomous vehicles, such as cars and, trucks, tour buses, etc., are becoming a reality on city streets. Autonomous and semi-autonomous vehicles typically include a plurality of sensors, including cameras, radar, and lidar, that collect information about the environment surrounding the vehicle. For example, such collected information may enable the vehicle to recognize the roadway, identify objects to avoid, and track the movement and future position of other vehicles to enable partial or fully autonomous navigation.

Various embodiments include methods, vehicles, vehicle management systems, and processing devices configured to implement the methods for collaboratively directing headlights of two or more vehicles, such as autonomous vehicles, semi-autonomous vehicles, driver-operated vehicles, etc., to improve illumination on and off a roadway of the vehicles in a synergistic manner. Facilitated by the increase in bandwidth and reduction in latency of wireless communications enabled by modern communication networks, including 5G networks, collaboratively directing one or more headlights among multiple vehicles, particularly autonomous vehicles, may improve illumination of features to enable collision avoidance and autonomous navigation systems to better control vehicles.

Figure 1B:
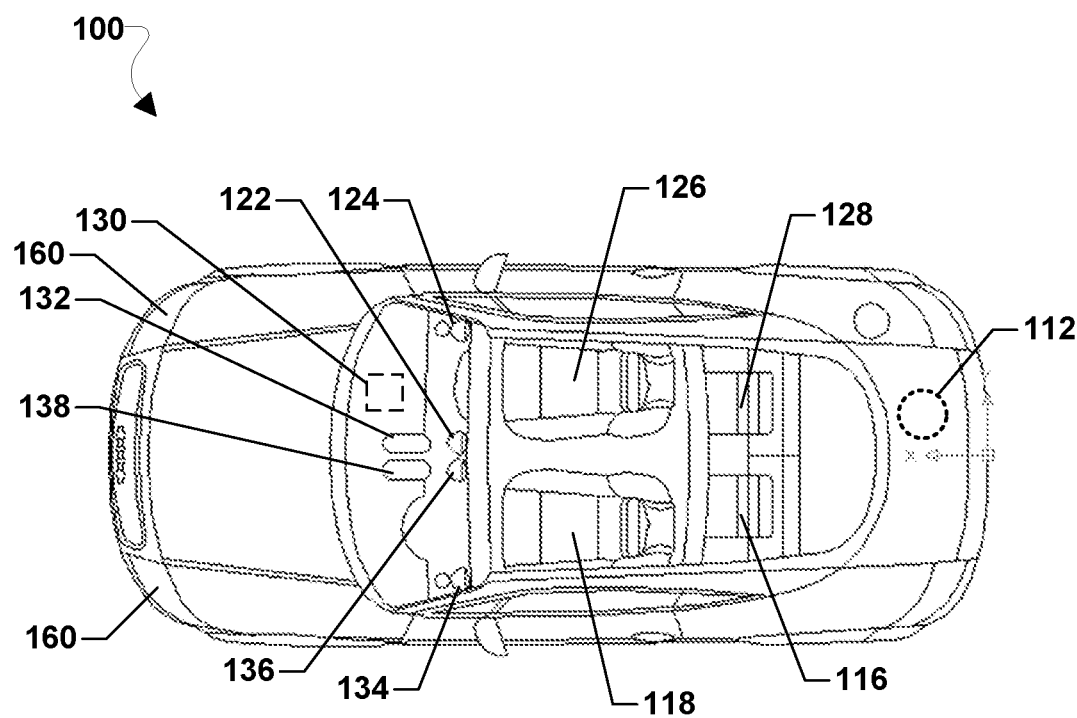

Various embodiments may be implemented within a variety of vehicles, an example vehicle 100 of which is illustrated in FIGS. 1A and 1B. With reference to FIGS. 1A and 1B, a vehicle 100 may include a control unit 140 and a plurality of sensors 102-138, including satellite geo-positioning system receivers 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geo-positioning system receivers 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured to direct one or more headlights 160 in accordance with various embodiments. Additionally, the control unit 140 may have a default setting for one or more of the headlights 160, such as a no-directing setting or a setting that automatically directs one or more of the headlights to follow the steering wheel. The default setting may be followed when the control unit 140 is not actively directing one or more of the headlights 160.

The vehicle control unit 140 may be configured with processor-executable instructions to perform various embodiments using information received from various sensors, particularly the cameras 122, 136. In some embodiments, the control unit 140 may supplement the processing of camera images using distance and relative position (e.g., relative bearing angle) that may be obtained from radar 132 and/or lidar 138 sensors. The control unit 140 may further be configured to control directing, braking and speed of the vehicle 100 when operating in an autonomous or semi-autonomous mode using information regarding other vehicles determined using various embodiments.

Figure 1C:
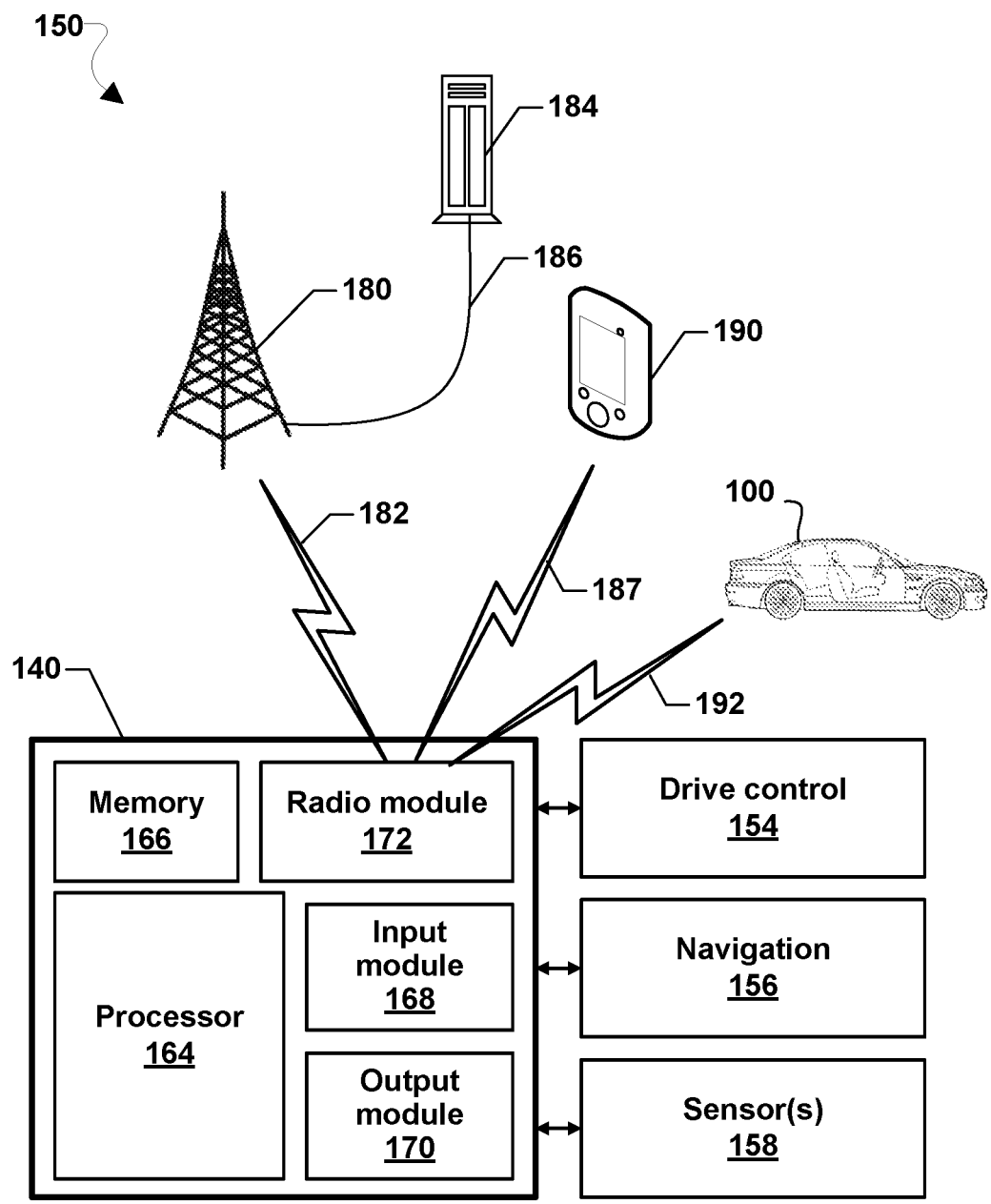
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The control unit 140 may include a processor 164 that may be configured with processor-executable instructions to control maneuvering, navigation, and/or other operations of the vehicle 100, including operations of various embodiments. The processor 164 may be coupled to the memory 166. The control unit 162 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network transceiver 180, and may provide the signals 182 to the processor 164 and/or the navigation components 156. In some embodiments, the radio module 172 may enable the vehicle 100 to communicate with a wireless communication device 190 through a wireless communication link 187. The wireless communication link 187 may be a bidirectional or unidirectional communication link, and may use one or more communication protocols. In some embodiments, the radio module 172 may enable the vehicle 100 to communicate with another vehicle 100b through a wireless communication link 192. The wireless communication link 192 may be a bidirectional or unidirectional communication link, and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, directing elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156, and may receive data from the navigation components 156 and be configured to use such data to determine the present position and orientation of the vehicle 100, as well as an appropriate course toward a destination.

In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using a wireless connection signal 182 with a cellular data network transceiver 180 to receive commands to control maneuvering, receive data useful in navigation, provide real-time position reports, and assess other data.

The control unit 162 may be coupled to one or more sensors 158. The sensor(s) 158 may include the sensors 102-138 as described, and may the configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 2A:
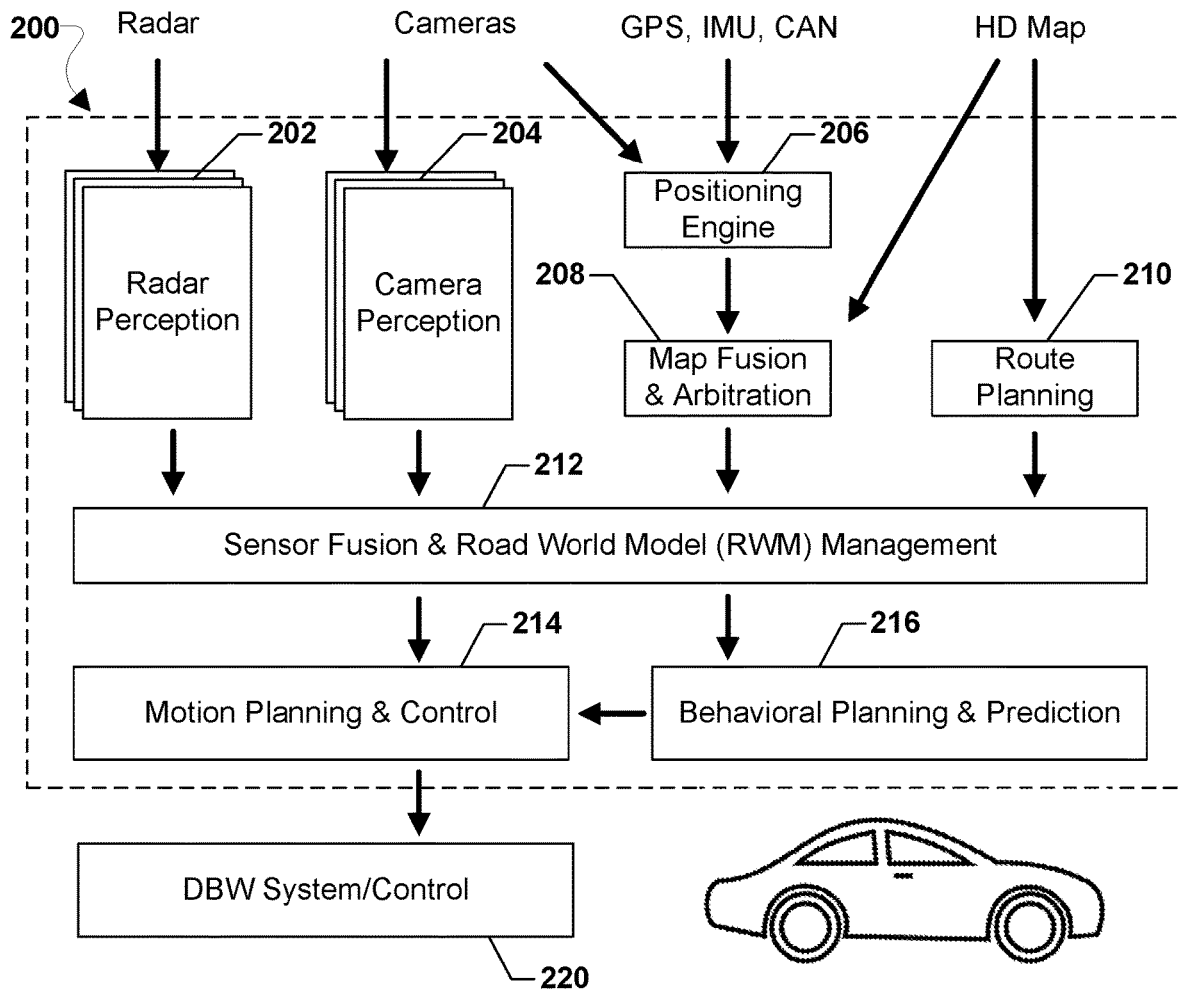
FIG. 2A is a component block diagram illustrating components of an example vehicle management system according to various embodiments.

FIG. 2A illustrates an example of subsystems, computational elements, computing devices or units within a vehicle management system 200, which may be utilized within a vehicle 100. With reference to FIGS. 1A-2A, in some embodiments, the various computational elements, computing devices or units within vehicle management system 200 may be implemented within a system of interconnected computing devices (i.e., subsystems), that communicate data and commands to each other (e.g., indicated by the arrows in FIG. 2A). In other embodiments, the various computational elements, computing devices or units within vehicle management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle management system computing device, although that is a potential embodiment. Rather the use of the term "layer" is intended to encompass subsystems with independent processors, computational elements (e.g., threads, algorithms, subroutines, etc.) running in one or more computing devices, and combinations of subsystems and computational elements.

In various embodiments, the vehicle management system 200 may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle management system 200. In other configurations consistent with various embodiments, other layers may be included, such as additional layers for other perception sensors (e.g., LIDAR perception layer, etc.), additional layers for planning and/or control, additional layers for modeling, etc., and/or certain of the layers 202-216 may be excluded from the vehicle management system 200. Each of the layers 202-216 may exchange data, computational results and commands as illustrated by the arrows in FIG. 2A. Further, the vehicle management system 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system 200 may output vehicle control commands or signals to the drive by wire (DBW) system/control unit 220, which is a system, subsystem or computing device that interfaces directly with vehicle directing, throttle and brake controls. The configuration of the vehicle management system 200 and DBW system/control unit 220 illustrated in FIG. 2A is merely an example configuration and other configurations of a vehicle management system and other vehicle components may be used in the various embodiments. As an example, the configuration of the vehicle management system 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 122, 136), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 122, 136) and/or any other available sensor, such as radars, LIDARs, etc.

The map fusion and arbitration layer 208 may access data within a high definition (HD) map database and receive output received from the positioning engine layer 206 and process the data to further determine the position of the vehicle 100 within the map, such as location within a lane of traffic, position within a street map, etc. The HD map database may be stored in a memory (e.g., memory 166). For example, the map fusion and arbitration layer 208 may convert latitude and longitude information from GPS into locations within a surface map of roads contained in the HD map database. GPS position fixes include errors, so the map fusion and arbitration layer 208 may function to determine a best guess location of the vehicle within a roadway based upon an arbitration between the GPS coordinates and the HD map data. For example, while GPS coordinates may place the vehicle near the middle of a two-lane road in the HD map, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize the HD map, as well as inputs from an operator or dispatcher to plan a route to be followed by the vehicle 100 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 100 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 100 to change speed, lane, direction of travel, or other navigational element(s), and combine that information with other received information to determine refined location and state information. The sensor fusion and RWM management layer 212 may output the refined location and state information of the vehicle 100, as well as refined location and state information of other vehicles and objects in the vicinity of the vehicle 100, to the motion planning and control layer 214, the behavior planning and prediction layer 216 and/or devices remote from the vehicle 100, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak brakes, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle management system 200 may use the refined location and state information of the vehicle 100 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 100. For example, based on route planning information, refined location in the roadway information, and relative locations and motions of other vehicles, the behavior planning and prediction layer 216 may determine that the vehicle 100 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the vehicle management system 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
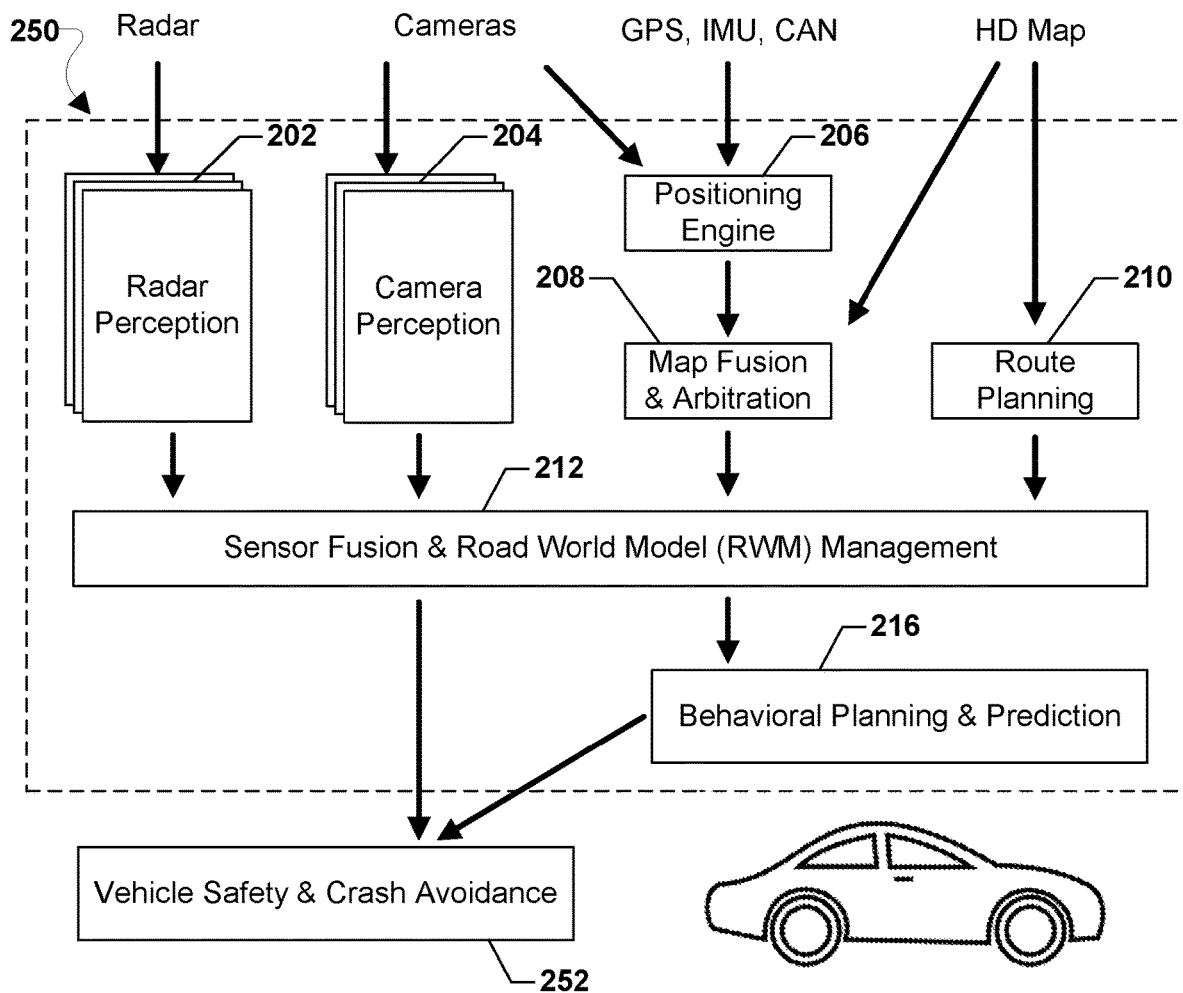
FIG. 2B is a component block diagram illustrating components of another example vehicle management system according to various embodiments.

FIG. 2B illustrates an example of subsystems, computational elements, computing devices or units within a vehicle management system 250, which may be utilized within a vehicle 100. With reference to FIGS. 1A-2B, in some embodiments, the layers 202, 204, 206, 208, 210, 212, and 216 of the vehicle management system 200 may be similar to those described with reference to FIG. 2A and the vehicle management system 250 may operate similar to the vehicle management system 200, except that the vehicle management system 250 may pass various data or instructions to a vehicle safety and crash avoidance system 252 rather than the DBW system/control unit 220. For example, the configuration of the vehicle management system 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
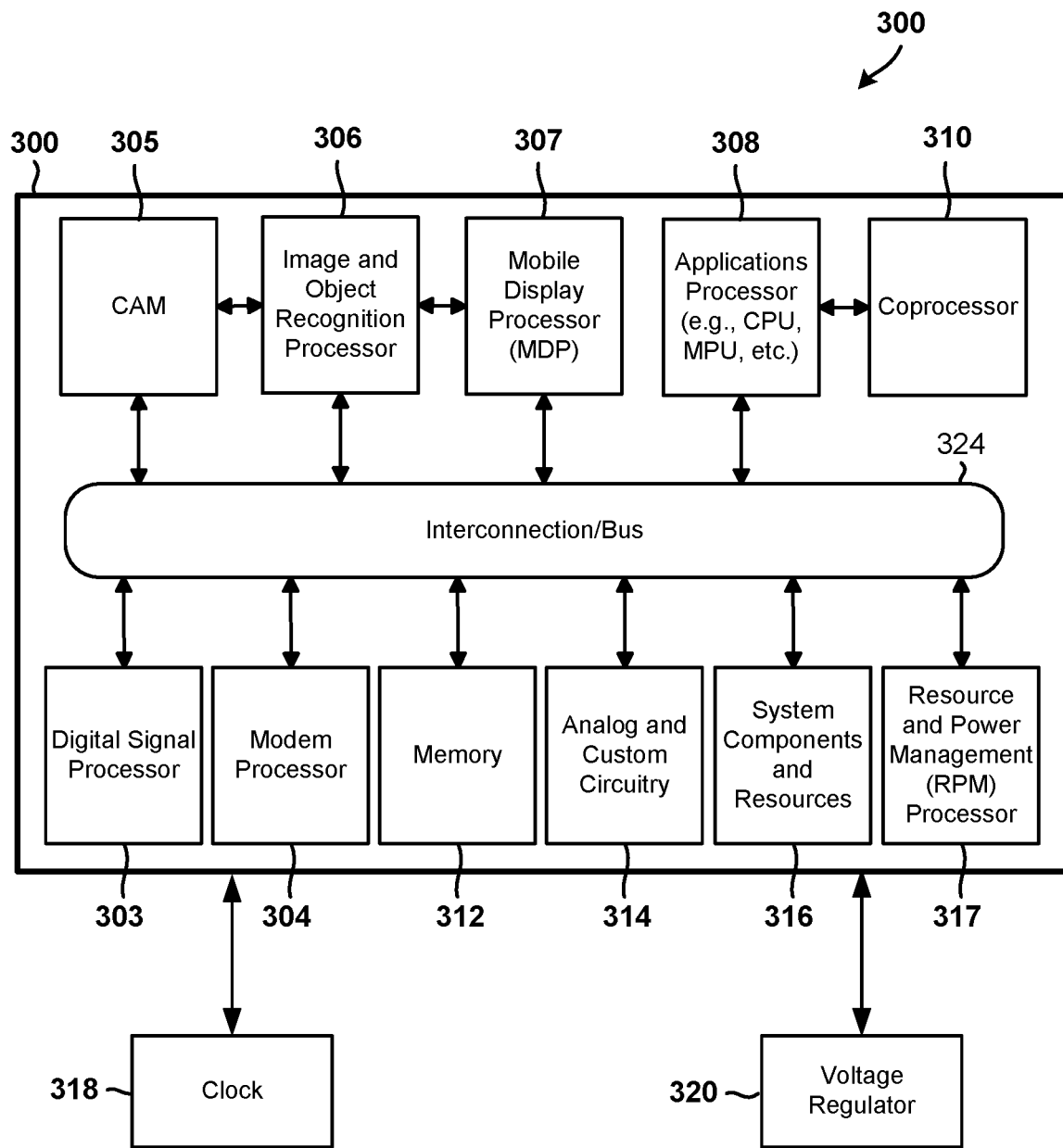
FIG. 3 is a block diagram illustrating components of an example system on chip for use in a vehicle that may be configured to broadcast, receive, and/or otherwise use intentions and/or motion plans in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), graphics processing unit (GPU), etc.

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 122, 136, radar 132, lidar 138, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., the DSP 303, the modem processor 304, the image and object recognition processor 306, the MDP, the applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4:
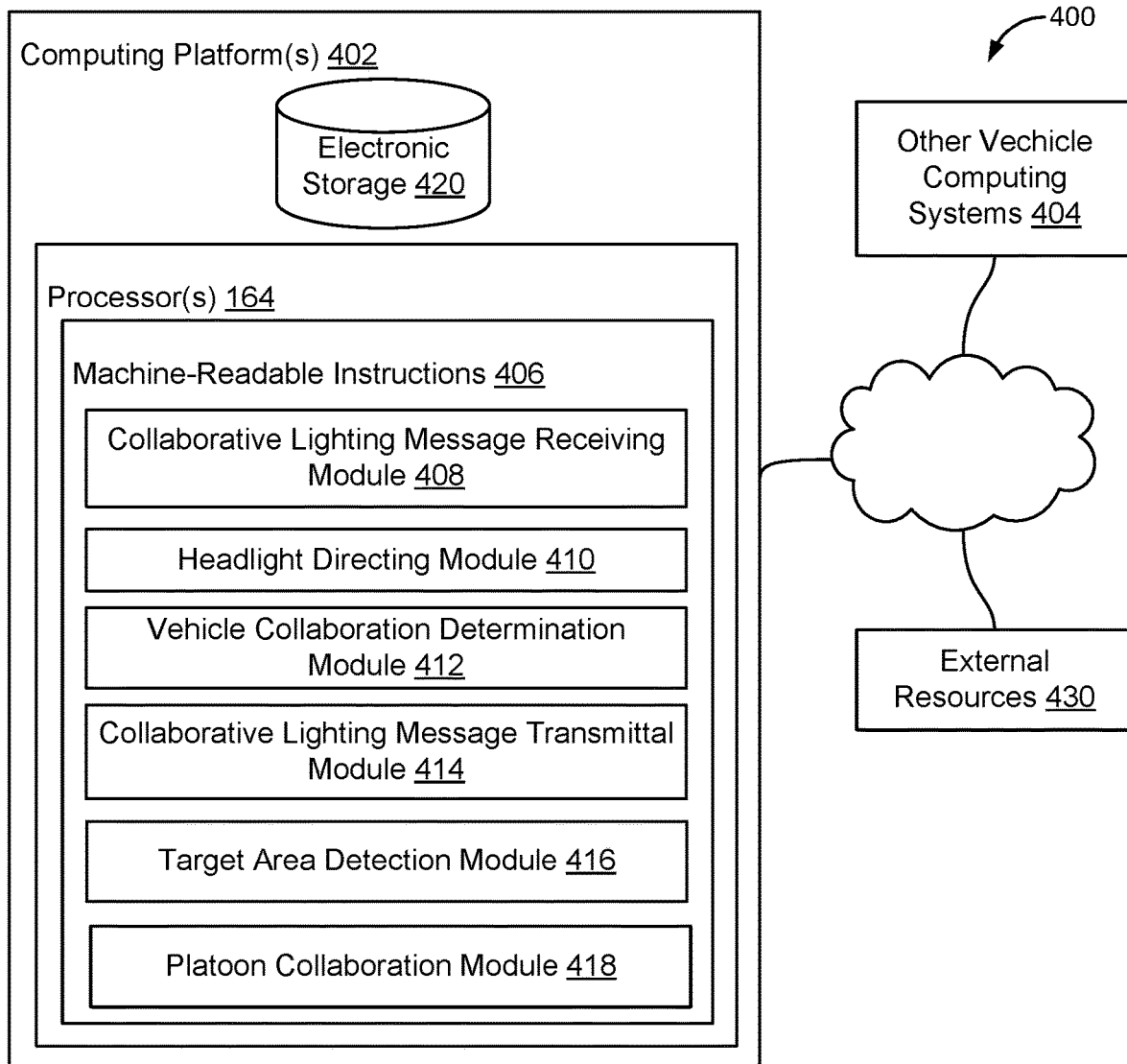
FIG. 4 is a component block diagram of an example system configured for collaborative headlight directing between vehicles according to various embodiments.

FIG. 4 shows a component block diagram illustrating a system 400 configured for collaboratively directing headlights by two or more vehicles in accordance with various embodiments. In some embodiments, the system 400 may include one or more vehicle computing systems 402 and one or more other vehicle computing system other vehicle computing systems 404 communicating via a wireless network. With reference to FIGS. 1A-4, the vehicle computing system(s) 402 may include a processor (e.g., 164), a processing device (e.g., 300), and/or a control unit (e.g., 104) (variously referred to as a "processor") of a vehicle (e.g., 100). The other vehicle computing system(s) 404 may include a processor (e.g., 164), a processing device (e.g., 300), and/or a control unit (e.g., 104) (variously referred to as a "processor") of a vehicle (e.g., 100).

The vehicle computing system(s) 402 may be configured by machine-executable instructions 406. Machine-executable instructions 406 may include one or more instruction modules. The instruction modules may include computer program modules. The instruction modules may include one or more of a collaborative lighting message receiving module 408, headlight directing module 410, vehicle collaboration determination module 412, lighting message transmittal module 414, target area detection module 416, and/or other instruction modules.

The collaborative lighting message receiving module 408 may be configured to receive, by a first vehicle processor, a first collaborative lighting message from a second vehicle. The first collaborative lighting message may request the first vehicle direct one or more headlights of the first vehicle, in collaboration with the second vehicle directing one or more headlights of the second vehicle according to a collaborative lighting plan. The collaborative lighting message receiving module 408 may also be configured to receive, by the first vehicle processor, a second collaborative lighting message. By way of non-limiting example, receipt of the second collaborative lighting message may indicate that another vehicle agrees to follow the collaborative lighting plan. In this way, directing one or more of the headlights in accordance with the collaborative lighting plan may be in response to receiving the second collaborative lighting message.

The collaborative lighting message receiving module 408 may also be configured to receive, by the first vehicle processor, a third collaborative lighting message from a third vehicle. By way of non-limiting example, the third collaborative lighting message may request the first and second vehicles to direct one or more headlights of the first and second vehicles, respectively, in collaboration with the third vehicle directing one or more headlights of the third vehicle according to another collaborative lighting plan. The collaborative lighting message receiving module 408 may be configured to receive an amended collaborative lighting plan. By way of a non-limiting example, the amended collaborative lighting plan may request that the first and second vehicles direct one or more headlights of the first and second vehicles, respectively, in collaboration with a third vehicle directing one or more headlights of the third vehicle.

In addition, the collaborative lighting message receiving module 408 may receive a first-vehicle collaborative lighting message from a second vehicle. The first-vehicle collaborative lighting message may request that the first vehicle direct one or more headlights of the first vehicle so as to illuminate a target area of uncertainty that is disposed, relative to the first vehicle, in a direction other than a direction of travel of the first vehicle. Also, the collaborative lighting message receiving module 408, in the second vehicle, may receive a second collaborative lighting message from the first vehicle, in which the second collaborative lighting message may request that the second vehicle direct one or more headlights of the second vehicle so as to illuminate a roadway in a direction of travel of the first vehicle. Alternatively, the second collaborative lighting message may include a counter-proposal in which the first vehicle directs headlights of the first vehicle so as to illuminate a roadway in a direction of travel of the second vehicle and the second vehicle directs headlights of the second vehicle so as to illuminate the target area of uncertainty.

The headlight directing module 410 may be configured to direct, by the vehicle processor, one or more of the headlights of the vehicle in accordance with the collaborative lighting plan and/or an amended collaborative lighting plan. As a non-limiting example, the headlight directing module 410 may be configured to direct one or more of the headlights of the vehicle to illuminate in a direction of travel of the vehicle or in a direction other than in the direction of travel of the vehicle. The headlight directing module 410 may be configured to direct one or more of the headlights of the vehicle toward a target area of uncertainty.

The vehicle collaboration determination module 412 may be configured to determine, by the vehicle processor, whether the vehicle can collaborate with another one or more vehicles according to a collaborative lighting plan. Transmitting a second collaborative lighting message may be in response to determining that the first vehicle can collaborate with the second vehicle according to the collaborative lighting plan.

In addition, the vehicle collaboration determination module 412 may be configured to determine whether the first vehicle can direct one or more headlights of the first vehicle to illuminate the target area of uncertainty that is disposed in the direction other than the direction of travel of the first vehicle. Directing one or more of the headlights of the first vehicle to illuminate the target area may be performed in response to determining the first vehicle can direct one or more headlights of the first vehicle to illuminate the target area of uncertainty.

Further, the vehicle collaboration determination module 412 may be configured to determine a collaborative lighting plan based on location information received from vehicles in a platoon of vehicles. The vehicle collaboration determination module 412 may be configured to determine whether a vehicle in the platoon of vehicles is positioned in one of a plurality of perimeter positions of the platoon. The collaborative lighting plan may direct a vehicle not in one of the plurality of perimeter positions to turn off one or more of the headlights or reduce a level of illumination emitted by one or more of the headlights of that vehicle. The vehicle collaboration determination module 412 may be configured to collaborate with other vehicles to determine the collaborative lighting plan. Also, the vehicle collaboration determination module 412 may be configured to determine whether to change the collaborative lighting plan based on a received request from another vehicle. In addition, the vehicle collaboration determination module 412 may be configured to determine whether to change the collaborative lighting plan in response to determining that at least one vehicle has joined or departed from the platoon.

The lighting message transmittal module 414 may be configured to transmit to another vehicle a collaborative lighting message, either an originating collaborative lighting message or in response to determining that the vehicle can collaborate with another vehicle to follow a collaborative lighting plan. As a non-limiting example, the lighting message transmittal module 414 may be configured to transmit, to a first vehicle by a second vehicle processor, a first collaborative lighting message. The first collaborative lighting message may request that the first vehicle direct one or more headlights of the first vehicle in collaboration with the second vehicle directing one or more headlights of the second vehicle in accordance with a collaborative lighting plan. Additionally or alternatively, the lighting message transmittal module 414 may be configured to transmit to the second vehicle a second collaborative lighting message in response to determining that the first vehicle can collaborate with the second vehicle according to the collaborative lighting plan. Also, the lighting message transmittal module 414 may be configured to transmit, from a third vehicle by the third vehicle processor, a third collaborative lighting message. By way of non-limiting example, the third collaborative lighting message may request that the first vehicle, and any other vehicle collaborating with the first vehicle, direct one or more headlights in collaboration with the third vehicle directing one or more headlights of the third vehicle to better illuminate a pathway for the first, second, and third vehicles. As a further non-limiting example, the third-vehicle collaborative lighting message may request that the third vehicle maintain or increase an illumination level of a roadway area in the direction of travel of the first vehicle.

In addition, the lighting message transmittal module 414 may be configured to transmit a collaborative lighting message that includes a collaborative lighting plan. The collaborative lighting plan may direct the first vehicle to direct one or more headlights of the first vehicle to illuminate the target area of uncertainty that is disposed, relative to the first vehicle, in a direction other than a direction of travel of the first vehicle. The collaborative lighting plan may define how the first and second vehicles may collaboratively direct one or more headlights to illuminate a common portion of a pathway for the first and second vehicles. The collaborative lighting plan may illuminate a larger continuous area of a pathway on which the first and second vehicles are traveling than the first and second vehicles would illuminate with headlights aimed in the respective direction of travel of the first and second vehicles. Directing one or more of the headlights of the first vehicle in accordance with the collaborative lighting plan may illuminate a roadway at the same time as the second vehicle illuminates a roadway.

The collaborative lighting plan may identify an area on a roadway that the second vehicle requests the first vehicle to illuminate with its headlights. The collaborative lighting plan may identify an area of uncertainty on a roadway that the second vehicle needs to continue illuminating, such as to enable a collision avoidance and/or vehicle navigation system in the requesting vehicle to further classify and avoid any obstacles in the area. The collaborative lighting plan may define how the first and second vehicles should collaboratively direct one or more headlights to illuminate a common portion of a roadway for the first and second vehicles. The collaborative lighting plan may illuminate a larger continuous area of a pathway on which the first and second vehicles are traveling than the first and second vehicles would illuminate with headlights aimed in the respective direction of travel of the first and second vehicles. Directing one or more of the headlights of the first vehicle in accordance with the collaborative lighting plan may illuminate a roadway at the same time as one or more of the headlights of the second vehicle. The collaborative lighting plan may identify an area on a roadway that the second vehicle may request the first vehicle better illuminate. The collaborative lighting plan may alternatively or additionally identify an area of uncertainty on a roadway that the second vehicle needs to continue illuminating, such as to enable a collision avoidance and/or vehicle navigation system in the requesting vehicle to further classify and avoid any obstacles in the area.

The collaborative lighting plan may direct one or more of the vehicles in a platoon to direct one or more headlights of the respective vehicles in a direction other than a direction of travel of the platoon. In this way, the collaborative lighting plan may direct two or more vehicles of the platoon to direct one or more headlights to improve illumination of a roadway for the platoon as a whole. In addition, the collaborative lighting plan may direct a vehicle in the platoon to turn off or dim one or more of the headlights of the vehicle. The collaborative lighting plan may be contingent upon one or more of the vehicles of the platoon remaining in a current relative position within the platoon. In addition, the collaborative lighting plan may take into account the received vehicle location information.

The target area detection module 416 may be configured to detect a target area of uncertainty for which the vehicle processor determines additional illumination is needed. The target area detection module 416 may be configured to use sensors (e.g., radar perception layer 202, camera perception layer 204, etc.) or other inputs (e.g., V2X communications) to detect areas surrounding a vehicle for which more information is needed, such as to classify and/or track an object. Additional information may be needed by a vehicle safety system that uses visual systems to recognize conditions that may affect how the vehicle operates or should operate. For example, if a vehicle processor analyzing camera data detects an object, creature, or other vehicle approaching the subject vehicle or being approached by the subject vehicle, the vehicle processor may control the subject vehicle (e.g., through the motion planning and control layer 214) to slow down, speed up, change direction, or perform any other needed action to avoid a collision or other unwanted interaction with the condition. However, darkness or low lighting conditions may hamper the full assessment of conditions in the vicinity of a vehicle based on camera images. For example, a vehicle's radar or LIDAR system may detect an area including an object that should be imaged to classify for tracking and avoidance purposes, but low levels of light may prevent an accurate analysis of the detected object using a camera system. To address this, various embodiments use collaborative headlight directing to enable a vehicle to recruit the assistance of other vehicles to provide additional illumination through headlight directing toward a poorly lit area determined to be of interest (e.g., a condition associated with a high probability of posing a risk to the requesting vehicle, others, or other negative interaction with the condition).

Various conditions may be detected by the image and object recognition systems of a vehicle (e.g., image and object recognition processor 306) using inputs from vehicle sensors. Such systems may enable a vehicle processor to detect conditions on the roadway (e.g., a pothole, flooding, object, creature, etc.) or off the roadway (e.g., a creature or vehicle approaching the road, a tree falling, an object moving, etc.). A detected condition may need to pose a minimum level of importance to warrant being considered a "condition of interest." For example, a large stationary boulder on the side of the road may not need additional attention, but that same boulder rolling toward the road may be a threat. Thus, the vehicle processor may access a database, memory, logic engine, or other system to determine whether detected conditions pose the minimum level of importance or threat to be addressed as a condition of interest.

When lighting conditions are too low (i.e., below the illumination threshold), a threat assessment by a camera system may not be made or may not be sufficiently accurate. Thus, the vehicle processor may designate or have designated a minimum illumination threshold for performing object classification/recognition using the camera system. If vehicle object recognition systems detect an object off the roadway, such as based on radar returns, for which the minimum illumination threshold is not met, and thus the camera system will be unable to classify and track the object, the area around the detected object may be treated as a "target area of uncertainty" requiring better illumination.

The minimum illumination threshold level may also correspond to a threshold illumination level above which additional lighting from one or more of the headlights of another vehicle may not help the object recognition systems with object classification, recognition or tracking. Thus, an area within sensor range (e.g., radar and/or camera range) may not be considered or referred to as a "target area of uncertainty" if there is sufficient illumination for the camera system. Thus, the vehicle processor may designate a detected off-road object as a "target area of uncertainty" only if the vehicle processor determines that the lighting conditions in the area are below the minimum illumination threshold.

Additionally, although a condition of interest may exist within an area having lighting conditions below the minimum illumination threshold, the vehicle processor may not consider the area a target area of uncertainty for collaborative lighting purposes if there is no other vehicle available in the vicinity that can perform collaborative headlight directing.

Thus, the vehicle processor may designate an area as a target area of uncertainty in response to determining a condition of interest exists in the area, the lighting condition in the area are below the minimum illumination threshold, and one or more other vehicles is in the region that may be able to assist in providing additional lighting. Once a target area of uncertainty is designated, the vehicle processor may transmit a collaborative lighting message for coordinating a collaborative lighting plan with the other vehicle(s). The collaborative lighting plan may direct the other vehicle(s) to direct one or more headlights to illuminate the target area of uncertainty or otherwise help in illuminating the area.

The platoon collaboration module 418 may be configured to coordinate, compile, and manage aspects of platooning. When forming a platoon, the platoon collaboration module 418 may consider input provided by each vehicle, such as a destination, timing constraints, and/or a current position and velocity thereof. Selection of and changes to platoon formations may be determined according to a number of factors, such as the number of vehicles platooning or the road geometry. For example, a single lane road may be limited to a single in-line formation, while a highway with more than one lane may allow the platoon to form as a multi-lane cluster of vehicles. Also, the platoon need not utilize all the lanes available on a highway (e.g., leaving the left-most lane free for other vehicles to pass).

The platoon collaboration module 418 may consider platoon goals or priorities when implementing the platoon control plan or sub-elements thereof, such as a collaborative lighting plan. For example, if fuel or energy efficiency is a priority for the platoon, an in-line, closely-spaced formation may be used to gain efficiencies from drafting. Similarly, one or more of the vehicles in the platoon may be directed to dim or turn off one or more of their headlights to minimize energy expenditures.

Vehicles that participate in a platoon formation may need to be equipped with the platoon collaboration module 418 or some equivalent thereof. In addition, platooning vehicles may require V2V communications capabilities, an ability to implement at least a core subset of the platoon control plan, communication protocols, and associated processing and maneuvering functions. Some vehicles may be capable and configured to take any role in the formation. Others vehicles, based on vehicle equipment or driver/occupant characteristics, may be constrained to a smaller range of roles within the formation.

In some embodiments, vehicle computing system(s) 402, other vehicle computing system(s) 404 may communicate with one another via a wireless network 430, such as V2V wireless communication links. Additionally, the vehicle computing system(s) 402 and other vehicle computing system(s) 404 may be connected to wireless communication networks that provide access to external resources 430. For example, such electronic communication links may be established, at least in part, via a network such as the Internet and/or other networks. It will be appreciated that this is not intended to be limiting, and that the scope of this disclosure includes embodiments in which vehicle computing system(s) 402, other vehicle computing system(s) 404, and/or external resources 430 may be operatively linked via some other communication media.

The other vehicle computing system 404 may also include one or more processors configured to execute computer program modules configured by machine-executable instructions 406. Machine-executable instructions 406 may include one or more instruction modules that may include one or more of a collaborative lighting message receiving module 408, headlight directing module 410, vehicle collaboration determination module 412, lighting message transmittal module 414, target area detection module 416, platoon collaboration module 418 and/or other instruction modules similar to the vehicle computing system 402 of a first vehicle as described.

External resources 430 may include sources of information outside of system 400, external entities participating with the system 400, and/or other resources. For example, external resource 430 may include map data resources, highway information systems, weather forecast services, etc. In some embodiments, some or all of the functionality attributed herein to external resources 430 may be provided by resources included in system 400.

Vehicle computing system(s) 402 may include electronic storage 420, one or more processors 422, and/or other components. Vehicle computing system(s) 402 may include communication lines, or ports to enable the exchange of information with a network and/or other vehicle computing system.

Illustration of vehicle computing system(s) 402 in FIG. 4 is not intended to be limiting. Vehicle computing system(s) 402 may include a plurality of hardware, software, and/or firmware components operating together to provide the functionality attributed herein to vehicle computing system(s) 402. For example, vehicle computing system(s) 402 may be implemented by a cloud of vehicle computing systems operating together as vehicle computing system(s) 402.

Electronic storage 420 may comprise non-transitory storage media that electronically stores information. The electronic storage media of electronic storage 420 may include one or both of system storage that is provided integrally (i.e., substantially non-removable) with vehicle computing system(s) 402 and/or removable storage that is removably connectable to vehicle computing system(s) 402 via, for example, a port (e.g., a universal serial bus (USB) port, a firewire port, etc.) or a drive (e.g., a disk drive, etc.). Electronic storage 420 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 420 may include one or more virtual storage resources (e.g., cloud storage, a virtual private network, and/or other virtual storage resources). Electronic storage 420 may store software algorithms, information determined by processor(s) 422, information received from vehicle computing system(s) 402, information received from other vehicle computing system(s) 404, and/or other information that enables vehicle computing system(s) 402 to function as described herein.

Processor(s) 422 may be configured to provide information processing capabilities in vehicle computing system(s) 402. As such, processor(s) 422 may include one or more of a digital processor, an analog processor, a digital circuit designed to process information, an analog circuit designed to process information, a state machine, and/or other mechanisms for electronically processing information. Although processor(s) 422 is shown in FIG. 4 as a single entity, this is for illustrative purposes only. In some embodiments, processor(s) 422 may include a plurality of processing units. These processing units may be physically located within the same device, or processor(s) 422 may represent processing functionality of a plurality of devices operating in coordination. Processor(s) 422 may be configured to execute modules 408, 410, 412, 414, 416, and/or 418, and/or other modules. Processor(s) 422 may be configured to execute modules 408, 410, 412, 414, 416, and/or 418, and/or other modules by software; hardware; firmware; some combination of software, hardware, and/or firmware; and/or other mechanisms for configuring processing capabilities on processor(s) 422. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, and/or 418 are illustrated in FIG. 4 as being implemented within a single processing unit, in embodiments in which processor(s) 422 includes multiple processing units, one or more of modules 408, 410, 412, 414, 416, and/or 418 may be implemented remotely from the other modules. The description of the functionality provided by the different modules 408, 410, 412, 414, 416, and/or 418 described below is for illustrative purposes, and is not intended to be limiting, as any of modules 408, 410, 412, 414, 416, and/or 418 may provide more or less functionality than is described. For example, one or more of modules 408, 410, 412, 414, 416, and/or 418 may be eliminated, and some or all of its functionality may be provided by other ones of modules 408, 410, 412, 414, 416, and/or 418. As another example, processor(s) 422 may be configured to execute one or more additional modules that may perform some or all of the functionality attributed below to one of modules 408, 410, 412, 414, 416, and/or 418.

Figure 5A:
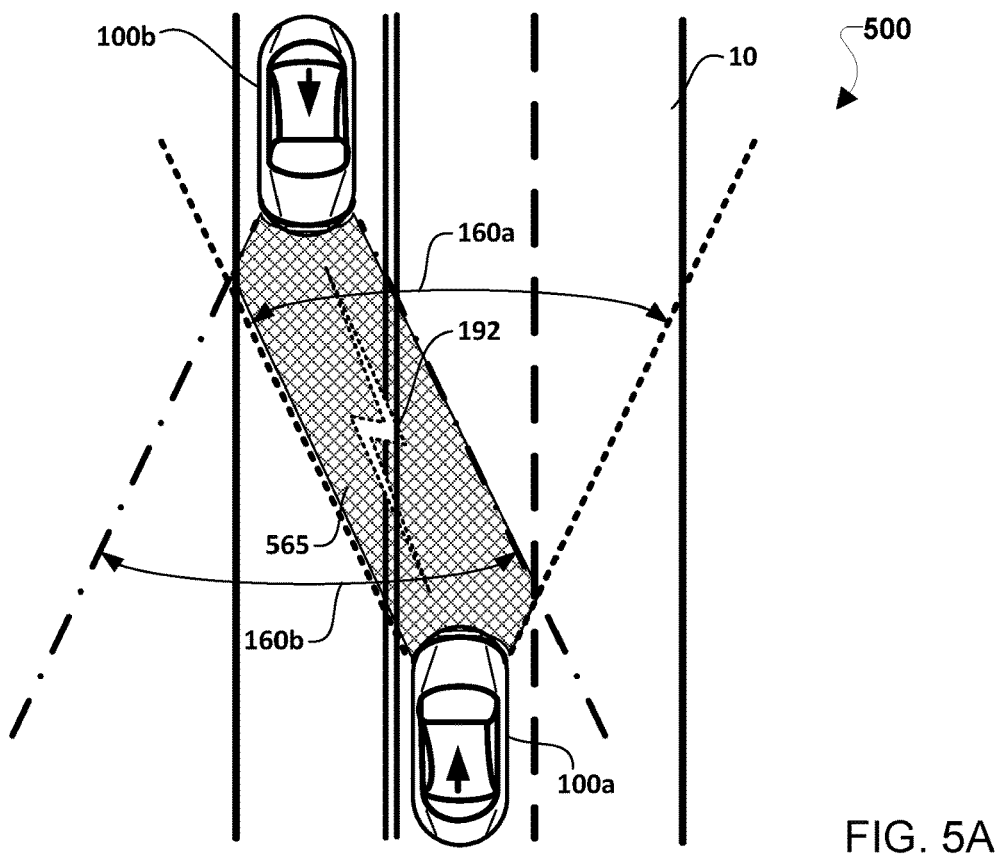
FIGS. 5A, 5B, and 5C illustrate examples of vehicles directing one or more headlights to follow a collaborative lighting plan in accordance with various embodiments.
Figure 5B:
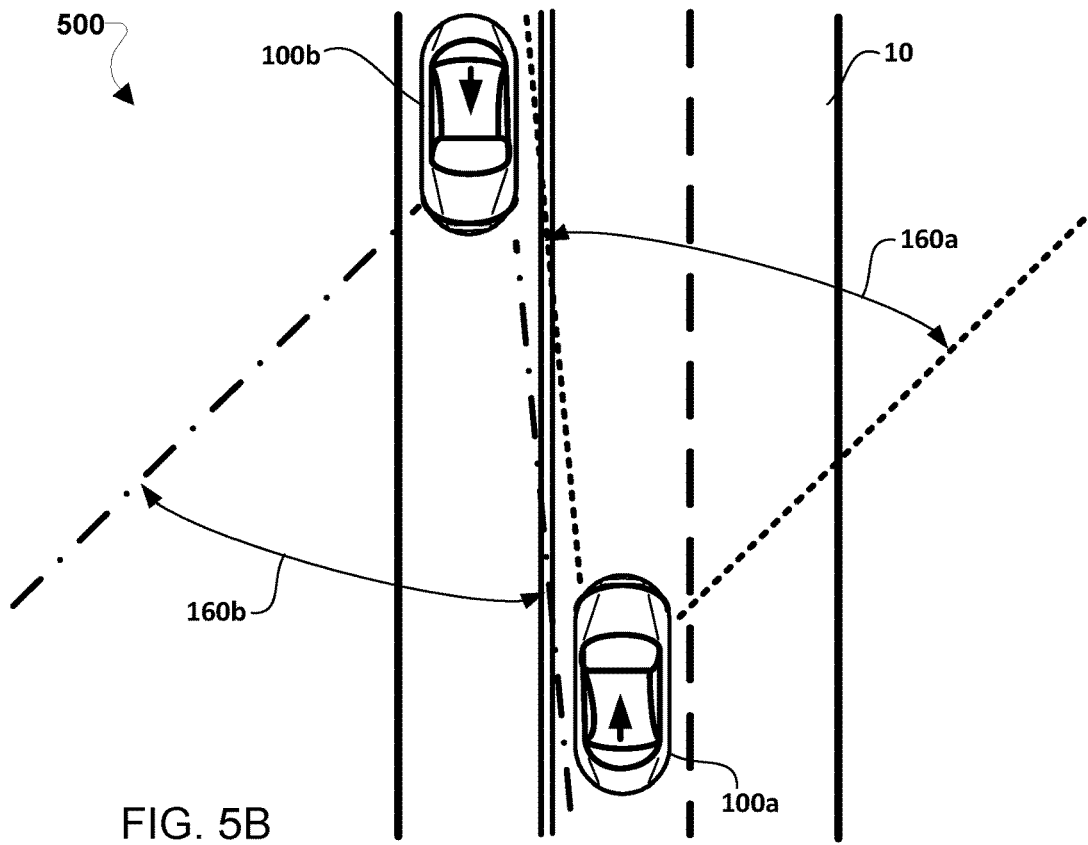
Figure 5C:
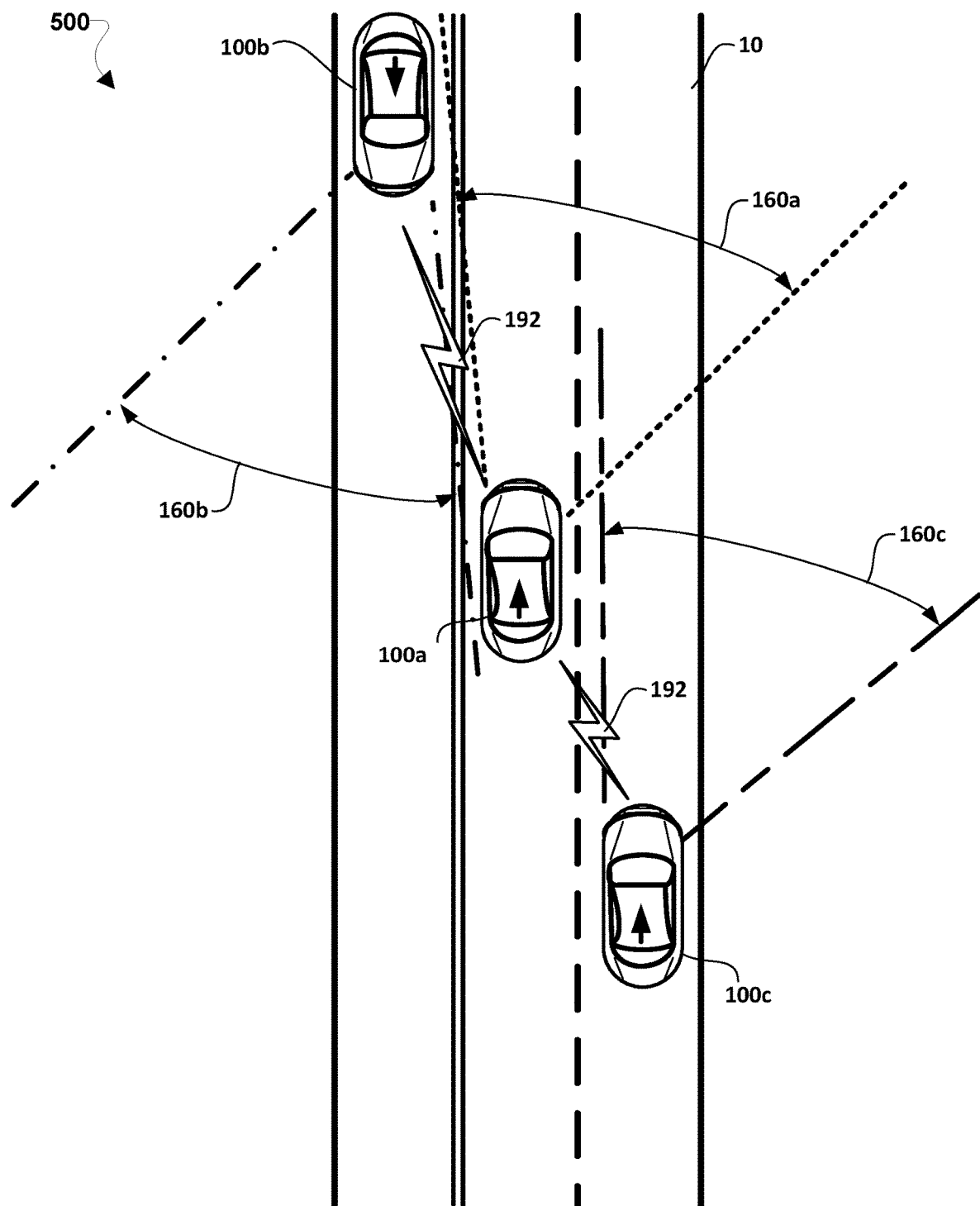

FIGS. 5A and 5B illustrate an environment 500 in which two vehicles 100a, 100b are using collaborative headlight directing. FIG. 5C illustrates the same environment 500, but with an additional vehicle 100c approaching the other two vehicles 100a, 100b. With reference to FIGS. 1-5A and 5C, the vehicle (e.g., 100) described above may represent any or all of the vehicles 100a, 100b, 100c. The environment 500 includes the three vehicles 100a, 100b, 100c, one of which is traveling in an opposite direction to the other two on a roadway 10 (i.e., a pathway). The roadway 10 happens to be a three-lane road, with one lane (i.e., the furthest left lane in the orientation shown in FIGS. 5A-5C) dedicated to travel in one direction and two lanes (i.e., the two right lanes in the orientation shown in FIGS. 5A-5C). The methods and systems of various embodiments may be applied to any pathway, whether or not it is a paved and clearly marked road.

With reference to FIG. 5A, the two vehicles 100a, 100b are traveling along the roadway 10, in opposite directions. Each of the first vehicle 100a and the second vehicle 100b has its headlights 160a, 160b aimed forward (i.e., in the direction of travel of each vehicle 100a, 100b, respectively). This results in an overlap zone 565 of the combined headlights 160a, 160b.

In accordance with various embodiments, either one of the two vehicles 100a, 100b may initiate a collaborative headlight directing arrangement. For example, a processor of the second vehicle 100b may determine whether the second vehicle 100b can collaborate with the first vehicle 100a, according to a collaborative lighting plan. In response to determining that the second vehicle 100b can collaborate with the first vehicle 100a according to the collaborative lighting plan, the second vehicle 100b may transmit to the first vehicle 100a a first collaborative lighting message via the wireless communication link 192. While the wireless communication link 192 may be an RF communication, alternatively, the communication link 192 may use signaling embedded in the beams from the vehicle headlights 160a, 160b. Unique identifiers (IDs) or fingerprints may be encoded in each vehicle's headlights 160a, 160b using visible-light-based communication methods. In this way, each vehicle may observe, through visible-light-based communications, messages for collaborating headlight directing along with vehicle IDs from other vehicles whose headlights include such encoding. Thus, vehicles may transmit collaborative lighting messages that include vehicle IDs to facilitate collaboration between any two vehicles. Optionally vehicle IDs may change (e.g., rotate) on a regular basis (e.g., hourly or daily) to preserve privacy and prevent tracking by visible-light communication receivers along the roadway. In some embodiments, vehicle IDs may be encoded in vehicle headlight emissions to supplement RF communications of messages for collaborating headlight directing to enable vehicles to correlate RF communications to particular vehicles, which may facilitate collaborating headlight directing when there are many vehicles in the area.

Once the first vehicle receives first collaborative lighting message, like the second vehicle 100b, the first vehicle 100a may determine whether the first vehicle 100a can collaborate with the second vehicle 100b, according to the collaborative lighting plan. In response to determining that the first vehicle 100a can collaborate with the second vehicle 100b according to the collaborative lighting plan, the first vehicle 100b may transmit to the second vehicle 100b a second collaborative lighting message via the wireless communication link 192. The second collaborative lighting message may indicate that the first vehicle 100a can collaborate with the second vehicle 100b according to the collaborative lighting plan. Receipt of the second collaborative lighting message by the second vehicle 100b may indicate to the second vehicle 100b that the first vehicle agrees to follow the collaborative lighting plan. For example, the second vehicle 100b may transmit an RF-based and/or visible-light-based acknowledgement and/or agreement message to the first vehicle 100a, optionally using an encoded vehicle ID for the first vehicle 100a so that the first vehicle can confirm that the second vehicle 100b is responding to the correct collaborative lighting plan communication.

With reference to FIG. 5B, the two vehicles 100a, 100b have each now directed their headlights 160a, 160b according to the collaborative lighting plan, which in this instance directed one or more of the headlights 160a, 160b toward a shoulder on their respective sides of the road. In this way, the two vehicles 100a, 100b directed their headlights away from aiming almost directly at one another. In addition, the collaborative lighting plan provides more illumination to the off-road areas, to each side of the roadway 10, which may reveal objects or creatures in those areas. Alternatively, an adjustable beam headlight system may be able to narrow the beams of one or more of the headlights, allowing the headlight to be directed so as to avoid the oncoming vehicle without illuminating so much of the off-road areas alongside the roadway 10.

With reference to FIG. 5C, the third vehicle 100c is overtaking the first vehicle 100a just as the first vehicle 100a was passing the second vehicle 100b. In accordance with various embodiments, a processor of the third vehicle 100c, as it approaches the first vehicle 100a, may determine whether the third vehicle 100c can collaborate with the first vehicle 100a, according to a new collaborative lighting plan, which may not be the same as the existing collaborative lightly plans. Alternatively, if the second vehicle 100b is within visual and communications range of the third vehicle 100c, the third vehicle 100c may determine whether it can collaborate with the second vehicle 100b as well. For purposes of this example, it is assumed that the third vehicle did not attempt to collaborate with the second vehicle.

In response to the third vehicle 100c determining that it can collaborate with the first vehicle 100a, according to a new collaborative lighting plan, the third vehicle 100c may transmit to the first vehicle 100a a third collaborative lighting message via the wireless communication link 192. Once the first vehicle receives third collaborative lighting message, like the third vehicle 100c, the first vehicle 100a may determine whether the first vehicle 100a can collaborate with the third vehicle 100c, according to the new collaborative lighting plan. In this instance, since the first and second vehicles 100a, 100b are still in the process of executing the collaborating lighting plan initiated by the second vehicle 100b, the first vehicle 100a may not be able to accept the new collaborative lighting plan received from the third vehicle 100c.

In response to determining that the first vehicle 100a cannot use the new collaborative lighting plan, the first vehicle 100b may transmit to the second and third vehicles 100b, 100c an updated collaborative lighting plan via the wireless communication links 192. The updated collaborative lighting plan may incorporate headlight directing by the third vehicle into the original collaborative lighting plan between the first and second vehicles 100a, 100b. In this instance, following receipt of the updated collaborative lighting plan, the first and second vehicles 100a, 100b maintained the headlight directing configuration of the original collaborative lighting plan, while the third vehicle 100c directed one or more of its headlights toward the right shoulder, avoiding overlap or significant overlap with one or more of the headlights 160a of the first vehicle 100a.

FIGS. 6A, 6B, 6C, 7A, 7B, 7C, 8, and/or 9 illustrate operations of methods 600, 603, 605, 700, 703, and 705, respectively, for collaborative headlight directing between vehicles in accordance with various embodiments. With reference to FIGS. 1A-9, the methods 600, 603, 605, 700, 703, and 705 may be implemented in a processor (e.g., 164), a processing device (e.g., 300), and/or a control unit (e.g., 104) (variously referred to as a "processor") of a vehicle (e.g., 100, 100a, 100b, or 100c). In some embodiments, the methods 600, 603, 605, 700, 703, and 705 may be performed by one or more layers within a vehicle management system stack, such as a vehicle management system (e.g., 200, 250). In some embodiments, the methods 600, 603, 605, 700, 703, and 705 may be performed by a processor independently from, but in conjunction with, a vehicle control system stack, such as the vehicle management system. For example, the methods 600, 603, 605, 700, 703, and 705 may be implemented as a stand-alone software module or within dedicated hardware that monitors data and commands from/within the vehicle management system and is configured to take actions and store data as described.

Figure 6A:
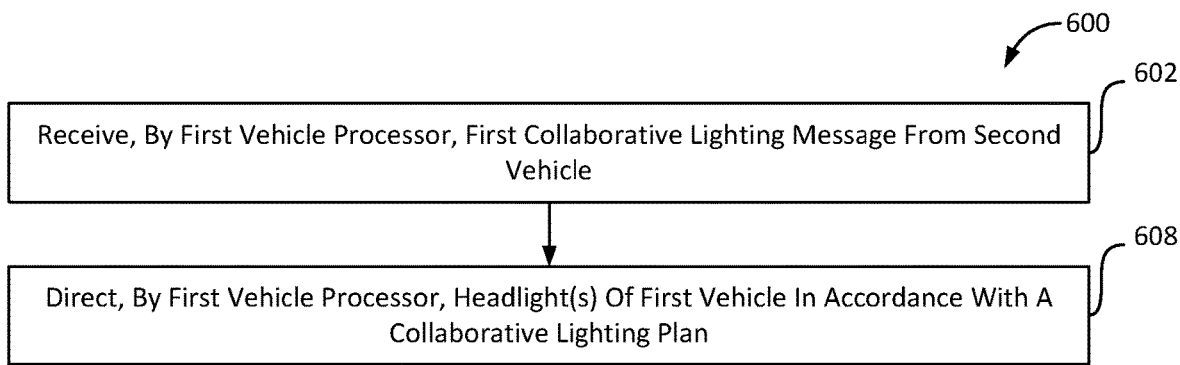
FIGS. 6A, 6B, and/or 6C are process flow diagrams of example methods for collaborative headlight directing between vehicles according to various embodiments.
Figure 7A:
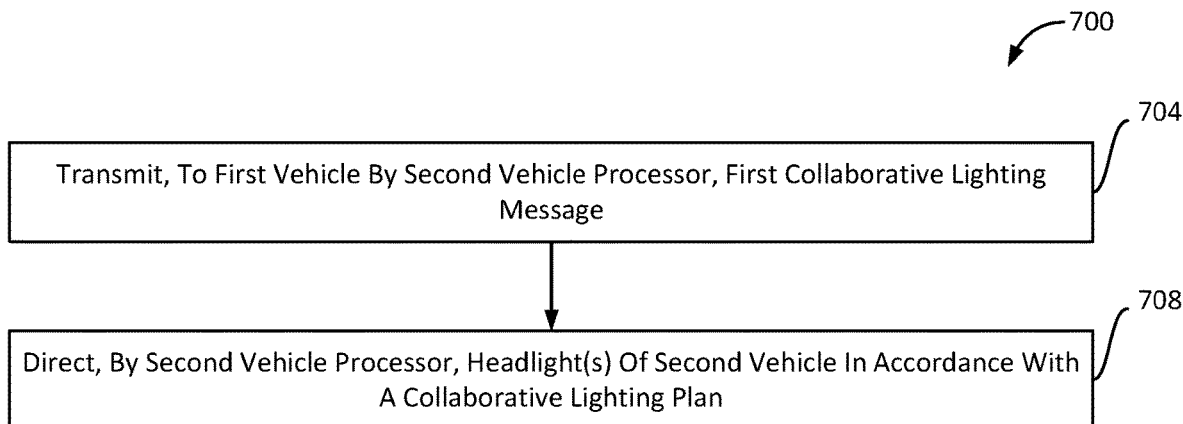
FIGS. 7A, 7B, and/or 7C are process flow diagrams of example methods for collaborative headlight directing between vehicles according to some embodiments.
Figure 7B:
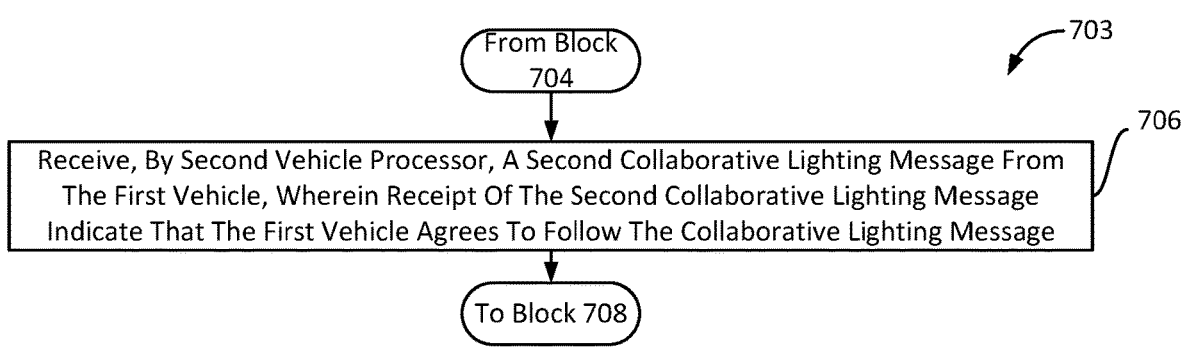
Figure 7C:
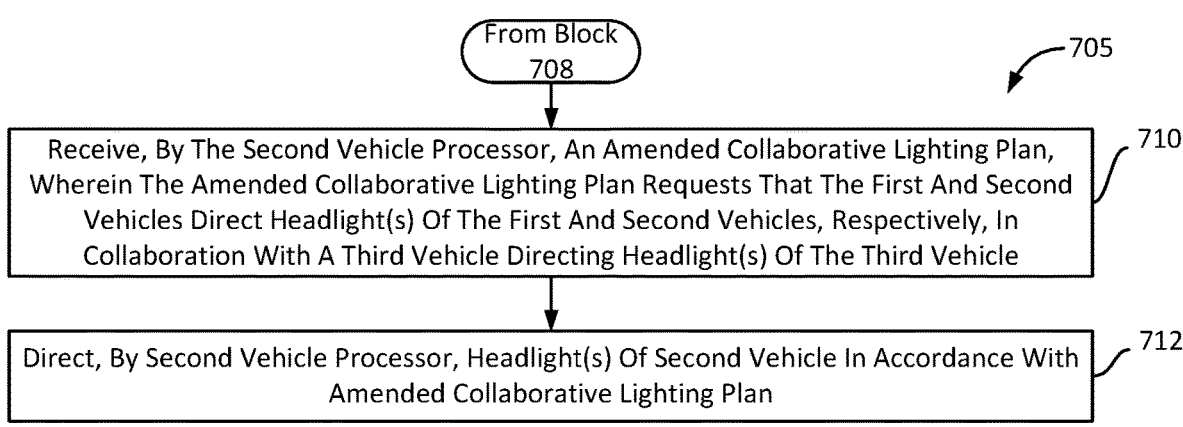
Figure 8:
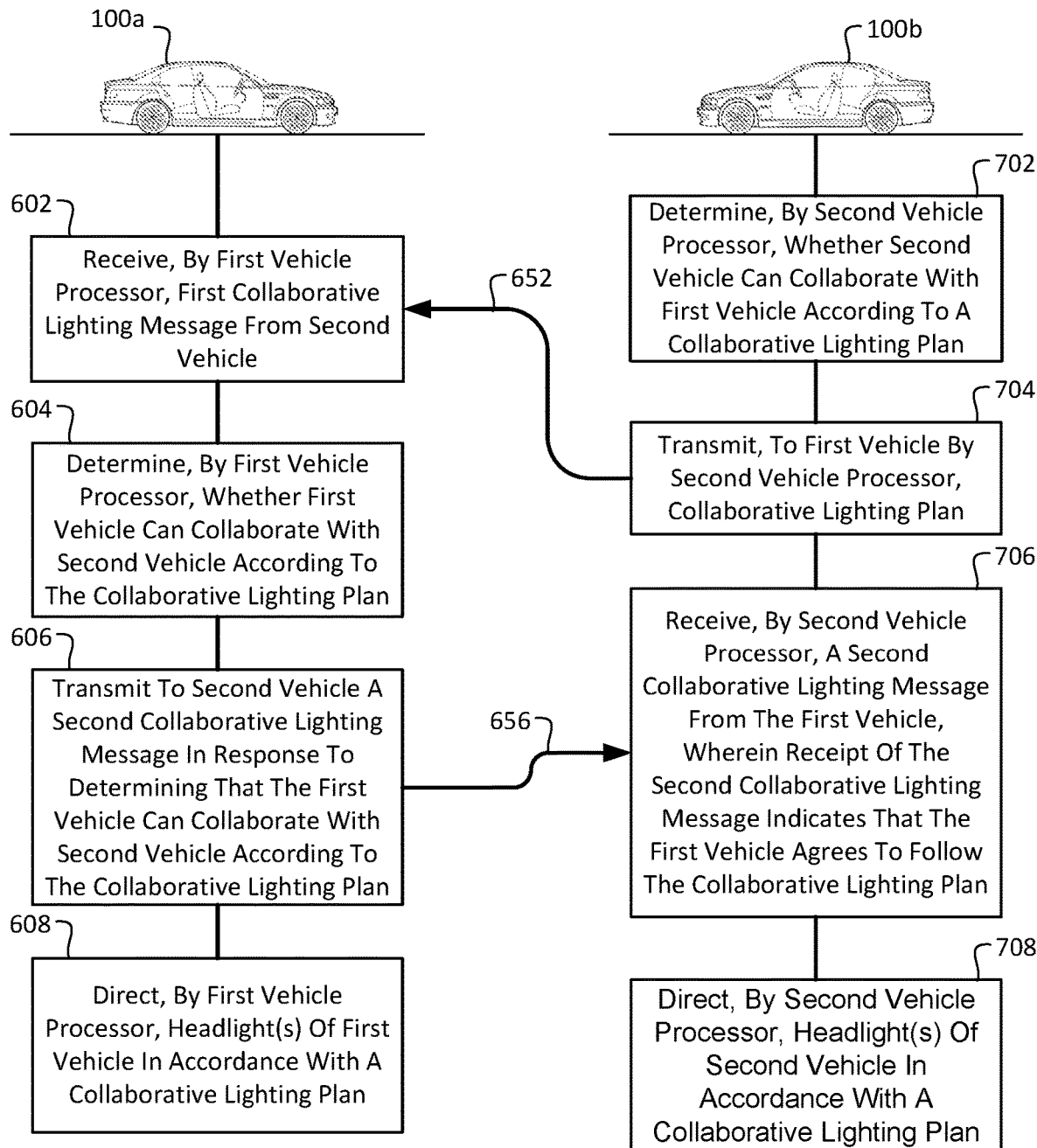
FIG. 8 is a communication flow diagram of example communication exchanges for collaborative headlight directing between two vehicles according to some embodiments.

FIGS. 6A and 8 illustrates a method 600 of collaborative headlight directing between vehicles in accordance with various embodiments. Operations of the method 600 are also illustrated in FIG. 8, which shows interactions between a first vehicle 100a implementing the method 600 and another (i.e., second) vehicle 100b implementing the method 700 illustrated in FIG. 7. Operations in the blocks shown in FIG. 8 correspond to the operations of methods 600 and 700 for like numbered blocks described below.

In block 602, a first vehicle processor may receive a first collaborative lighting message 652 from a second vehicle. The first collaborative lighting message 652 may request that the first vehicle direct one or more headlights of the first vehicle, in collaboration with the second vehicle directing one or more headlights of the second vehicle according to a collaborative lighting plan.

In block 608, the first vehicle processor may direct one or more of the headlights of the first vehicle in accordance with the collaborative lighting plan.

In some embodiments, the processor may repeat the operations in blocks 602 and 608 to periodically or continuously direct one or more headlights collaboratively according to a collaborative lighting plan until the plan is completed or cancelled by either vehicle.

Figure 6B:
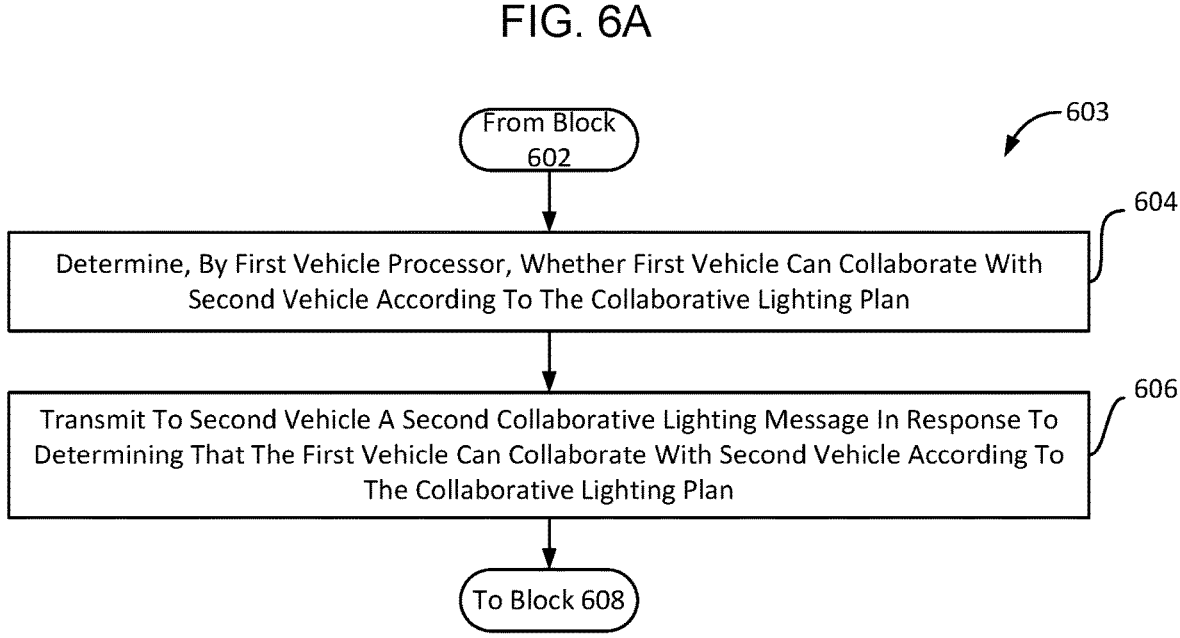

FIGS. 6B and 8 illustrate a method 603 of collaborative headlight directing between vehicles in accordance with some embodiments.

In block 604, following the operations of block 602 in the method 600, the processor of the first vehicle may determine whether the first vehicle can collaborate with the second vehicle according to the collaborative lighting plan.

In block 606, the processor may transmit to the second vehicle a second collaborative lighting message 656 in response to determining that the first vehicle can collaborate with the second vehicle according to the collaborative lighting plan.

In some embodiments, the processor may repeat any or all of the operations in blocks 604 and 606 to repeatedly or continuously direct one or more headlights collaboratively according to a collaborative lighting plan until the plan is completed or cancelled by either vehicle.

Figure 6C:
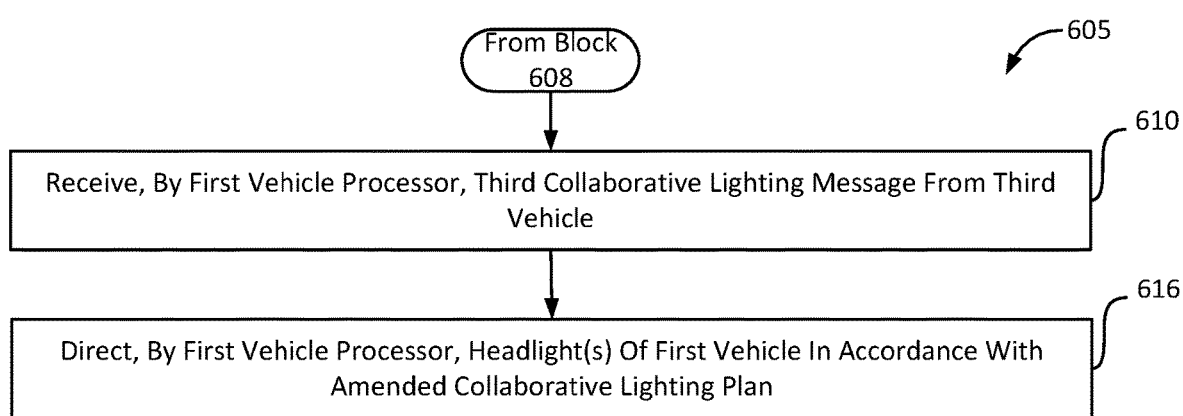
Figure 9:
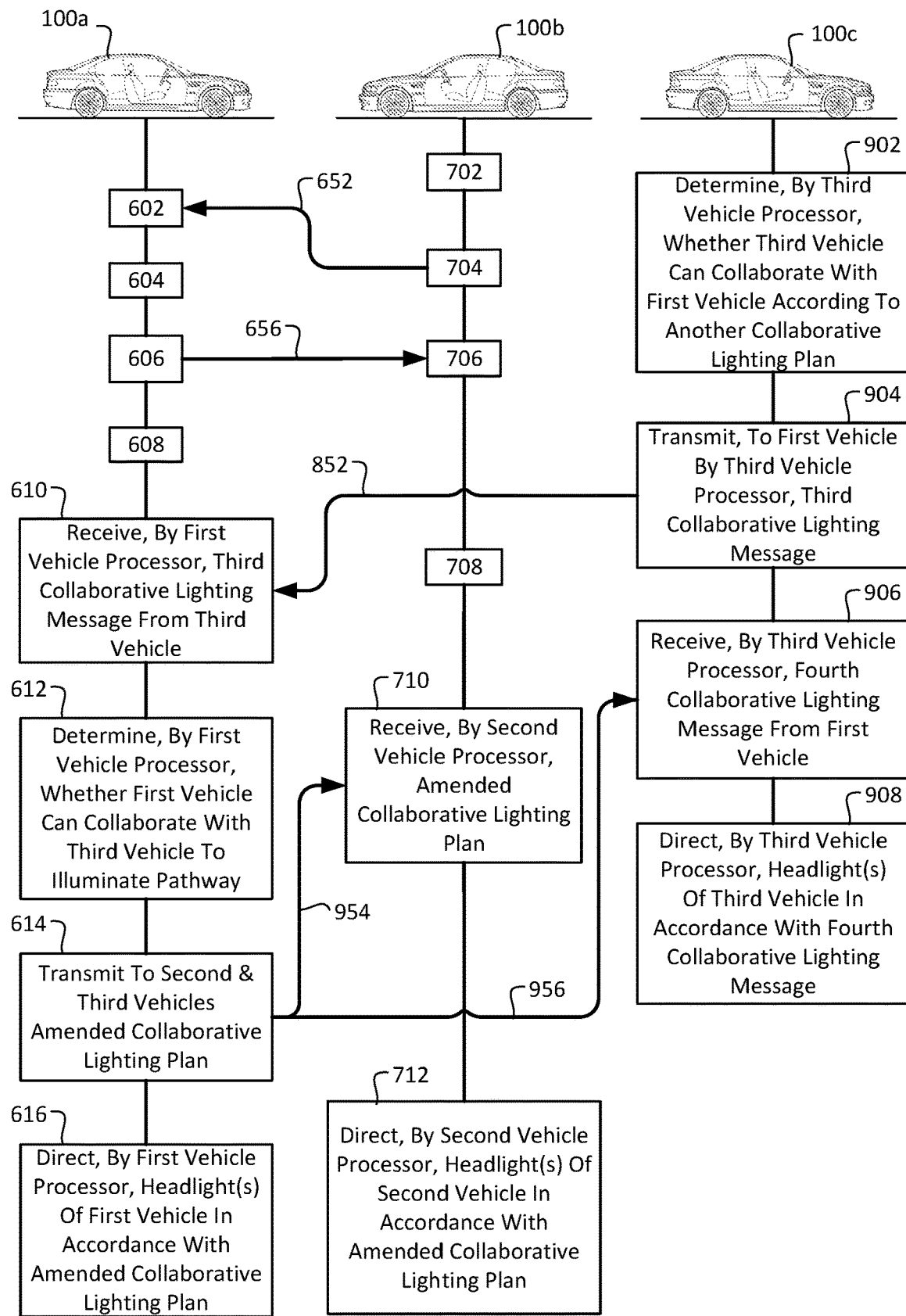
FIG. 9 is a communication flow diagram of communication exchanges for collaborative headlight directing between three or more vehicles according to some embodiments.

FIGS. 6C and 9 illustrate method 605 of collaborative headlight directing between vehicles in accordance with some embodiments.

In block 610, the processor may perform operations including receiving, by the first vehicle processor, a third collaborative lighting message 852 from a third vehicle. The third collaborative lighting message 852 may request the first and/or second vehicle(s) direct one or more headlights of the first and/or second vehicle(s), respectively, in collaboration with the third vehicle directing one or more headlights of the third vehicle according to an amended collaborative lighting plan.

In block 616, the processor may perform operations including directing, by the first vehicle processor, one or more of the headlights of the first vehicle in accordance with the amended collaborative lighting plan.

In some embodiments, the processor may repeat any or all of the operations in blocks 610 and 616 to repeatedly or continuously direct one or more headlights collaboratively according to a collaborative lighting plan until the plan is completed or cancelled by either vehicle.

FIGS. 7A and 8 illustrate a method 700 of collaborative headlight directing between vehicles in accordance with some embodiments.

In block 704, a second vehicle processor may transmit to the first vehicle the first collaborative lighting message 652. The first collaborative lighting message 652 may request the first vehicle direct one or more headlights of the first vehicle, in collaboration with the second vehicle directing one or more headlights of the second vehicle according to a collaborative lighting plan.

In block 708, the second vehicle processor may direct one or more of the headlights of the second vehicle in accordance with the collaborative lighting plan.

In some embodiments, the processor may repeat any or all of the operations in blocks 704 and 708 to repeatedly or continuously direct one or more headlights collaboratively according to a collaborative lighting plan until the plan is completed or cancelled by either vehicle.

FIGS. 7B and 8 illustrate a method 703 of collaborative headlight directing between vehicles in accordance with some embodiments.

In block 706, the second vehicle processor may receive a second collaborative lighting message 656 from the first vehicle. Receipt of the second collaborative lighting message 656 may indicate that the first vehicle agrees to follow the collaborative lighting plan. In this way, directing one or more of the headlights of the second vehicle in accordance with the collaborative lighting plan may be in response to receiving the second collaborative lighting message 656.

In some embodiments, the processor may repeat any or all of the operations in blocks 706 to repeatedly or continuously direct one or more headlights collaboratively according to a collaborative lighting plan until the plan is completed or cancelled by either vehicle.

FIGS. 7C and 9 illustrate a method 705 of collaborative headlight directing between three vehicles in accordance with some embodiments. Operations of the methods 600, 700 and 705 are also illustrated in FIG. 9, which shows interactions between a first vehicle 100a implementing method 600, a second vehicle 100b implementing the method 700, and a third vehicle 100b implementing the method 705. Operations in the blocks shown in FIG. 8 correspond to the operations of methods 600 and 700 for like numbered blocks described below.

In block 710, the second vehicle processor may transmit an amended collaborative lighting plan by way of a fourth collaborative lighting message 954. The amended collaborative lighting plan may request that the first and second vehicles direct one or more headlights of the first and second vehicles, respectively, in collaboration with a third vehicle directing one or more headlights of the third vehicle.

In block 712, the second vehicle processor may direct one or more headlights of the second vehicle in accordance with the amended collaborative lighting plan.

In some embodiments, the second vehicle processor may repeat any or all of the operations in blocks 710 and 712 to repeatedly or continuously direct one or more headlights collaboratively according to a collaborative lighting plan until the plan is completed or cancelled by either vehicle.

FIG. 8 illustrates an additional operation that may be performed by the processor of the second vehicle when initiating collaborative headlight directing between vehicles in accordance with some embodiments.

In block 702, the processor of the second vehicle may determine whether the second vehicle can collaborate with the first vehicle according to a collaborative lighting plan. As part of the operations in block 702, the processor of the second vehicle may determine elements of a collaborative lighting plan that can be implemented by both the first vehicle and the second vehicle (i.e., to enable collaboration on lighting).

In some embodiments, the processor may repeat any or all of the operations illustrated in FIG. 8 to repeatedly or continuously direct one or more headlights collaboratively according to a collaborative lighting plan.

FIG. 9 illustrates addition elements of collaborative headlight directing between vehicles in accordance with some embodiments.

In block 612, the processor of the first vehicle may determine whether the first vehicle can collaborate with the third vehicle to illuminate a roadway.

In block 614, the first vehicle processor may transmit to the second vehicle a fourth collaborative lighting message 954 and transmit to the third vehicle a fifth collaborative lighting message 956 in response to determining that the first vehicle can collaborate with the second and third vehicles according to an amended collaborative lighting plan.

In block 902, the processor of the third vehicle may determine whether the third vehicle can collaborate with the first vehicle according to another collaborative lighting plan.

In block 904, the third vehicle processor may transmit to the first vehicle a third collaborative lighting message 852. The third collaborative lighting message 852 may request the first vehicle direct one or more headlights of the first vehicle, in collaboration with the third vehicle directing one or more headlights of the third vehicle according to another collaborative lighting plan.

In block 906, the third vehicle processor may receive a fifth collaborative lighting message 956 from the first vehicle. Receipt of the fifth collaborative lighting message 956 may indicate that the first vehicle agrees to follow an amended collaborative lighting plan. In this way, directing one or more of the headlights of the third vehicle in accordance with the amended collaborative lighting plan may be in response to receiving the fifth collaborative lighting message 956.

In block 908, the third vehicle processor may direct one or more of the headlights of the third vehicle in accordance with the amended collaborative lighting plan.

In some embodiments, the processors of the first, second and third vehicles may repeat any or all of the operations illustrated in FIG. 9 to repeatedly or continuously direct one or more headlights collaboratively according to a collaborative lighting plan until the plan is completed or cancelled by either vehicle.

Figure 10A:
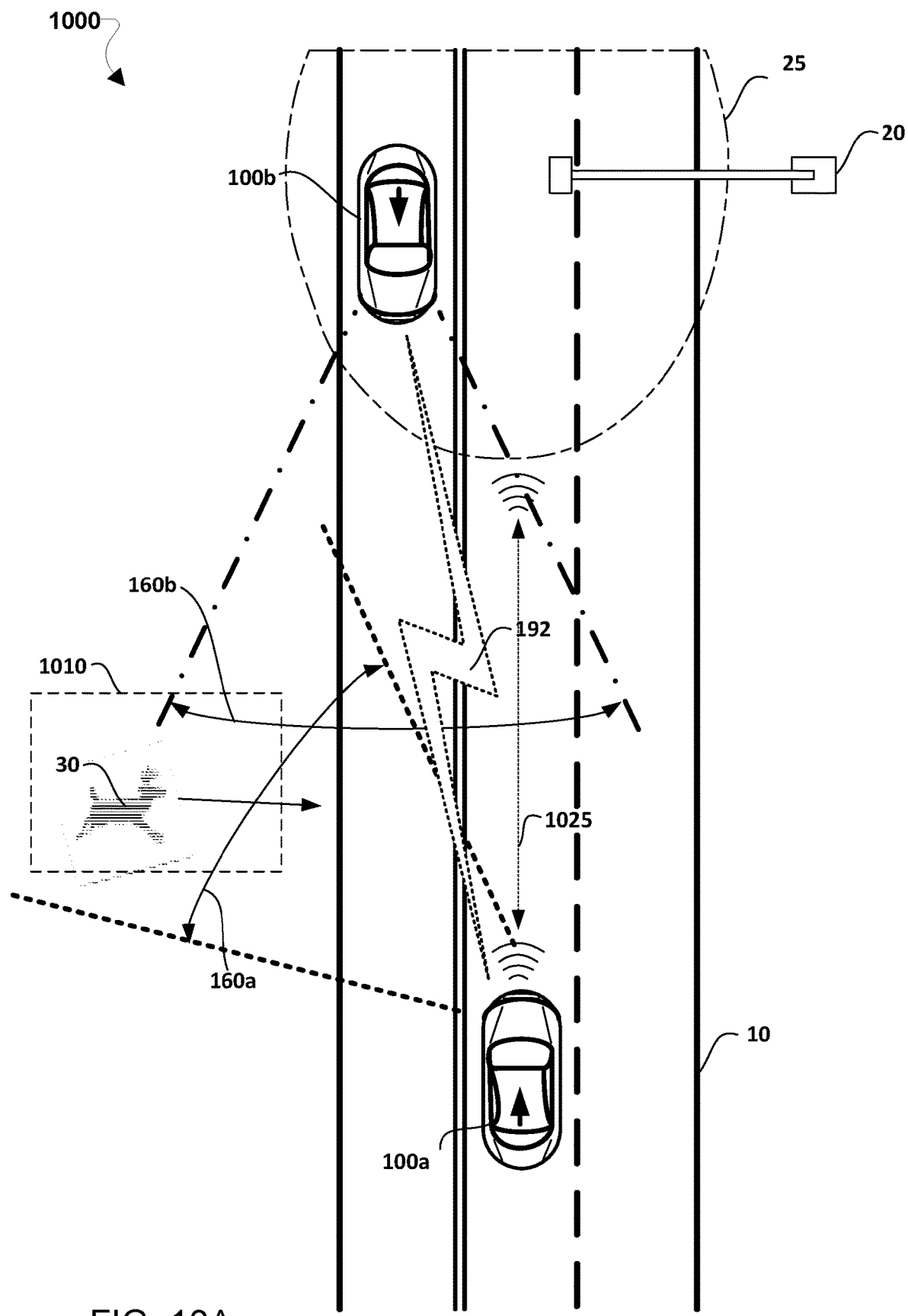
FIGS. 10A and 10B illustrate examples of vehicles directing one or more headlights to follow a collaborative lighting plan in accordance with some embodiments.
Figure 10B:
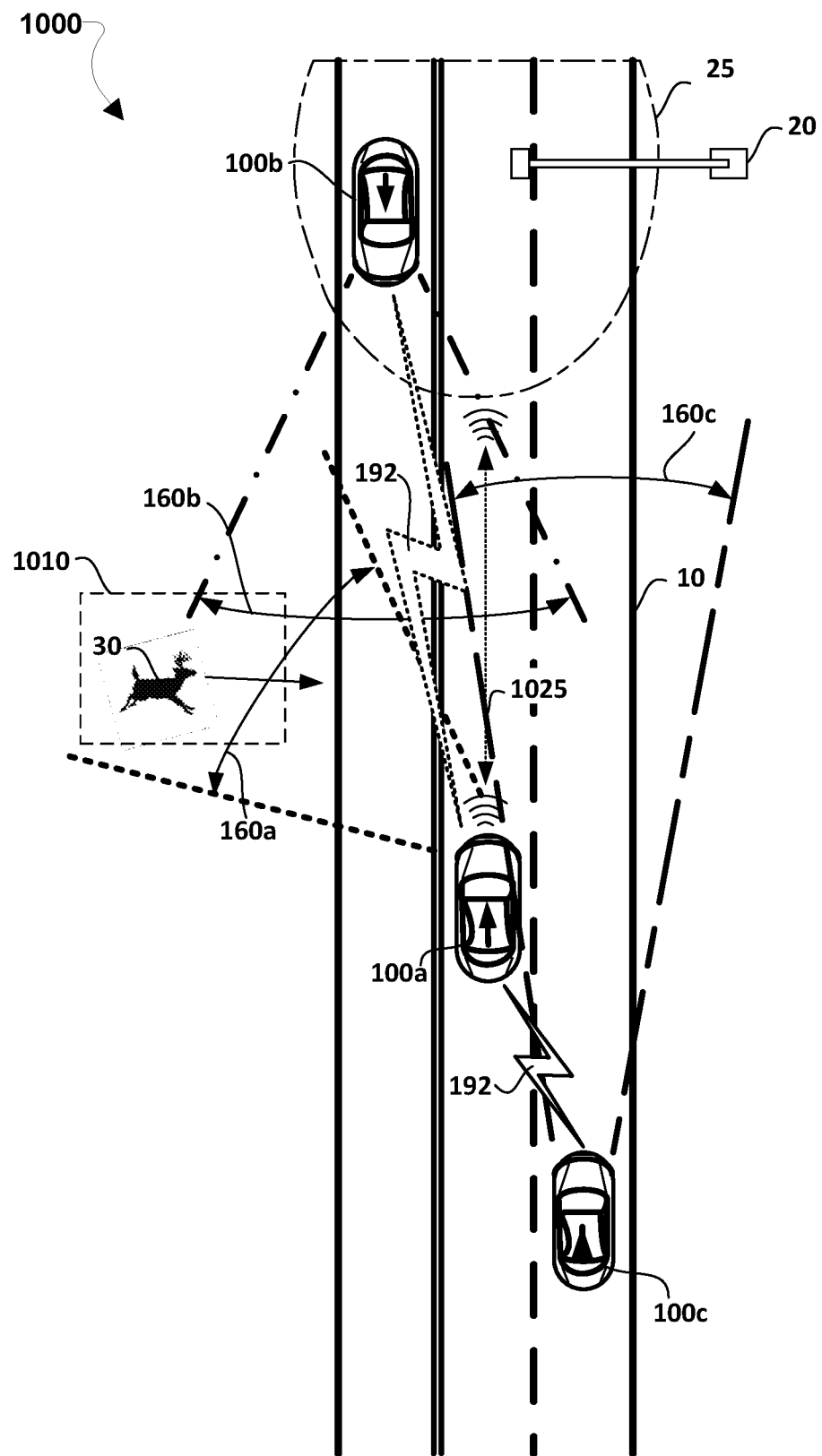

FIG. 10A illustrates an environment 1000 in which two vehicles 100a, 100b are using collaborative headlight directing. FIG. 10B illustrates the same environment 1000, but with an additional vehicle 100c approaching the other two vehicles 100a, 100b. With reference to FIGS. 1-10A and 10B, the vehicle (e.g., 100) described above may represent any or all of the vehicles 100a, 100b, 100c. The environment 1000 includes the two vehicle 100a, 100b in FIG. 10A and three vehicles 100a, 100b, 100c in FIG. 10B, one of which is traveling in an opposite direction to the other two on a roadway 10 (i.e., a pathway). In the illustrated example, the roadway 10 is a three-lane road, with one lane (i.e., the furthest left lane in the orientation shown in FIGS. 10A and 10B) dedicated to travel in one direction and two lanes (i.e., the two right lanes in the orientation shown in FIGS. 10A and 10B). In addition, in FIGS. 10A and 10B an object 30 (illustrated as a galloping dear) located off to one side of the road and moving toward the roadway 10. Although the roadway 10 is illustrated as a paved highway, the methods and systems of various embodiments may be applied to any pathway, whether or not it is a paved and/or clearly marked road.

With reference to FIG. 10A, the two vehicles 100a, 100b are traveling along the roadway 10 in opposite directions. The first vehicle 100a is illustrated as having directed its headlights 160a toward a target area of uncertainty 1010 in which the object is located or headed toward. The second vehicle 100b is illustrated as having its headlights 160b aimed forward (i.e., in the direction of travel of the second vehicle 100b). The roadway 10 is illustrated as including a streetlight 20 providing illumination in a lit region 25 that covers a portion of the roadway 10.

In accordance with various embodiments, either of the two vehicles 100a, 100b may detect the target area of uncertainty 1010. Processors of the vehicles 100a, 100b may repeatedly, continuously, periodically, or otherwise scan the vehicle surroundings (i.e., on the roadway 10 and off-road in the surrounding areas) for conditions in an area that might be considered a target area of uncertainty (e.g., 1010). In the example illustrated in FIG. 10A, the second vehicle 100b first detected the target area of uncertainty 1010.

In response to the second vehicle 100b detecting the target area of uncertainty 1010, the second vehicle 100b may transmit to the first vehicle 100a a first-vehicle collaborative lighting message via the wireless communication link 192. The first-vehicle collaborative lighting message may include a collaborative lighting plan that directs the first vehicle 100a to direct one or more of its headlights toward the target area of uncertainty.

Once the first vehicle receives the first-vehicle collaborative lighting message, the first vehicle 100a may check whether the first vehicle 100a can collaborate with the second vehicle 100b, according to the collaborative lighting plan. In particular, before directing one or more of its headlights away from the roadway ahead, the first vehicle 100a may assess the lighting conditions in the roadway ahead to determine whether those roadway lighting conditions are above a minimum illumination threshold. The minimum illumination threshold for directing lights away from a roadway and toward a target area of uncertainty, located off the roadway, may be the same as the minimum illumination threshold used to determine whether an area is a target area of uncertainty. Alternatively, the minimum illumination threshold for directing one or more headlights away from a roadway may be higher or lower than the minimum illumination threshold used to determine whether an area is a target area of uncertainty. In the example illustrated in FIG. 10A, using an illumination sensor reading 1025, the second vehicle 100b processor may detect the lit region 25 that covers a portion of the roadway 10 ahead, which may be above the relevant minimum illumination threshold.

In response to a processor of the first vehicle 100a determining that the first vehicle 100a can collaborate with the second vehicle 100b according to the collaborative lighting plan, the first vehicle 100a may direct one or more of the headlights of the first vehicle to illuminate the target area of uncertainty 1010 in accordance with the first-vehicle collaborative lighting message. Alternatively, in response to determining that the first vehicle 100a can collaborate with the second vehicle 100b according to the collaborative lighting plan, the second vehicle 100b may transmit to the first vehicle 100a a second-vehicle collaborative lighting message via the wireless communication link 192. The second-vehicle collaborative lighting message may indicate that the first vehicle 100a can collaborate with the second vehicle 100b according to the collaborative lighting plan. Receipt of the second-vehicle collaborative lighting message by the second vehicle 100b may indicate to the second vehicle 100b that the first vehicle agrees to follow the initial collaborative lighting plan.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

In the example illustrated in FIG. 10B, the third vehicle 100c is trailing close behind the first vehicle 100a, just as the first vehicle 100a is about to pass the second vehicle 100b. In some embodiments, a processor of the first vehicle 100a, detecting the third vehicle 100c following closely behind, may attempt to enlist collaborative lighting assistance from the third vehicle. Since the initial collaborative lighting plan transmitted by the second vehicle 100b has the first vehicle directing its headlights away from the roadway 10, the first vehicle 100a may request that the third vehicle 100c maintain or increase an illumination level of a roadway area in the direction of travel of the first vehicle. For example, the third vehicle 100c may put on its high-beams, or if available, narrow and extend the beam-width of its headlights to increase the illumination level in a portion of the roadway 10 that is further ahead. Thus, the first vehicle 100a may transmit a third-vehicle collaborative lighting message to the third vehicle 100c that asks the third vehicle 100c to maintain or increase an illumination level of a roadway area in the direction of travel of the first vehicle 100a.

Once the third vehicle receives the third-vehicle collaborative lighting message, the third vehicle 100c may check whether the third vehicle 100c can collaborate with the first vehicle 100a as requested. In response to the third vehicle 100c determining that it can collaborate with the first vehicle 100a according to an extended collaborative lighting plan, the third vehicle 100c may transmit to the first vehicle 100a a collaborative lighting message via the wireless communication link 192, which agrees to comply with the third-vehicle collaborative lighting message. The third vehicle 100c may then maintain or increase an illumination level of a roadway area in the direction of travel of the first vehicle using one or more of the headlights 160c of the third vehicle 100c. Once the first vehicle receives the collaborative lighting message response from the third vehicle, the first vehicle 100a may direct one or more of the headlights of the first vehicle to illuminate the target area in accordance with the first-vehicle collaborative lighting message and both the initial and extended collaborative lighting plans.

FIGS. 11A, 11B, 11C, 12A, 12B, 12C, 13A, 13B, 13C, and/or 14 illustrate operations of methods 1100, 1103, 1105, 1200, 1203, 1205, and 1207, respectively, for collaborative headlight directing between vehicles in accordance with various embodiments. With reference to FIGS. 1A-14, the methods 1100, 1103, 1105, 1200, 1203, 1205, and 1207 may be implemented in a processor (e.g., 164), a processing device (e.g., 300), and/or a control unit (e.g., 104) (variously referred to as a "processor") of a vehicle (e.g., 100, 100a, 100b, or 100c). In some embodiments, the methods 1100, 1103, 1105, 1200, 1203, 1205, and 1207 may be performed by one or more layers within a vehicle management system stack, such as a vehicle management system (e.g., 200, 250), etc. In some embodiments, the methods 1100, 1103, 1105, 1200, 1203, 1205, and 1207 may be performed by a processor independently from, but in conjunction with, a vehicle control system stack, such as the vehicle management system. For example, the methods 1100, 1103, 1105, 1200, 1203, 1205, and 1207 may be implemented as a stand-alone software module or within dedicated hardware that monitors data and commands from/within the vehicle management system and is configured to take actions and store data as described.

FIGS. 11A, 13A, 13B, 13C, and 14 illustrate a method 1100 of collaborative headlight directing between vehicles in accordance with various embodiments. Operations of the method 1100 are also illustrated in FIGS. 13A, 13B, 13C, and 14 which show interactions between a first vehicle 100a implementing the method 1100 and another (i.e., second) vehicle 100b implementing the method 1200 illustrated in FIGS. 12A, 12B, and 12C. Operations in the blocks shown in FIGS. 13A, 13B, 13C, 14 correspond to the operations of methods 1100 and 1200 for like numbered blocks described below.

In block 1102, a first vehicle processor may receive a first-vehicle collaborative lighting message 1252 from a second vehicle. The first-vehicle collaborative lighting message 1252 may request that the first vehicle direct one or more headlights of the first vehicle according to a collaborative lighting plan to illuminate a target area of uncertainty that is disposed, relative to the first vehicle, in a direction other than a direction of travel of the first vehicle. The first-vehicle collaborative lighting message 1252 may include location identification information of the target area for directing one or more of the headlights of the first vehicle. In addition or alternatively, the first-vehicle collaborative lighting message 1252 may include timing information for the request to illuminate the target area. The first-vehicle collaborative lighting message 1252 may have been sent by the second vehicle as a warning to the first vehicle related to a potential threat to the first vehicle located in the target area. The first-vehicle collaborative lighting message 1252 may include a collaborative lighting plan in which the second vehicle directs headlights of the second vehicle to illuminate a roadway area in the direction of travel of the first vehicle.

The first and second vehicles may be traveling in opposite directions, a same direction, or a different direction, depending upon the circumstances. The target area of uncertainty may represent an area of uncertainty about which the second vehicle is seeking more information to identify elements contained therein.

In block 1110, the first vehicle processor may direct one or more of the headlights of the first vehicle to illuminate the target area in accordance with the first-vehicle collaborative lighting message.

In some embodiments, the processor may repeat the operations in blocks 1102 and 1110 to periodically or continuously direct one or more headlights collaboratively according to a collaborative lighting plan until the plan is completed or cancelled by either vehicle.

FIGS. 11B, 13A, 13B, 13C, and 14 illustrate a method 1103 of collaborative headlight directing between vehicles in accordance with some embodiments.

In block 1104, following the operations of block 1102 in the method 1100, the processor of the first vehicle may determine whether the first vehicle can direct one or more headlights of the first vehicle to illuminate the target area of uncertainty that is disposed in a direction other than a direction of travel of the first vehicle. Following the operations in block 1104, the processor may perform the operations in block 1110 as described.

In some embodiments, the processor may repeat the operations in block 1104 repeatedly or continuously according to a collaborative lighting plan until the plan is completed or cancelled by either vehicle.

Figure 11A:
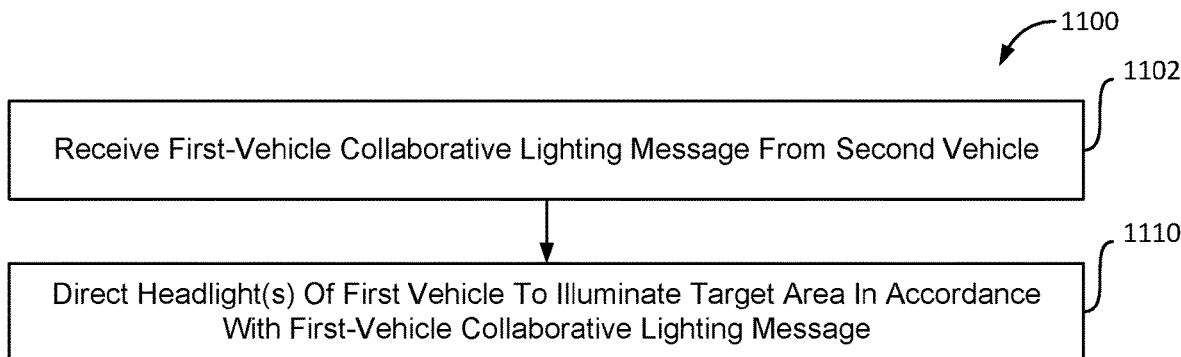
FIGS. 11A, 11B, and/or 11C are process flow diagrams of example methods for collaborative headlight directing between vehicles according to some embodiments.
Figure 11B:
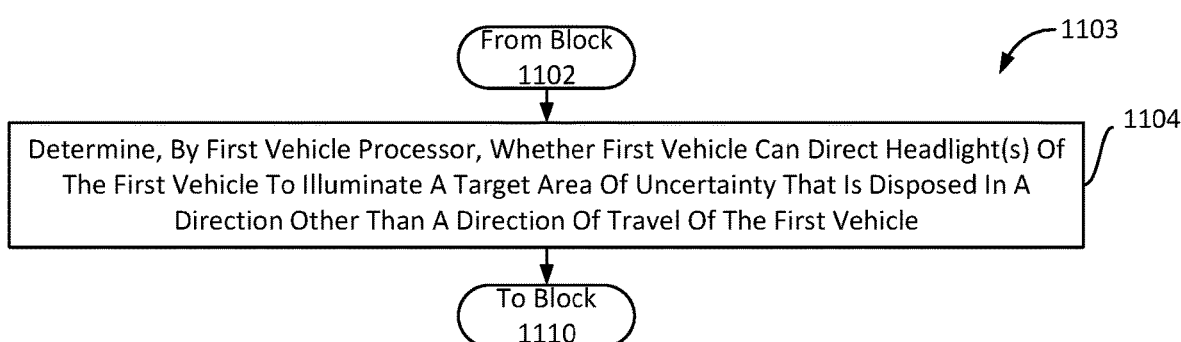
Figure 11C:
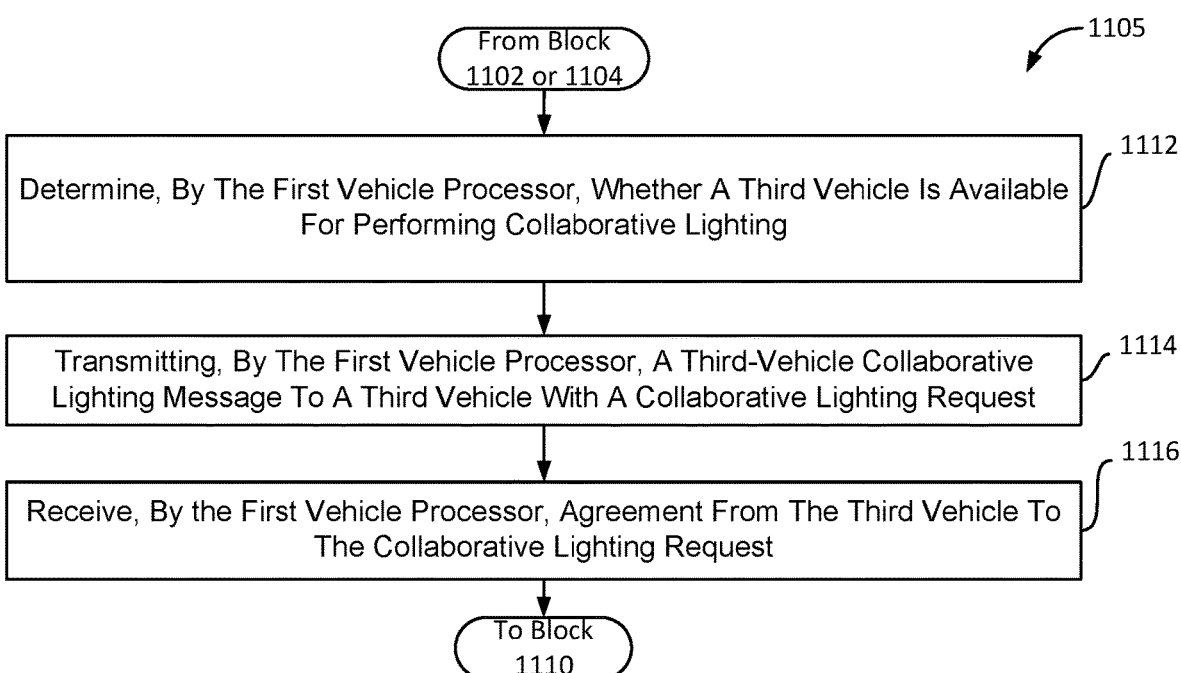
Figure 14:
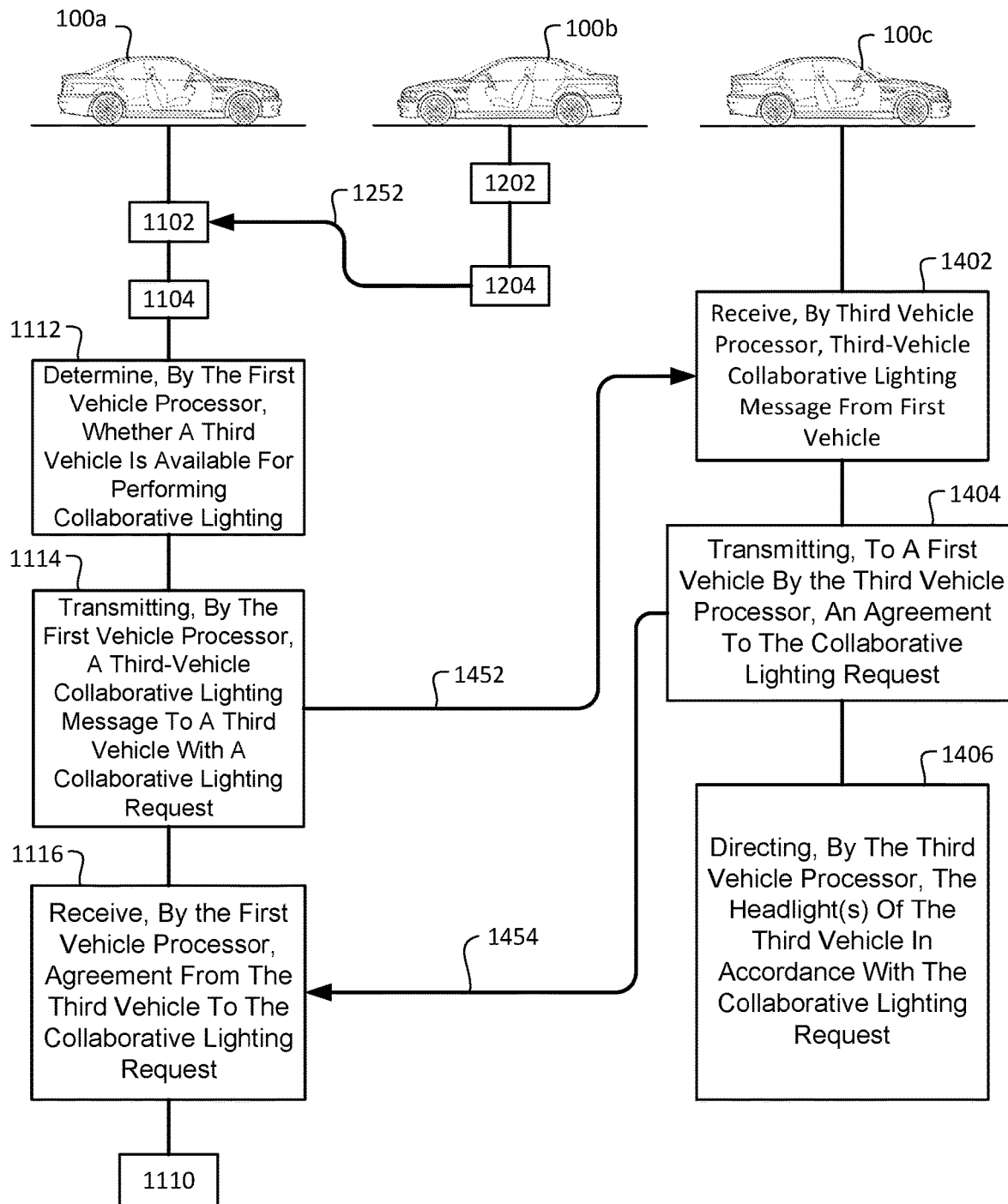
FIG. 14 is a communication flow diagram of communication exchanges for collaborative headlight directing between three or more vehicles according to some embodiments.

FIGS. 11C and 14 illustrate a method 1105 of collaborative headlight directing between vehicles in accordance with some embodiments.

In block 1112, following the operations of blocks 1102 or 1104 in the methods 1100 or 1103, respectively, the first vehicle processor may perform operations including determining whether a third vehicle is available for performing collaborative lighting.

In block 1114, the first vehicle processor may use a transceiver (e.g., 180) to transmit a third-vehicle collaborative lighting message 1452 to a third vehicle with a collaborative lighting request. The third-vehicle collaborative lighting message 1452 may request that the third vehicle maintain or increase an illumination level of a roadway area in the direction of travel of the first vehicle.

In block 1116, the first vehicle processor using the transceiver may receive agreement 1454 from the third vehicle to the collaborative lighting request 1452 transmitted in block 1114. Following the operations in block 1116, the processor may perform the operations in block 1110 as described.

In some embodiments, the processor may repeat any or all of the operations in blocks 1112, 1114, and 1116 to repeatedly or continuously direct one or more headlights collaboratively according to a collaborative lighting plan until the plan is completed or cancelled by either vehicle.

FIGS. 12A, 13A, 13B, 13C, and 14 illustrate a method 1200 of collaborative headlight directing between vehicles in accordance with some embodiments.

In block 1202, a processor of the second vehicle may detect a target area of uncertainty for which additional illumination is needed for a camera system to reduce an assessed uncertainty level. Detecting the target area of uncertainty may include detecting an object moving toward a roadway on which the first vehicle is traveling. In embodiments, detecting the target area of uncertainty may include determining a condition of interest exists in the area, determining that the lighting condition in the area are below the minimum illumination threshold, and determining that one or more other vehicles is in the region that may be able to assist in providing additional lighting.

The first and second vehicles may be traveling in opposite directions, a same direction, or a different direction, depending upon the circumstances. The target area of uncertainty may represent an area of uncertainty about which the second vehicle is seeking more information to identify elements contained therein. The target area of uncertainty may not be located on the roadway traveled by the second vehicle.

In block 1204, the second vehicle processor may use a transceiver (e.g., 180) to transmit to the first vehicle the first-vehicle collaborative lighting message 1252. The first-vehicle collaborative lighting message 1252 may request that the first vehicle direct one or more headlights of the first vehicle to illuminate the target area of uncertainty that is disposed, relative to the first vehicle, in a direction other than a direction of travel of the first vehicle. The first-vehicle collaborative lighting message 1252 may include a collaborative lighting plan that includes the first and second vehicles collaboratively directing one or more headlights to illuminate the target area of uncertainty. Alternatively or additionally, first-vehicle collaborative lighting message 1252 may include a collaborative lighting plan that includes the second vehicle illuminating the roadway in a direction of travel of the second vehicle.

In some embodiments, the processor may repeat the operations in blocks 1202 and 1204 to periodically or continuously direct one or more headlights collaboratively according to a collaborative lighting plan until the plan is completed or cancelled by either vehicle.

FIGS. 12B, 13A, 13B, and 13C illustrate a method 1103 of collaborative headlight directing between vehicles in accordance with some embodiments.

In block 1206, following the operations of block 1204 in the method 1203, the processor of the second vehicle may use the transceiver (e.g., 180) to receive a second collaborative lighting message 1254 from the first vehicle. The second collaborative lighting message 1254 may request that the second vehicle direct one or more headlights of the second vehicle to illuminate a roadway in a direction of travel of the first vehicle. In some circumstances, having the second vehicle illuminate the roadway for the first vehicle may enable the first vehicle to direct one or more of its headlights away from its direction of travel and towards a target are of uncertainty while receiving sufficient illumination of the roadway to navigate safely.

In optional block 1208, the processor of the second vehicle may use the transceiver to transmit to the first vehicle a first-vehicle collaborative lighting message 1256 requesting that the first vehicle direct one or more headlights of the first vehicle to illuminate the target area of uncertainty that is disposed, relative to the first vehicle, in a direction other than a direction of travel of the first vehicle.

In some embodiments, the processor may repeat the operations in block 1206 and optional block 1208 to periodically or continuously direct one or more headlights collaboratively according to a collaborative lighting plan until the plan is completed or cancelled by either vehicle.

Figure 12A:
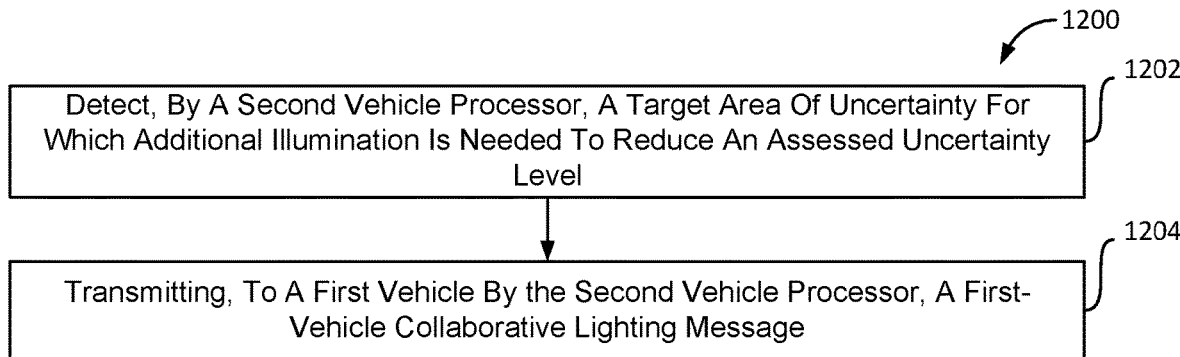
FIGS. 12A, 12B, 12C, and/or 12D are process flow diagrams of example methods for collaborative headlight directing between vehicles according to some embodiments.
Figure 12B:
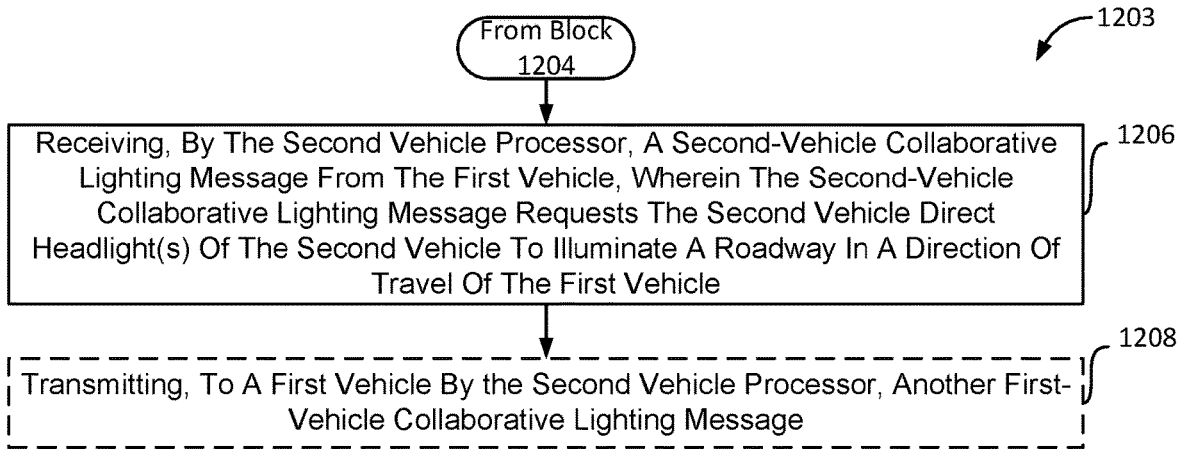
Figure 12C:
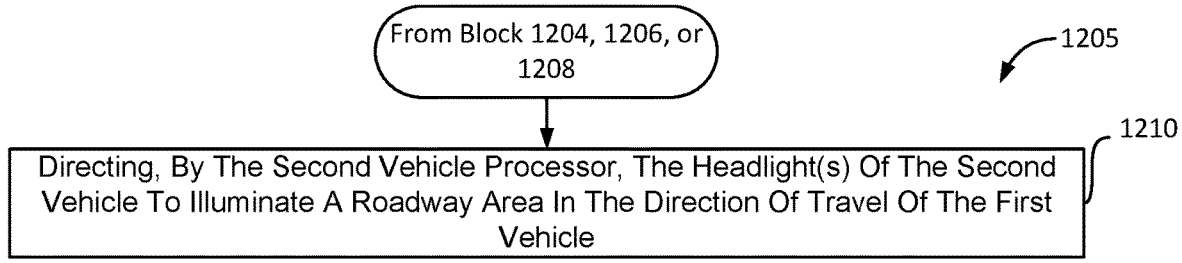
Figure 13A:
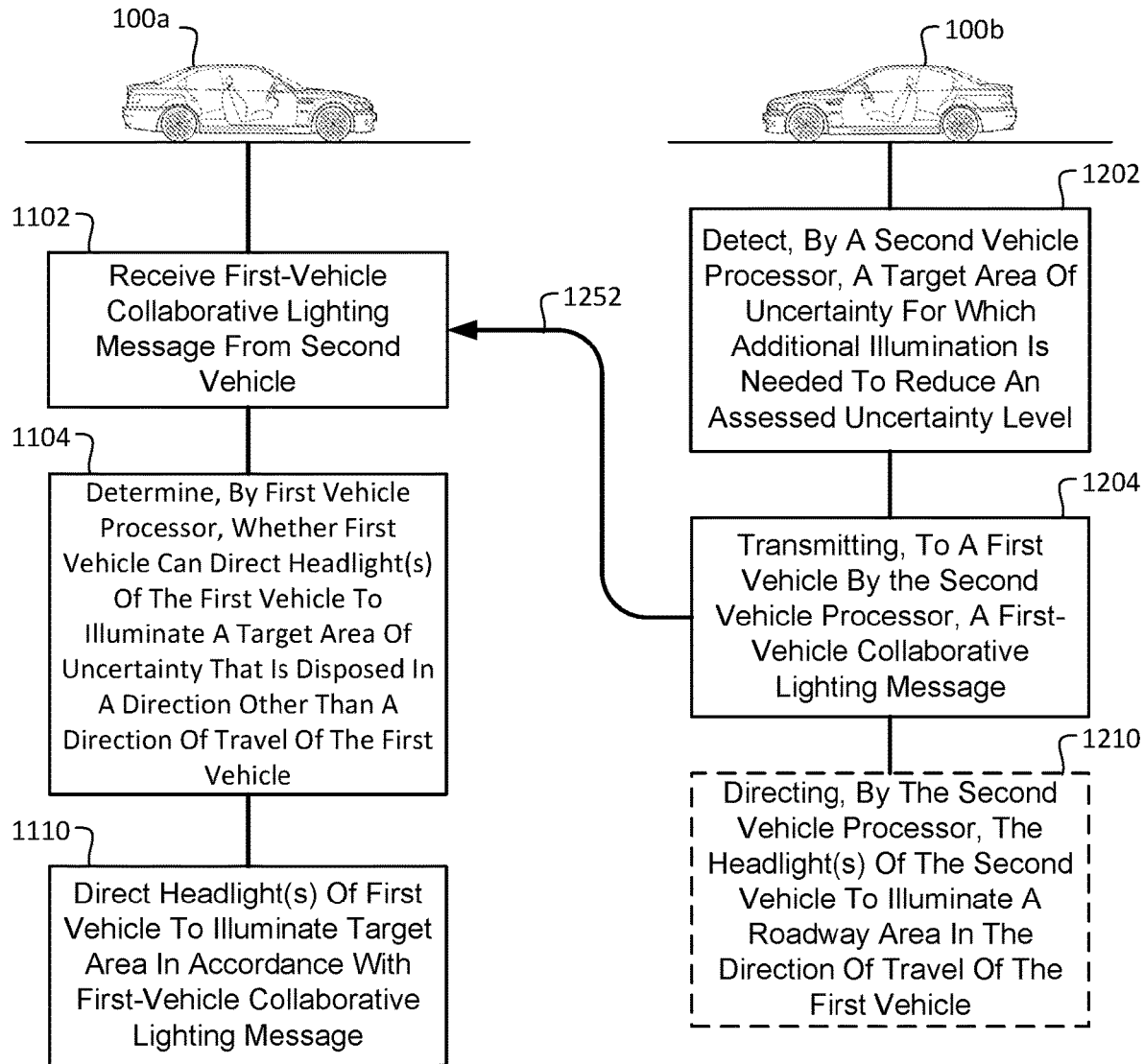
FIGS. 13A, 13B and 13C are communication flow diagrams of example communication exchanges for collaborative headlight directing between two vehicles according to some embodiments.
Figure 13B:
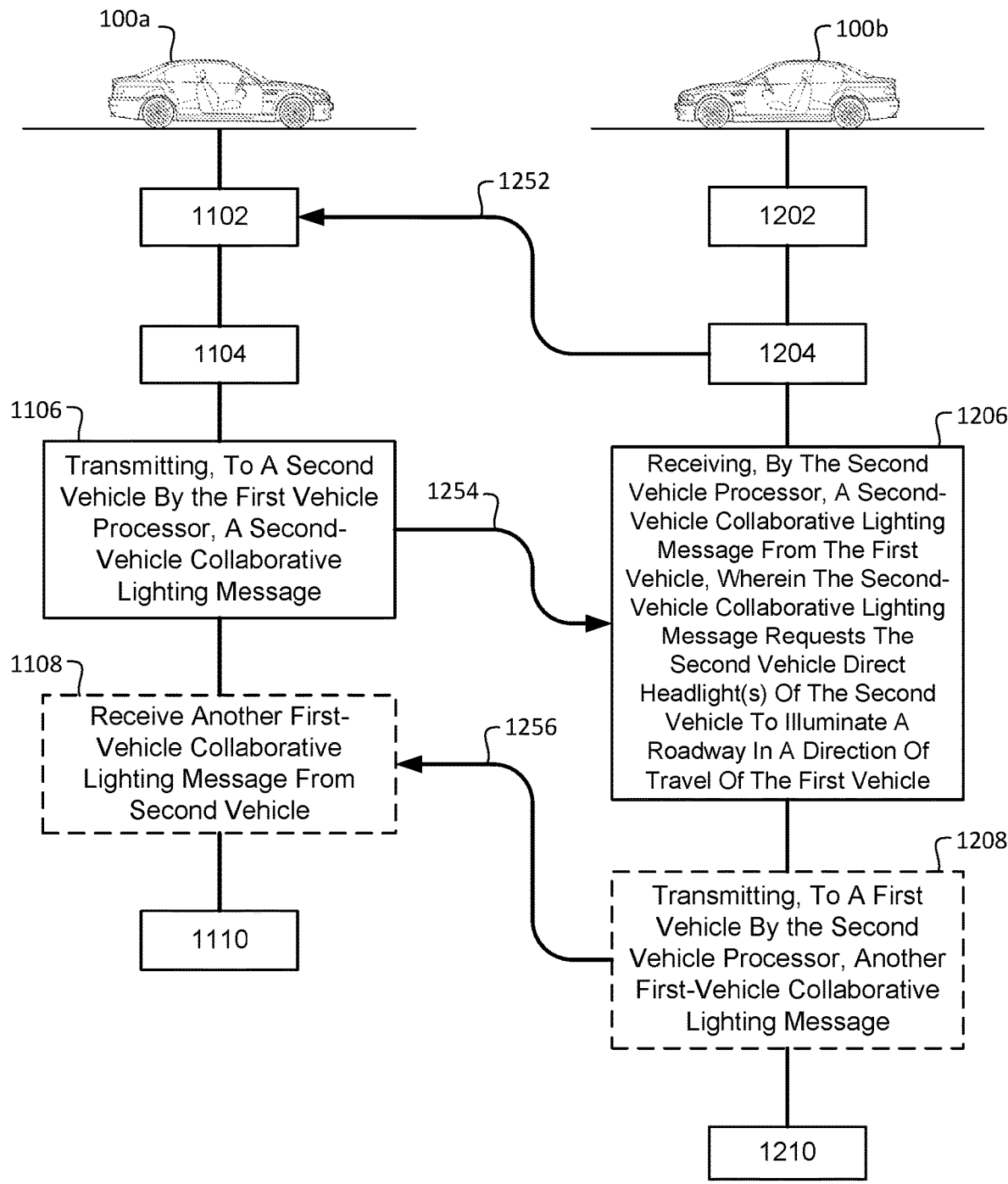

FIGS. 12C, 13A, and 13B, and illustrate a method 1205 of collaborative headlight directing between vehicles in accordance with some embodiments.

In block 1210, following the operations of any one of blocks 1204, 1206, or 1208 in the methods 1200 or 1203, the processor of the second vehicle may direct one or more of the headlights of the second vehicle to illuminate a roadway area in the direction of travel of the first vehicle.

In some embodiments, the processor may repeat the operations in block 1210 to periodically or continuously direct one or more headlights collaboratively according to a collaborative lighting plan until the plan is completed or cancelled by either vehicle.

Figure 12D:
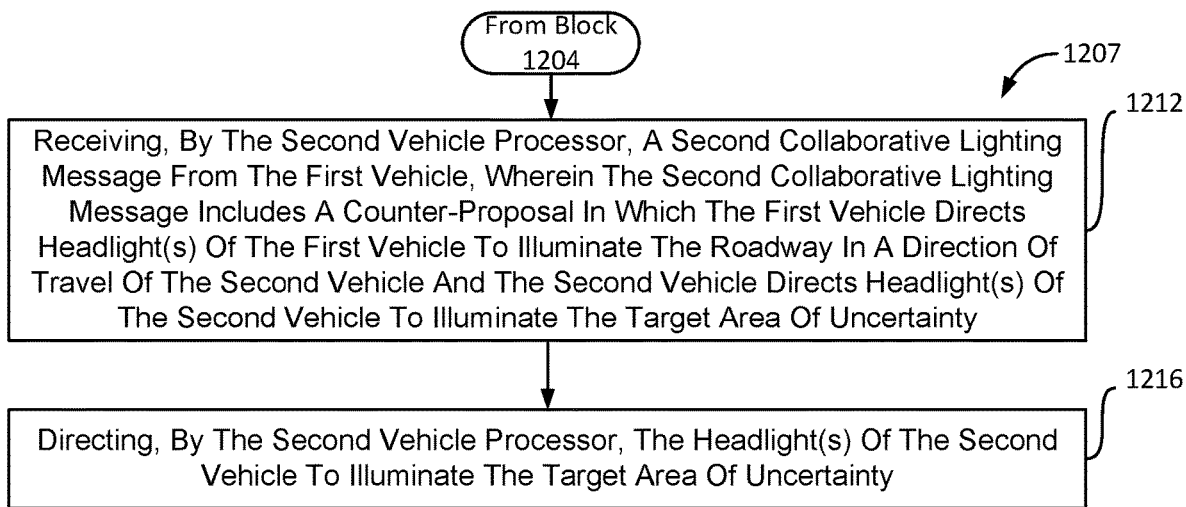
Figure 13C:
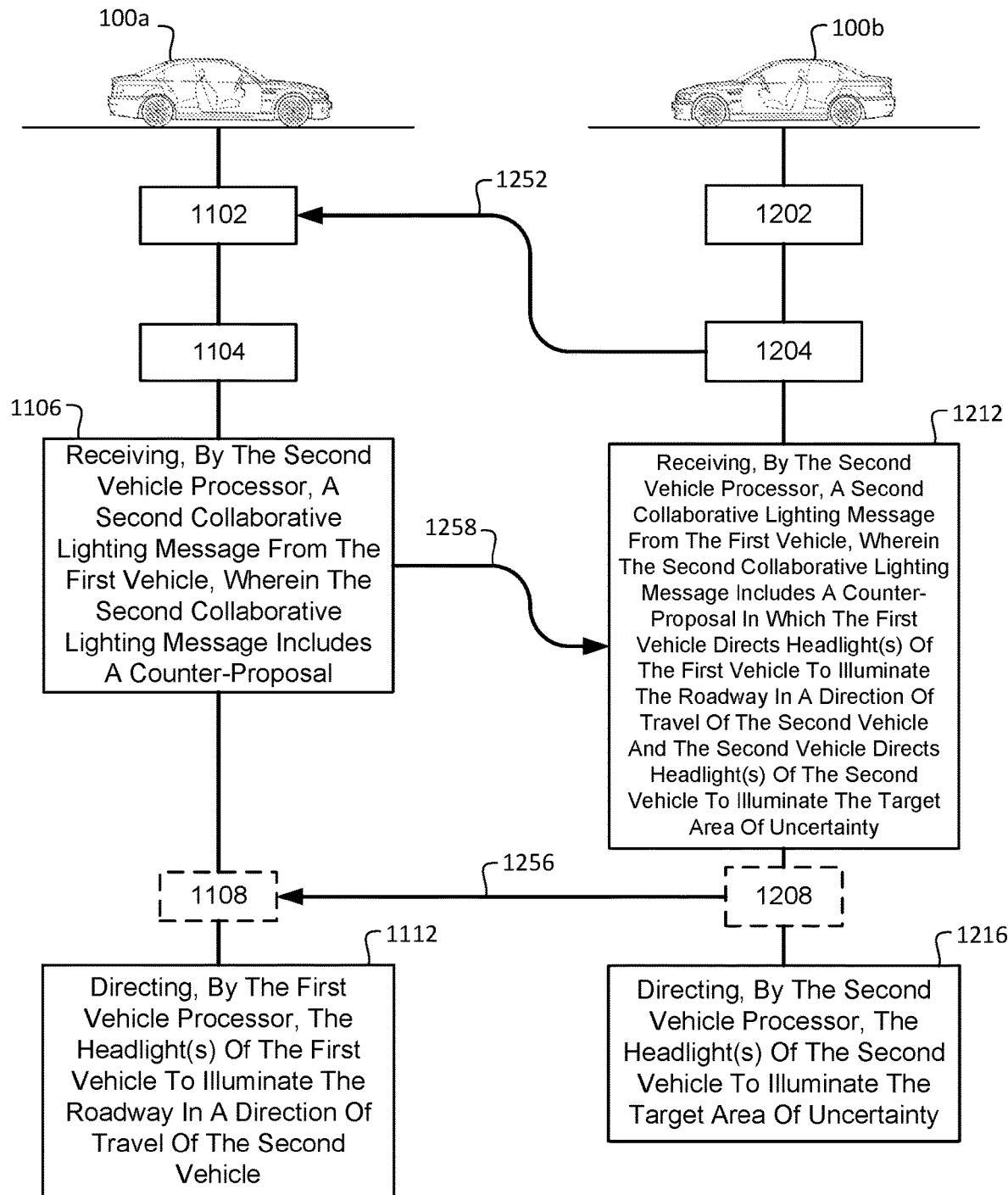

FIGS. 12D and 13C illustrate a method 1207 of collaborative headlight directing between vehicles in accordance with some embodiments.

In block 1212, following the operations of block 1204 in the method 1200, the processor of the second vehicle using the transceiver (e.g., 180) may receive a second collaborative lighting message 1258 from the first vehicle. The second collaborative lighting message 1258 may include a counter-proposal in which the first vehicle proposes to direct one or more headlights of the first vehicle to illuminate the roadway in a direction of travel of the second vehicle and requests the second vehicle to direct one or more headlights of the second vehicle to illuminate the target area of uncertainty.

In block 1216, the processor of the second vehicle may direct one or more of the headlights of the second vehicle to illuminate the target area of uncertainty.

In some embodiments, the processor may repeat the operations in blocks 1212 and 1216 to periodically or continuously direct one or more headlights collaboratively according to a collaborative lighting plan until the plan is completed or cancelled by either vehicle.

FIG. 13B illustrates an addition operation of collaborative headlight directing between vehicles in accordance with some embodiments.

In block 1106, following the operations of block 1104 in the method 1103, the processor of the first vehicle may use the transceiver (e.g., 180) to transmit a second vehicle collaborative lighting message 1254 to the second vehicle. The second collaborative lighting message 1254 may request that the second vehicle direct one or more headlights of the second vehicle to illuminate a roadway in a direction of travel of the first vehicle.

In optional block 1108, the processor of the first vehicle using the transceiver (e.g., 180) may receive another first-vehicle collaborative lighting message 1256 from the second vehicle. The other first-vehicle collaborative lighting message 1256 may request that the first vehicle direct one or more headlights of the first vehicle to illuminate the target area of uncertainty that is disposed, relative to the first vehicle, in a direction other than a direction of travel of the first vehicle. Following the operations in optional block 1108, the processor may follow the operations in block 1110 described above.

FIG. 14 illustrates addition elements of collaborative headlight directing between vehicles in accordance with some embodiments.

In block 1402, the processor of the third vehicle using the transceiver (e.g., 180) may receive a third-vehicle collaborative lighting message 1452 from the first vehicle. The third-vehicle collaborative lighting message 1452 may request that the third vehicle maintain or increase an illumination level of a roadway area in the direction of travel of the first vehicle.

In block 1404, the third vehicle processor using the transceiver may transmit to the first vehicle an agreement 1454 to the collaborative lighting request 1452 received in block 1402.

In block 1406, the third vehicle processor may direct one or more of the headlights of the third vehicle in accordance with the collaborative lighting request.

In some embodiments, the processors of the first, second and third vehicles may repeat any or all of the operations illustrated in FIG. 14 to repeatedly or continuously direct one or more headlights collaboratively according to a collaborative lighting plan until the plan is completed or cancelled by either vehicle.

Figure 15A:
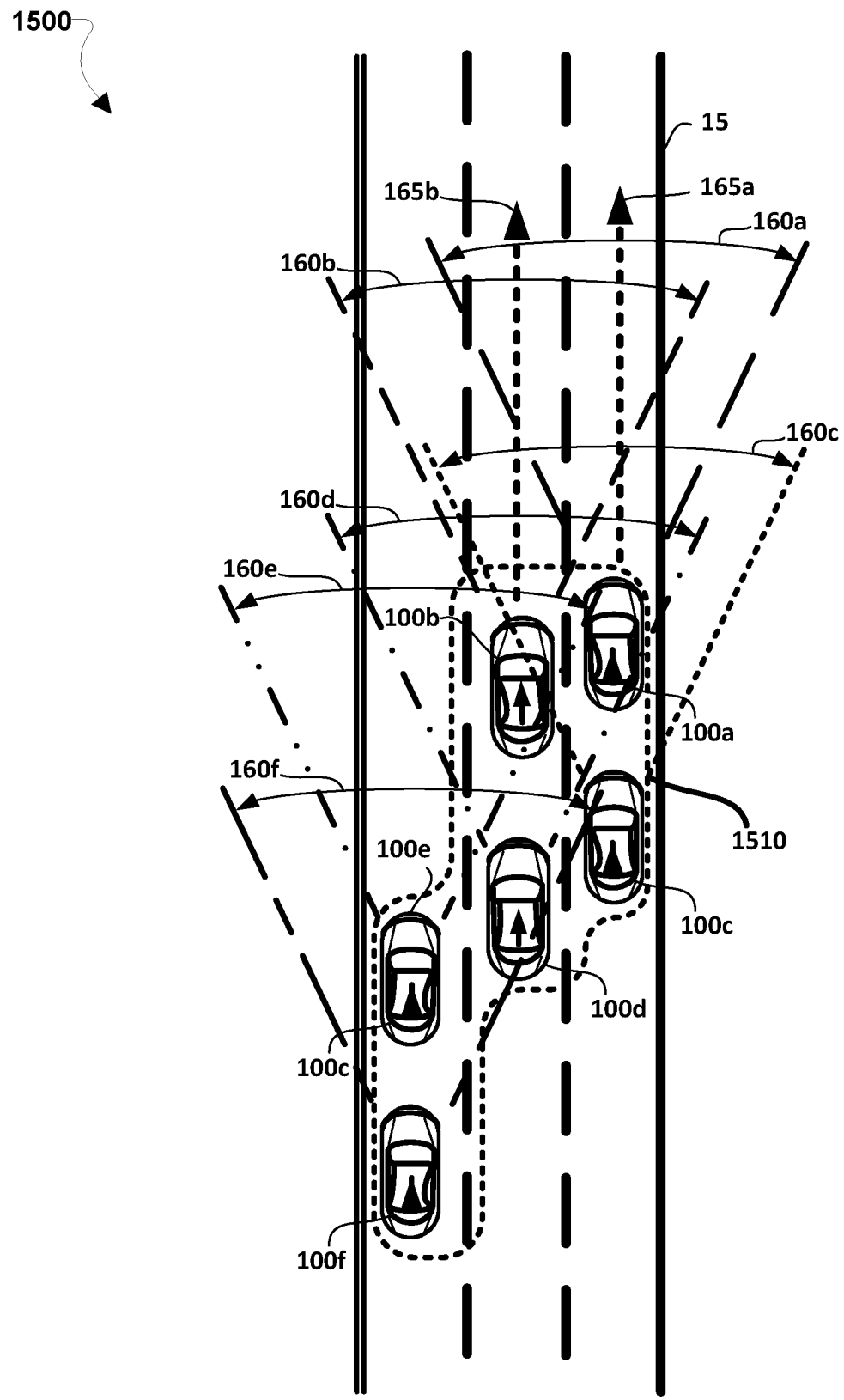
FIGS. 15A, 15B, and 15C illustrate examples of vehicles in a platoon with the vehicles directing one or more headlights per a collaborative lighting plan in accordance with some embodiments.
Figure 15B:
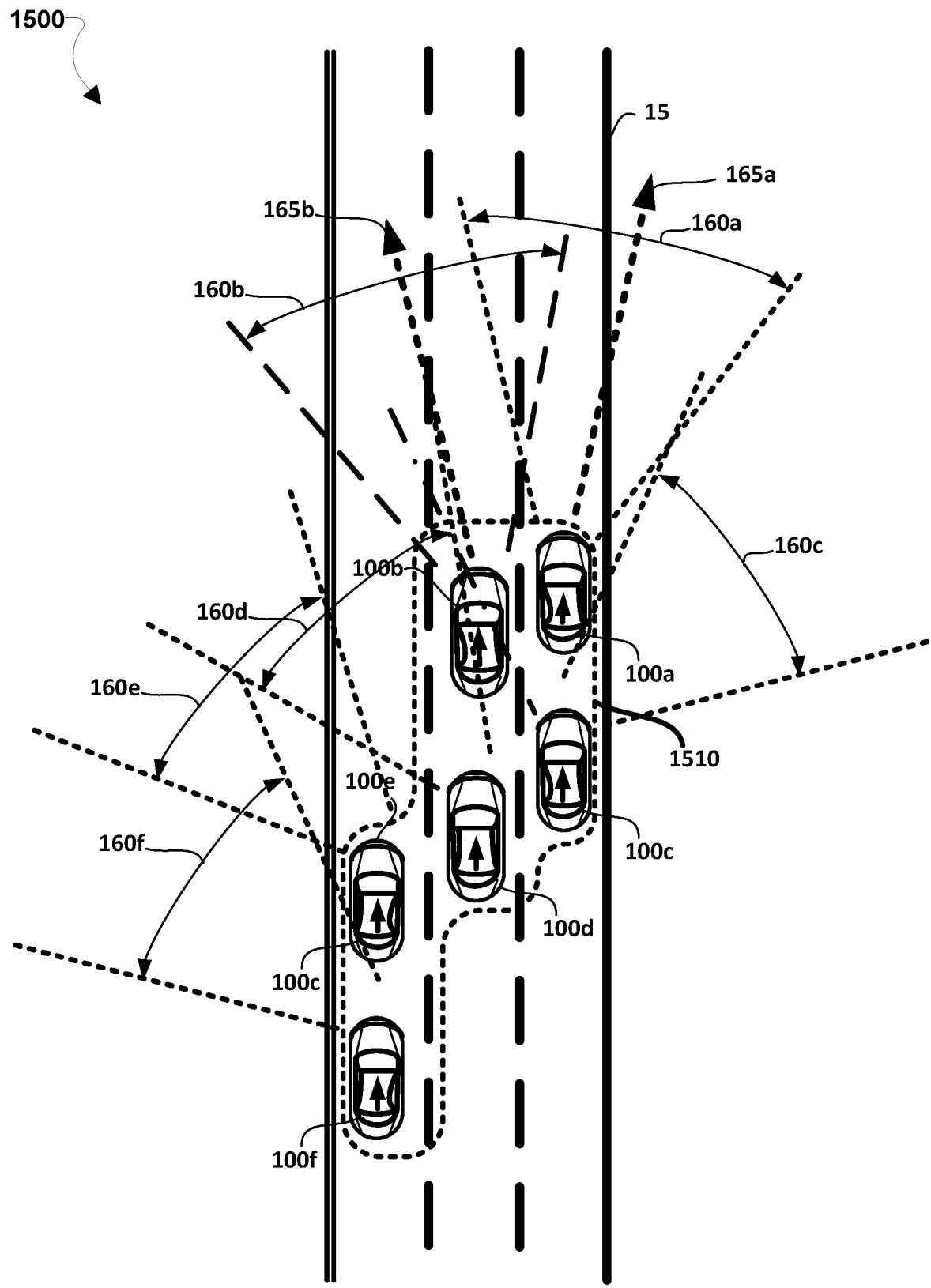
Figure 15C:
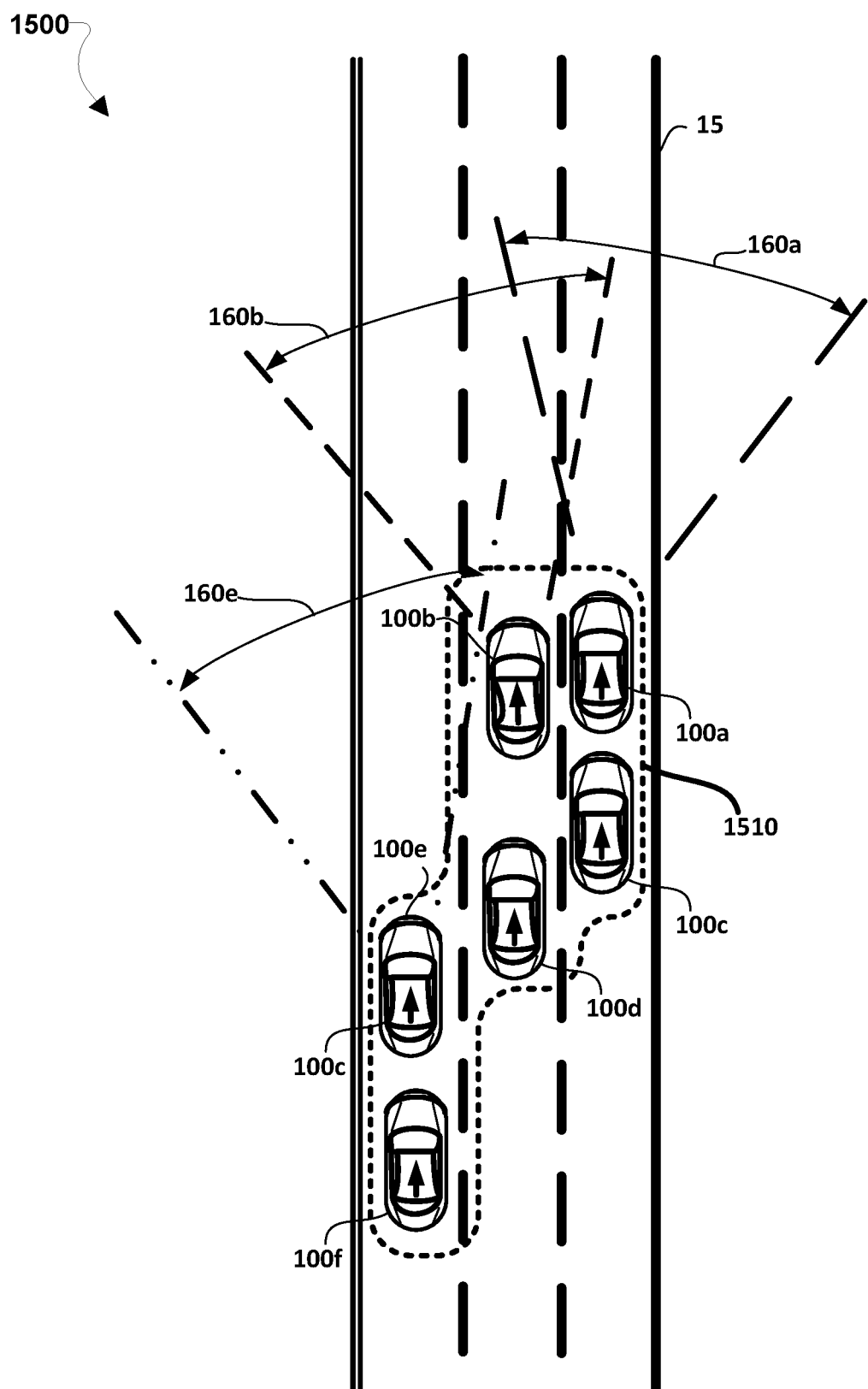

FIG. 15A illustrates an environment 1500 in which six vehicles 100a, 100b, 100c, 100d, 100e, 100f clustered together traveling in a platoon. FIGS. 15B and 15C illustrate the same environment 1500, but with the six vehicles 100a, 100b, 100c, 100d, 100e, 100f in the platoon using collaborative headlight directing, in accordance with some embodiments. With reference to FIGS. 1-15C, the vehicle (e.g., 100) may represent any or all of the vehicles 100a, 100b, 100c. In the environment 1500, the six vehicles 100a, 100b, 100c, 100d, 100e, 100f in the platoon are traveling on a roadway 15 in the same direction and grouped together in a cluster. The roadway 15 is a three-lane road, with all lanes dedicated to travel in the same direction. Although the roadway 15 is illustrated as a paved highway, the methods and systems of various embodiments may be applied to any pathway, whether or not it is a paved and/or clearly marked road.

Any one of the six vehicles 100a, 100b, 100c, 100d, 100e, 100f may be configured to be the leader of the platoon 1510. For example, the first vehicle 100a may be the leader, although the leader does not have to be a lead vehicle. During formation of the platoon 1510, the vehicles 100a, 100b, 100c, 100d, 100e, 100f may exchange formation messages with each other and particularly with the leader. The leader may compile the vehicle data received in the formation messages to assign platoon positions to each vehicle and determine other elements to enable safe vehicle operations as a platoon. In addition, in low lighting conditions, the leader may determine a collaborative lighting plan transmitted to the other vehicles 100b, 100c, 100d, 100e, 100f of the platoon.

In the example illustrated in FIG. 15A, each of the vehicles 100a, 100b, 100c, 100d, 100e, 100f has their headlights 160a, 160b, 160c, 160d, 160e, 160f aimed forward in the direction of travel of the platoon 1510. For example, a central beam 165a, 165b from each of the first and second headlights 160a, 160b extends in-line with the roadway 15. With the central beams of all headlights 160a, 160b, 160c, 160d, 160e, 160f extending in-line with the roadway 15, the beams overlap and are redundant. Thus, the leader may determine a collaborative lighting plan for improving the collective illumination provided by the platoon 1510, making the illumination more efficient and/or covering more areas.

When a platoon is organized, a plurality of the positions may be perimeter positions that define the outer boundaries of the platoon. For example, the first, second, third, fifth, and sixth vehicles 100a, 100b, 100c, 100e, 100f are shown in perimeter positions. If a platoon is wide enough, the platoon may include one or more central positions surrounded by other platoon vehicles. For example, the fourth vehicle 100d is in a central position and not in one of the plurality of perimeter positions.

In the example illustrated in FIG. 15B, each of the vehicles 100a, 100b, 100c, 100d, 100e, 100f is directing their headlights 160a, 160b, 160c, 160d, 160e, 160f in accordance with a collaborative lighting plan. This particular collaborative lighting plan has all vehicles 100a, 100b, 100c, 100d, 100e, 100f collectively spreading out the illumination of the combination of headlights 160a, 160b, 160c, 160d, 160e, 160f. In this way, each of the vehicles 100a, 100b, 100c, 100d, 100e, 100f is directing one or more of their respective headlights 160a, 160b, 160c, 160d, 160e, 160f in a direction other than a direction of travel of the platoon. For example, the central beams 165a, 165b from the first and second headlights 160a, 160b diverge from one another, no longer extending in-line with the roadway 15.

In the example illustrated in FIG. 15C, only the three vehicles 100a, 100b, 100c leading in each lane of the roadway 15 have their headlights 160a, 160b, 160c on, in accordance with a conserving collaborative lighting plan. The remaining vehicles 100d, 100e, 100f have their headlights 160d, 160e, 160f dimmed or turned off. This conserving collaborative lighting plan may conserve power for the three rear vehicles 100d, 100e, 100f and generates less wasted light or light pollution. In addition, this conserving collaborative lighting plan may direct the three lead vehicles 100a, 100b, 100c to collaborate by directing one or more of their respective headlights 160a, 160b, 160c out to collectively illuminate more of the roadway 15 and areas immediately adjacent the roadway 15.

FIGS. 16A, 16B, 16C, 16D, 16E, 16F, 17A, 17B, 17C, and/or 18 illustrate operations of methods 1600, 1603, 1605, 1607, 1609, 1611, 1700, 1703, and 1705, respectively, for collaborative headlight directing between vehicles in accordance with various embodiments. With reference to FIGS. 1A-18, the methods 1600, 1603, 1605, 1607, 1609, 1611, 1700, 1703, and 1705 may be implemented in a processor (e.g., 164), a processing device (e.g., 300), and/or a control unit (e.g., 104) (variously referred to as a "processor") of a vehicle (e.g., 100, 100a, 100b, or 100c). In some embodiments, the methods 1600, 1603, 1605, 1607, 1609, 1611, 1700, 1703, and 1705 may be performed by one or more layers within a vehicle management system stack, such as a vehicle management system (e.g., 200, 250), etc. In some embodiments, the methods 1600, 1603, 1605, 1607, 1609, 1611, 1700, 1703, and 1705 may be performed by a processor independently from, but in conjunction with, a vehicle control system stack, such as the vehicle management system. For example, the methods 1600, 1603, 1605, 1607, 1609, 1611, 1700, 1703, and 1705 may be implemented as a stand-alone software module or within dedicated hardware that monitors data and commands from/within the vehicle management system and is configured to take actions and store data as described.

Figure 16A:
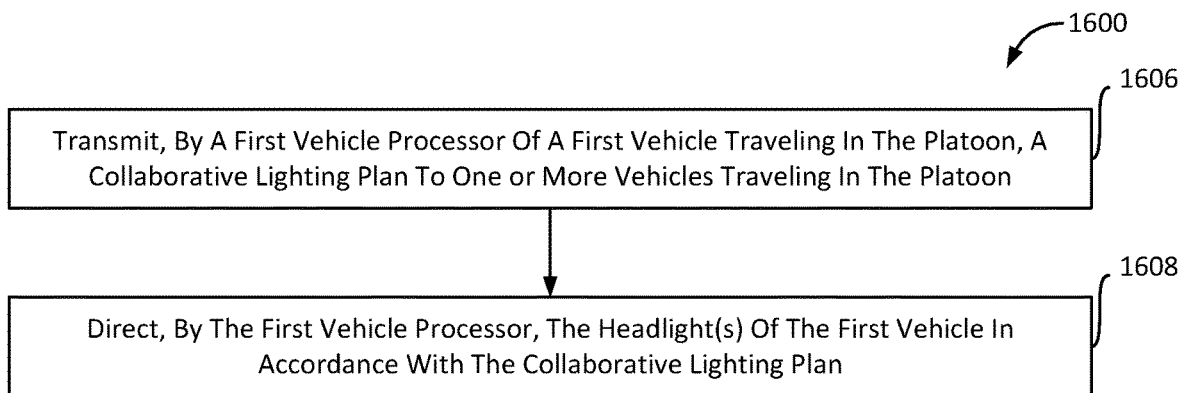
FIGS. 16A, 16B, 16C, 16D, 16E and 16F are process flow diagrams of example methods for collaborative headlight directing between vehicles in a platoon according to some embodiments.

FIG. 16A illustrates a method 1600 of collaborative headlight directing between vehicles within a platoon in accordance with some embodiments. Operations of the method 1600 are also illustrated in FIG. 18 which shows interactions between a first vehicle 100*a* implementing the method 1600 and another (i.e., second) vehicle 100*b* implementing the method 1700 illustrated in FIG. 17A. Operations in the blocks shown in FIG. 18 correspond to the operations of like numbered blocks in the methods 1600 and 1700 described below.

In block 1606, a first vehicle processor of a first vehicle 100*a* traveling in a platoon may transmit a collaborative lighting plan to a second vehicle 100*b* traveling in the platoon. The collaborative lighting plan may be transmitted to the second vehicle 100*b* via a collaborative lighting message 1825*b*. Similarly, as illustrated in FIG. 18, the collaborative lighting plan may be transmitted to the third, fourth, fifth, and sixth vehicles 100*c*, 100*d*, 100*e*, 100*f* in the platoon via collaborative lighting messages 1825*c*, 1825*d*, 1825*e*, 1825*f*, respectively. The collaborative lighting plan may direct the second vehicle 100*b* to direct one or more headlights of the second vehicle 100*b* in a direction other than a direction of travel of the platoon. In response to receiving the collaborative lighting plan, each of the follower vehicles 100*b*, 100*c*, 100*d*, 100*e*, 100*f* may acknowledge receipt and acceptance of the collaborative lighting plan by transmitting collaborative lighting messages 1830*b*, 1830*c*, 1830*d*, 1830*e*, 1830*f*, respectively.

In block 1608, the first vehicle processor, may direct one or more of the headlights of the first vehicle 100*a* in accordance with the collaborative lighting plan.

In some embodiments, the processor may repeat the operations in blocks 1606 and 1608 to periodically or continuously direct one or more headlights collaboratively according to a collaborative lighting plan until the plan is completed or cancelled by either vehicle or a platoon leader.

Figure 16B:
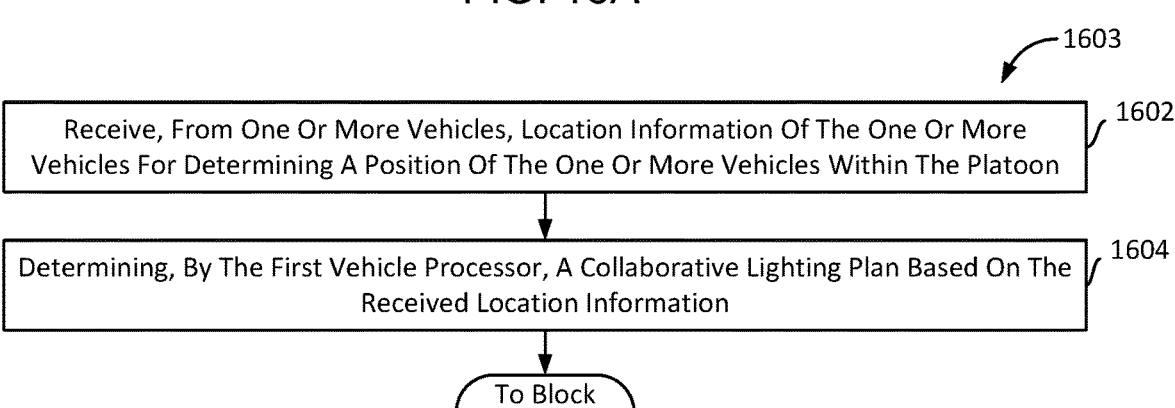

FIG. 16B illustrates a method 1603 of collaborative headlight directing between vehicles in a platoon in accordance with some embodiments. Operations of the method 1603 are also illustrated in FIG. 18 which shows interactions between a first vehicle 100*a* implementing the method 1603 and other vehicles 100*b*, 100*c*, 100*d*, 100*e*, 100*f* (i.e., a second vehicle) implementing the method 1703 illustrated in FIG. 17B. Operations in the blocks shown in FIG. 18 correspond to the operations of like numbered blocks in the methods 1603 and 1703 described below.

In block 1602, a first vehicle processor of a first vehicle 100*a* traveling in a platoon may receive, from a second vehicle 100*b* via a collaborative lighting message 1805*b*, location information of the second vehicle 100*b* for determining a position of the second vehicle 100*b* within the platoon. Similarly, the first vehicle processor may receive location information from the third, fourth, fifth, and sixth vehicles 100*c*, 100*d*, 100*e*, 100*f* via collaborative lighting messages 1805*c*, 1805*d*, 1805*e*, 1805*f*, respectively. In response to receiving the location information, the first vehicle processor may compile vehicle data in block 1810.

In block 1604, the first vehicle processor, may determine the collaborative lighting plan based on the received location information. Following the operations in block 1604, the first vehicle processor may perform the operations in block 1606 of the method 1600 as described.

In some embodiments, the processor may repeat the operations in blocks 1602 and 1604 to periodically or continuously update the collaborative lighting plan until the plan is completed or cancelled by any vehicle.

Figure 16C:
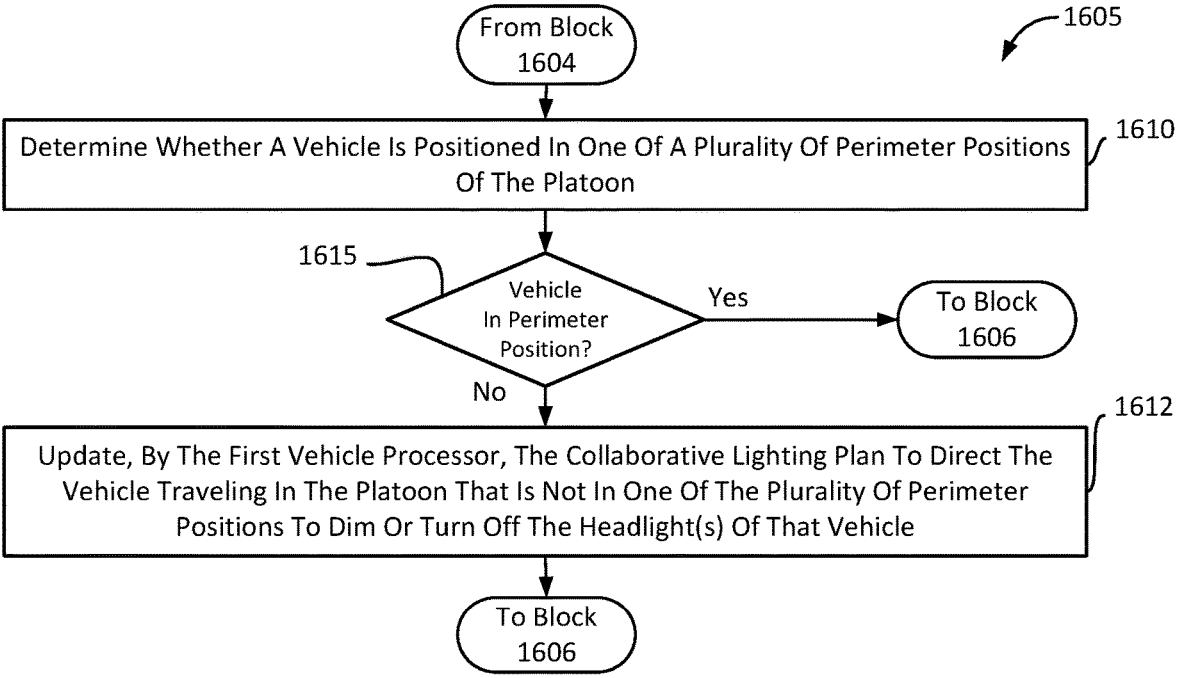

FIG. 16C illustrates a method 1605 of collaborative headlight directing between vehicles in a platoon in accordance with some embodiments. Operations of the method 1605 are also illustrated in FIG. 18 which shows interactions between a first vehicle 100*a* implementing the method 1605 and other vehicles 100*b*, 100*c*, 100*d*, 100*e*, 100*f* (i.e., a second vehicle) implementing the method 1705 illustrated in FIG. 17C. Operations in the blocks shown in FIG. 18 correspond to the operations of like numbered blocks in the methods 1605 and 1705 described below.

Following the operations of block 1604, a first vehicle processor of a first vehicle 100*a* traveling in a platoon may determining whether another vehicle (i.e., a second vehicle) in the platoon is positioned in one of a plurality of perimeter positions of the platoon in block 1610 and determination block 1615.

In response to determining that the second vehicle in the platoon is positioned in one of a plurality of perimeter positions of the platoon (i.e., determination block 1615="Yes"), the first vehicle processor may perform the operations in block 1606 of the method 1600 as described.

In response to determining that the second vehicle in the platoon is not in a perimeter position, and thus is in a central position (i.e., determination block 1615="No"), the processor may update the collaborative lighting plan to direct the vehicle that is not in one of the perimeter positions to dim or turn off one or more of the headlights of the vehicle in block 1612. Following the operations in block 1612, the first vehicle processor may perform the operations in block 1606 of the method 1600 as described.

In some embodiments, the processor may repeat the operations in block 1610, determination block 1615, and block 1612 to periodically or continuously update the collaborative lighting plan until the plan is completed or cancelled by any vehicle.

Figure 16D:
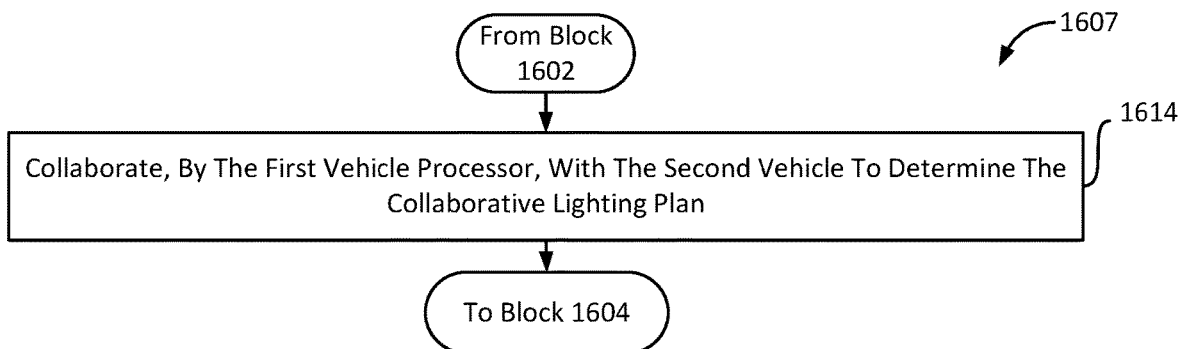

FIG. 16D illustrates a method 1607 of collaborative headlight directing between vehicles in a platoon in accordance with some embodiments. Operations of the method 1607 are also illustrated in FIG. 18 which shows interactions between a first vehicle 100*a* implementing the method 1607 with other vehicles 100*b*, 100*c*, 100*d*, 100*e*, 100*f* (i.e., a second vehicle). Operations in the blocks shown in FIG. 18 correspond to the operations of like numbered blocks in the method 1607 described below.

In block 1614, a first vehicle processor of a first vehicle 100*a* traveling in a platoon may collaborate with a second vehicle 100*b* by exchanging one or more collaborative lighting messages 1815*b*, to determine the collaborative lighting plan. Similarly, the first vehicle processor of a first vehicle 100*a* may collaborate with any and all of the other vehicles 100*c*, 100*d*, 100*e*, 100*f*, by exchanging one or more collaborative lighting messages 1815*c*, 1815*d*, 1815*e*, 1815*f*, respectively, to determine the collaborative lighting plan. Each of the vehicles 100*a*, 100*b*, 100*c*, 100*d*, 100*e*, 100*f* of the platoon may exchange more than one collaborative lighting message 1815*b*, 1815*c*, 1815*d*, 1815*e*, 1815*f* before the first vehicle processor determines the collaborative lighting plan in block 1820.

In some embodiments, the processor may repeat the operations in block 1614 to periodically or continuously update the collaborative lighting plan until the plan is completed or cancelled by any vehicle.

Figure 16E:
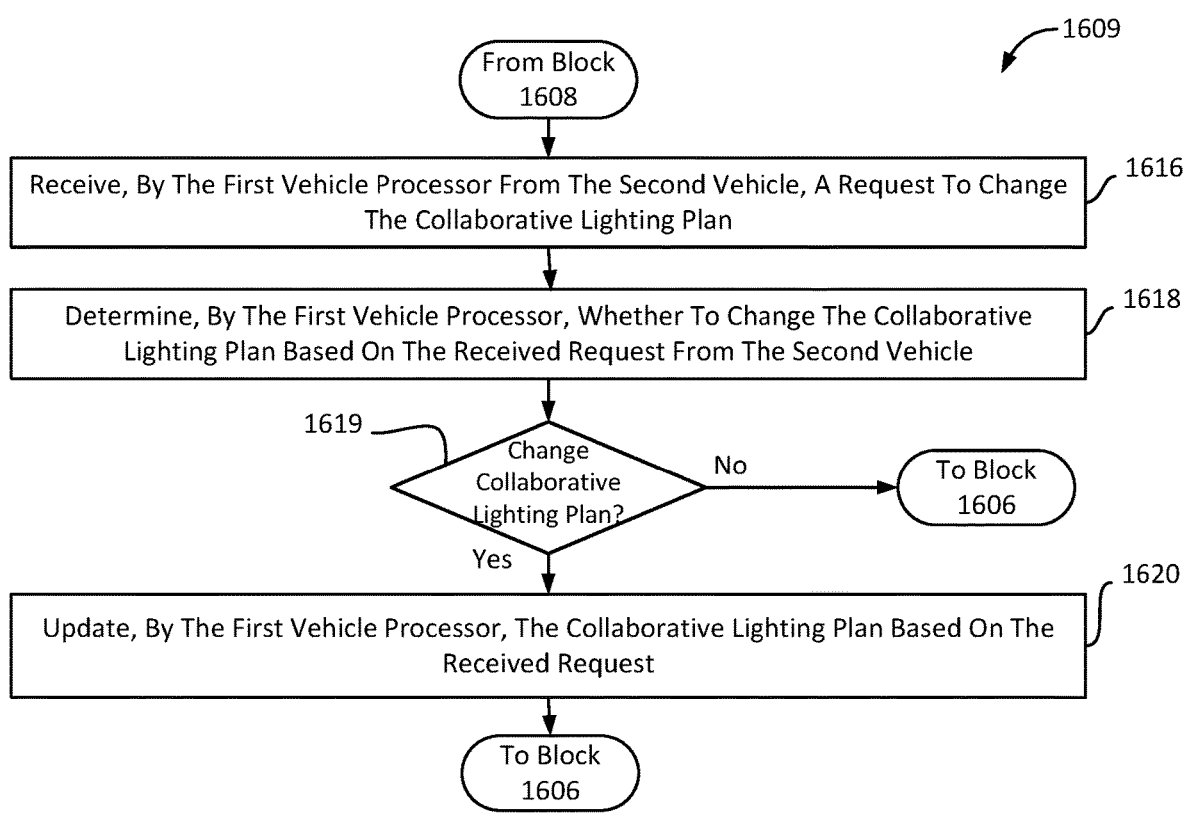

FIG. 16E illustrates a method 1609 of collaborative headlight directing between vehicles in a platoon in accordance with some embodiments. Operations of the method 1609 are also illustrated in FIG. 18 which shows interactions between a first vehicle 100*a* implementing the method 1609 and other vehicles 100*b*, 100*c*, 100*d*, 100*e*, 100*f* (i.e., a second vehicle) implementing the method 1705 illustrated in FIG. 17C. Operations in the blocks shown in FIG. 18 correspond to the operations of like numbered blocks in the methods 1609 and 1705 described below.

In block 1616, following the operations of block 1608 described above, a first vehicle processor of a first vehicle 100*a* traveling in a platoon may receive from the second vehicle 100*b* a request to change the collaborative lighting plan.

In block 1618 and determination block 1619, the first vehicle processor may determine whether to change the collaborative lighting plan based on the received request from the second vehicle 100*b*.

In response to determining that collaborative lighting plan should be changed (i.e., determination block 1619="Yes"), the processor may update the collaborative lighting plan based on the received request in block 1620. Following the operations in block 1620 or in response to determining that the collaborative lighting plan need not be changed (i.e., determination block 1619="No"), the processor may perform the operations in block 1606 of the method 1600 as described. In this way, the first vehicle processor may transmit an updated collaborative lighting plan via collaborative lighting messages 1825*b*', 1825*c*', 1825*d*', 1825*e*', 1825*f* to the other vehicles 100*b*, 100*c*, 100*d*, 100*e*, 100*f* traveling in the platoon. Also, in response to receiving the updated collaborative lighting plan, each of the follower vehicles 100*b*, 100*c*, 100*d*, 100*e*, 100*f* may acknowledge receipt and acceptance of the updated collaborative lighting plan by transmitting a collaborative lighting messages 1830*b*, 1830*c*, 1830*d*, 1830*e*, 1830*f*, respectively.

In some embodiments, the processor may repeat the operations in blocks 1616, 1618, determination block 1619, and block 1620 to periodically or continuously update the collaborative lighting plan until the plan is completed or cancelled by any vehicle.

Figure 16F:
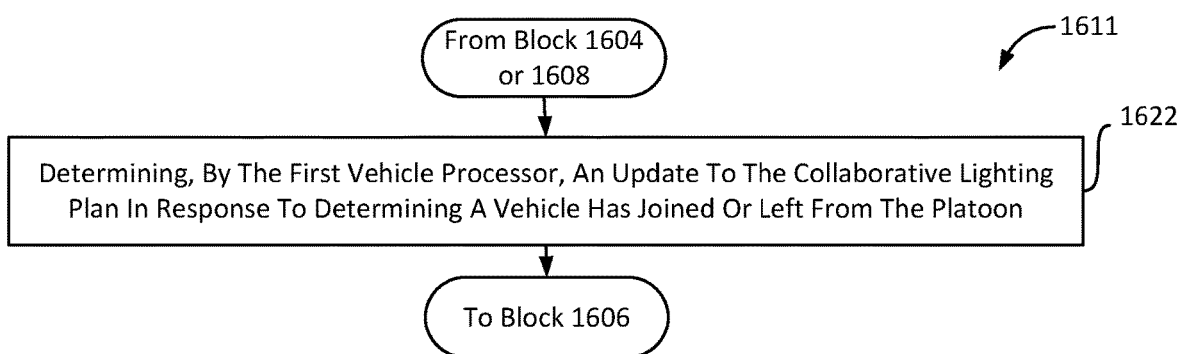

FIG. 16F illustrates a method 1611 of collaborative headlight directing between vehicles in a platoon in accordance with some embodiments. Operations of the method 1611 are also illustrated in FIG. 18 which shows interactions between a first vehicle 100*a* implementing the method 1611 with other vehicles 100*b*, 100*c*, 100*d*, 100*e*, 100*f* (i.e., a second vehicle). Operations in the blocks shown in FIG. 18 correspond to the operations of like numbered blocks in the method 1611 described below.

In block 1622, following the operations in block 1604 or 1608 described above, a first vehicle processor of a first vehicle 100*a* traveling in a platoon may determine an update to the collaborative lighting plan in response to determining that a vehicle has joined or left the platoon. Following the operations in block 1622, the processor may perform the operations in block 1606 of the method 1600 as described.

In some embodiments, the processor may repeat the operations in block 1622 to periodically or continuously update the collaborative lighting plan until the plan is completed or cancelled by any vehicle.

Figure 17A:
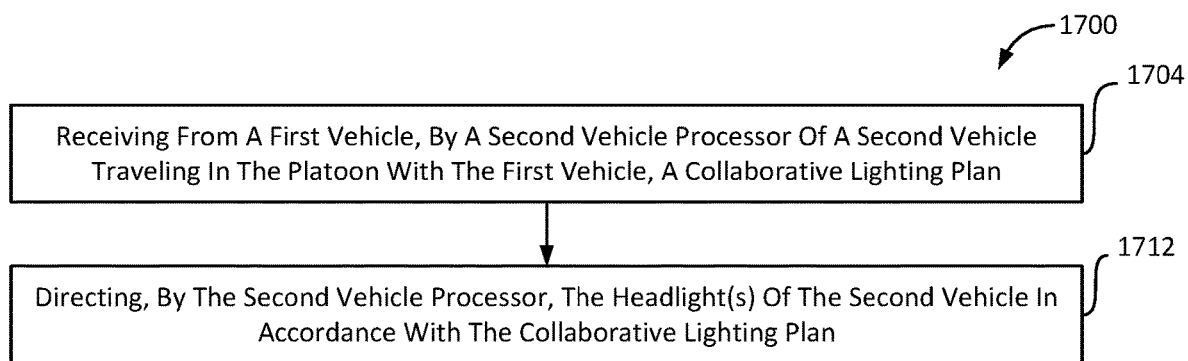
FIGS. 17A, 17B, 17C are process flow diagrams of example methods for collaborative headlight directing between vehicles in a platoon according to some embodiments.
Figure 18:
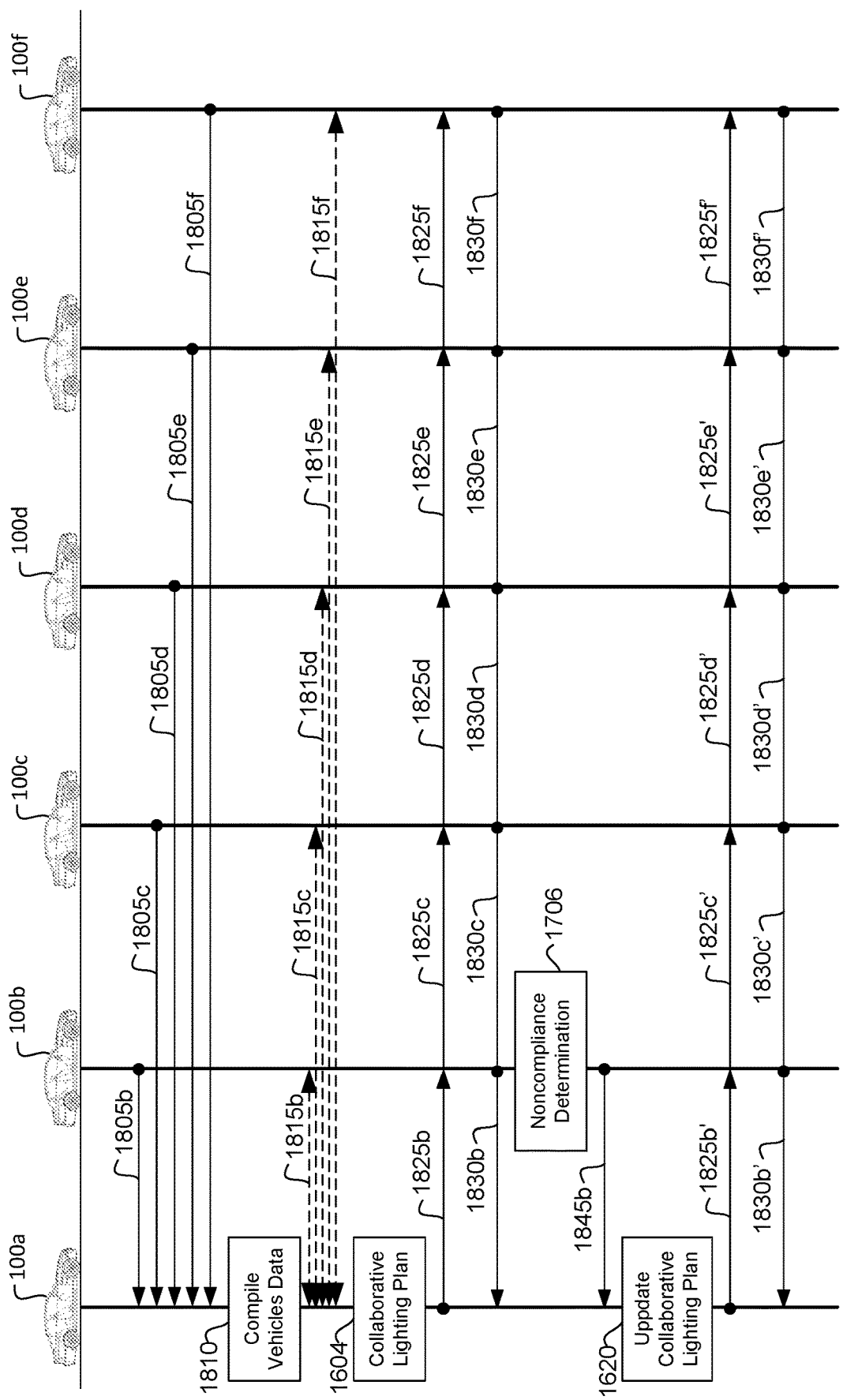
FIG. 18 is a communication flow diagram of communication exchanges for collaborative headlight directing between vehicles in a platoon according to some embodiments.

FIG. 17A illustrates a method 1700 of collaborative headlight directing between vehicles in a platoon in accordance with some embodiments. Operations of the method 1700 are also illustrated in FIG. 18 which shows interactions between a second vehicle 100*b* implementing the method 1700 and a lead vehicle (i.e., a first vehicle) 100*a* implementing the method 1600 illustrated in FIG. 16A. Operations in the blocks shown in FIG. 18 correspond to the operations of like numbered blocks in the methods 1600 and 1700 as described.

In block 1704, a second vehicle processor of a second vehicle 100*b* traveling in a platoon may receive a collaborative lighting plan (via a collaborative lighting message 1825*b*) from a vehicle in the platoon, such as the lead vehicle 100*a* of the platoon. The collaborative lighting plan may direct the second vehicle 100*b* to direct one or more headlights of the second vehicle 100*b* in a direction other than a direction of travel of the platoon.

In block 1712, the second vehicle processor, may direct one or more of the headlights of the second vehicle 100*b* in accordance with the collaborative lighting plan.

In some embodiments, the processor may repeat the operations in blocks 1704 and 1712 to periodically or continuously direct one or more headlights collaboratively according to a collaborative lighting plan until the plan is completed or cancelled by either vehicle.

Figure 17B:
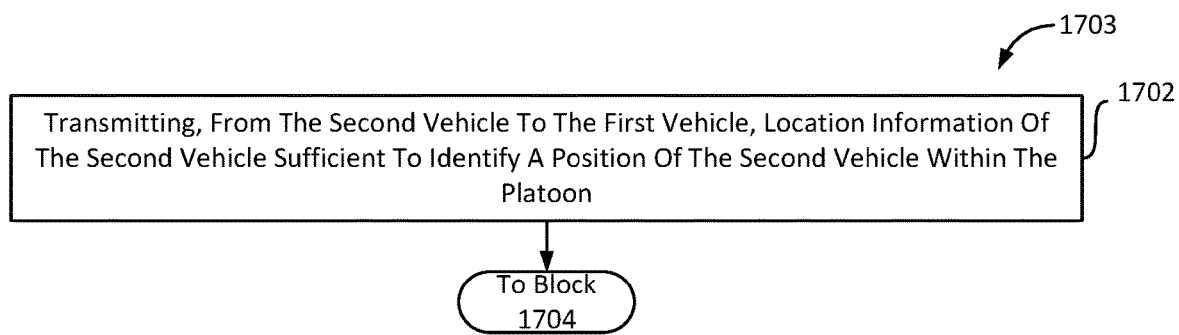

FIG. 17B illustrates a method 1703 of collaborative headlight directing between vehicles in a platoon in accordance with some embodiments. Operations of the method 1703 are also illustrated in FIG. 18 which shows interactions between a second vehicle 100*b* implementing the method 1703 and a lead vehicle 100*a* (i.e., a first vehicle) implementing the method 1603 illustrated in FIG. 16B. Operations in the blocks shown in FIG. 18 correspond to the operations of like numbered blocks in the methods 1603 and 1703 as described.

In block 1702, a second vehicle processor of a second vehicle 100*b* traveling in a platoon may transmit location information of the second vehicle 100*b* that is sufficient to identify a position of the second vehicle 100*b* within the platoon. The location information transmitted by the second vehicle processor may be absolute coordinates (e.g., defined by a global position system receiver) plus direction and speed, and/or relative distances to other vehicles in the platoon (e.g., determined by radar, lidar or camera sensors). The location information should be configured to provide sufficient information to enable the first vehicle processor to determine the position of the second vehicle within the platoon. Following the operations in block 1702, the second vehicle processor may perform the operations in block 1704 of the method 1700 as described.

In some embodiments, the processor may repeat the operations in block 1702 until the plan is completed or cancelled by any vehicle.

Figure 17C:
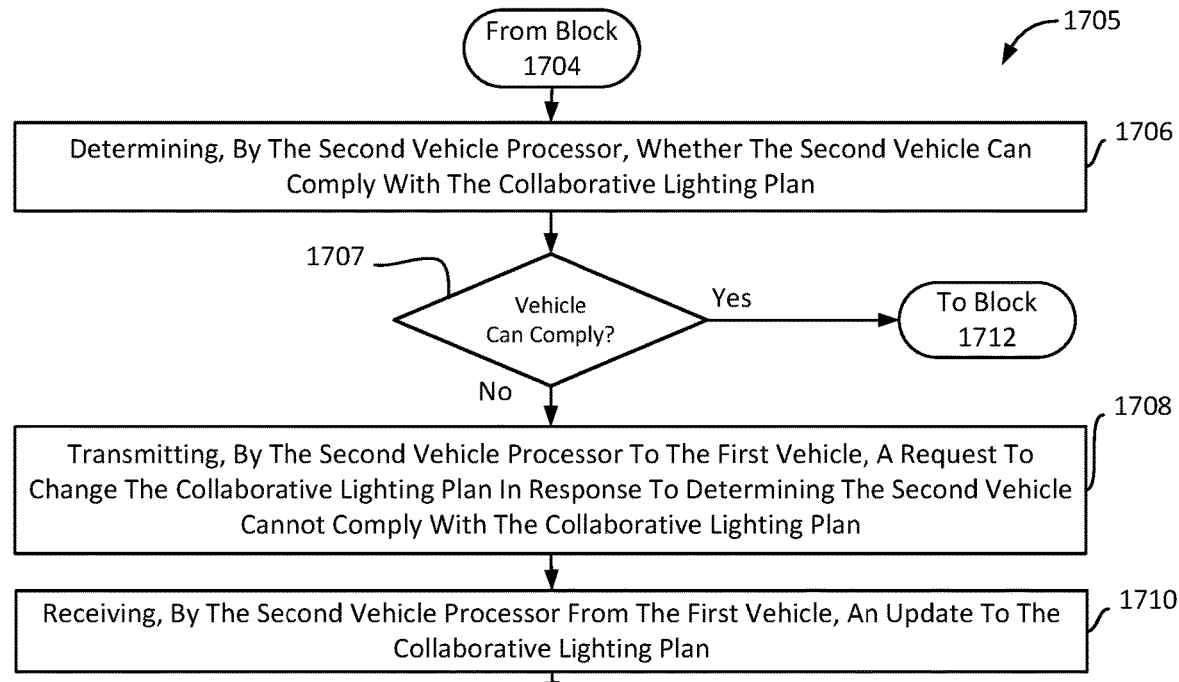

FIG. 17C illustrates a method 1705 of collaborative headlight directing between vehicles in a platoon in accordance with some embodiments. Operations of the method 1705 are also illustrated in FIG. 18 which shows interactions between a second vehicle 100*b* implementing the method 1705 and a lead vehicle 100*a* (i.e., a first vehicle) implementing the method 1609 illustrated in FIG. 16E. Operations in the blocks shown in FIG. 18 correspond to the operations of like numbered blocks in the methods 1609 and 1705 as described.

Following the operations of block 1704 described above, a second vehicle processor of a second vehicle 100*b* traveling in a platoon may determine whether the second vehicle 100*b* can comply with the collaborative lighting plan (i.e., a "Noncompliance Determination") in block 1706 and determination block 1707.

In response to determining that the second vehicle 100*b* cannot comply with the collaborative lighting plan (i.e., determination block 1707="No"), the processor may transmit to the first vehicle via a collaborative lighting message 1845*b* a request to change the collaborative lighting plan in block 1708.

In block 1710, the second vehicle processor of the second vehicle 100*b* may receive from the first vehicle 100*a* an update to the collaborative lighting plan.

In response to determining that the second vehicle 100*b* can comply with the collaborative lighting plan (i.e., determination block 1707="Yes") or following receipt of an updated collaborative lighting plan in block 1710, the processor may perform the operations in block 1712 of the method 1700 as described.

In some embodiments, the processor may repeat the operations in blocks 1706, 1708, 1710 and determination block 1707 until the plan is completed or cancelled by any vehicle.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method of collaboratively directing headlights by two or more vehicles travelling along a roadway, comprising:
receiving, by a first vehicle processor, a first collaborative lighting message from a second vehicle, wherein the first collaborative lighting message requests that the first vehicle direct one or more headlights of the first vehicle to illuminate a first portion of the roadway in the direction of travel of the first vehicle in collaboration with the second vehicle directing one or more headlights of the second vehicle to illuminate a second portion of the roadway in the direction of travel of the second vehicle, according to a collaborative lighting plan, wherein the direction of travel of the first vehicle is different from the direction of travel of the second vehicle; and
directing, by the first vehicle processor, one or more headlights of the first vehicle to illuminate the first portion of the roadway in the direction of travel of the first vehicle in accordance with the collaborative lighting plan.

2. The method of claim 1, further comprising:
determining, by the first vehicle processor, whether the first vehicle can collaborate with the second vehicle according to the collaborative lighting plan; and
transmitting to the second vehicle a second collaborative lighting message and directing one or more headlights of the first vehicle to illuminate the first portion of the roadway in the direction of travel of the first vehicle according to the collaborative lighting plan in response to determining that the first vehicle can collaborate with the second vehicle according to the collaborative lighting plan.

3. The method of claim 1, wherein the collaborative lighting plan includes pointing angles for headlights of the first and second vehicles to enable collaboratively directing one or more headlights to illuminate a common portion of the roadway for the first and second vehicles.

4. The method of claim 1, wherein the collaborative lighting plan includes pointing angles for headlights of the first and second vehicles to illuminate a larger continuous area of the roadway on which the first and second vehicles are traveling than the first and second vehicles would illuminate with headlights aimed in the respective direction of travel of the first and second vehicles.

5. The method of claim 1, wherein the collaborative lighting plan includes timing information and pointing angles for headlights of the first and second vehicles to direct one or more of the headlights of the first vehicle and the second vehicle to illuminate the roadway at the same time.

6. The method of claim 1, wherein the collaborative lighting plan identifies an area in the roadway that the second vehicle requests the first vehicle to point headlights towards to provide better illumination for the second vehicle.

7. The method of claim 1, wherein the collaborative lighting plan identifies an area of uncertainty in the roadway that the second vehicle needs to continue illuminating.

8. The method of claim 1, wherein the first and second vehicles are traveling in opposite directions along the roadway.

9. The method of claim 1, further comprising:
receiving, by the first vehicle processor, a third collaborative lighting message from a third vehicle, wherein the third collaborative lighting message requests that the first and second vehicles direct one or more headlights of the first and second vehicles to illuminate the respective portion of the roadway in the respective direction of travel, in collaboration with the third vehicle directing one or more headlights of the third vehicle to illuminate a third portion of the roadway in the direction of travel of the third vehicle according to another collaborative lighting plan.

10. A method of collaborative headlight directing between vehicles travelling along a roadway, comprising:
transmitting, to a first vehicle by a second vehicle processor, a first collaborative lighting message, wherein the first collaborative lighting message requests that the first vehicle direct one or more headlights of the first vehicle to illuminate a first portion of the roadway in the direction of travel of the first vehicle in collaboration with the second vehicle directing one or more headlights of the second vehicle to illuminate a second portion of the roadway in the direction of travel of the second vehicle, according to a collaborative lighting plan, wherein the direction of travel of the first vehicle is different from the direction of travel of the second vehicle; and
directing, by the second vehicle processor, one or more headlights of the second vehicle to illuminate the second portion of the roadway in the direction of travel of the second vehicle in accordance with the collaborative lighting plan.

11. The method of claim 10, further comprising:
receiving, by the second vehicle processor, a second collaborative lighting message from the first vehicle, wherein receipt of the second collaborative lighting message indicate that the first vehicle agrees to follow the first collaborative lighting message,
wherein directing one or more of the headlights of the second vehicle to illuminate the second portion of the roadway in the direction of travel of the second vehicle in accordance with the collaborative lighting plan is performed in response to receiving the second collaborative lighting message.

12. The method of claim 10, wherein the collaborative lighting plan includes the first and second vehicles collaboratively directing one or more headlights to illuminate a common portion of the roadway for the first and second vehicles.

13. The method of claim 10, wherein the collaborative lighting plan illuminates a larger continuous area of the roadway on which the first and second vehicles are traveling than the first and second vehicles would illuminate with headlights aimed in the respective direction of travel of the first and second vehicles.

14. The method of claim 10, wherein directing one or more of the headlights of the second vehicle in accordance with the collaborative lighting plan illuminates the roadway at the same time as one or more of the headlights of the second vehicle.

15. The method of claim 10, wherein the collaborative lighting plan identifies an area in the roadway that the second vehicle requests the first vehicle better illuminate.

16. The method of claim 10, wherein the collaborative lighting plan identifies an area of uncertainty on the roadway that the second vehicle needs to continue illuminating.

17. The method of claim 10, wherein the first and second vehicles are traveling in opposite directions along the roadway.

18. The method of claim 10, further comprising:
receive, by the second vehicle processor, an amended collaborative lighting plan, wherein the amended collaborative lighting plan requests that the first and second vehicles direct one or more headlights of the first and second vehicles to illuminate the respective portion of the roadway in the respective direction of travel, in collaboration with a third vehicle directing one or more headlights of the third vehicle to illuminate a third portion of the roadway in the direction of travel of the third vehicle.

19. A vehicle for collaboratively directing one or more headlights with another vehicle while both are travelling along a roadway, comprising:
a wireless transceiver;
one or more directable headlights; and
a processor coupled to the wireless transceiver and the one or more directable headlights, wherein the processor is configured with processor-executable instructions to:
transmit a first collaborative lighting message to the other vehicle that requests the other vehicle to direct one or more headlights of the other vehicle to illuminate a first portion of the roadway in the direction of travel of the other vehicle in collaboration with the vehicle directing one or more headlights to illuminate a second portion of the roadway in the direction of travel of the vehicle, according to a collaborative lighting plan, wherein the direction of travel of the vehicle is different from the direction of travel of the other vehicle; and
direct one or more of the headlights of the vehicle to illuminate a second portion of the roadway in the direction of travel of the vehicle, in accordance with the collaborative lighting plan.

20. The vehicle of claim 19, wherein the processor is further configured with processor-executable instructions to:

receive a second collaborative lighting message from the other vehicle that indicates that the other vehicle agrees to follow the first collaborative lighting message; and direct one or more of the headlights of the vehicle to illuminate the second portion of the roadway in the direction of travel of the vehicle in accordance with the collaborative lighting plan in response to receiving the second collaborative lighting message from the other vehicle.

21. The vehicle of claim 19, wherein the processor is further configured with processor-executable instructions to generate the collaborative lighting plan so that the vehicle and the other vehicle collaboratively directing one or more headlights to illuminate a common portion of the roadway for the two vehicles.

22. The vehicle of claim 19, wherein the processor is further configured with processor-executable instructions to generate the collaborative lighting plan identifying an area in the roadway to be illuminated by the other vehicle directing its headlights.

23. A collaborative headlight directing system for use in a vehicle for collaboratively directing one or more headlights with another vehicle while both are travelling along a roadway, comprising:

a processor configured to communicate via a wireless transceiver of the vehicle and send directing commands to directable headlights of the vehicle, wherein the processor is configured with processor-executable instructions to:

transmit a first collaborative lighting message to the other vehicle that requests the other vehicle to direct one or more headlights of the other vehicle to illuminate a first portion of the roadway in the direction of travel of the other vehicle in collaboration with the vehicle directing one or more headlights to illuminate a second portion of the roadway in the direction of travel of the vehicle, according to a collaborative lighting plan, wherein the direction of travel of the vehicle is different from the direction of travel of the other vehicle; and direct one or more of the headlights of the vehicle to illuminate the second portion of the roadway in the direction of travel of the vehicle in accordance with the collaborative lighting plan.

24. The collaborative headlight directing system of claim 23, wherein the processor is further configured with processor-executable instructions to:

receive a second collaborative lighting message from the other vehicle that indicates that the other vehicle agrees to follow the first collaborative lighting message; and direct one or more of the headlights of the vehicle to illuminate the second portion of the roadway in the direction of travel of the vehicle in accordance with the collaborative lighting plan in response to receiving the second collaborative lighting message from the other vehicle.

25. The collaborative headlight directing system of claim 23, wherein the processor is further configured with processor-executable instructions to generate the collaborative lighting plan so that the vehicle and the other vehicle collaboratively directing one or more headlights to illuminate a common portion of the roadway for the two vehicles.

26. The collaborative headlight directing system of claim 23, wherein the processor is further configured with processor-executable instructions to generate the collaborative lighting plan identifying an area in the roadway to be illuminated by the other vehicle directing its headlights.

* * * * *